US012670278B1

(12) United States Patent
Savage et al.

(10) Patent No.: US 12,670,278 B1
(45) Date of Patent: Jun. 30, 2026

(54) MEDIA CONTENT MODIFICATION WITH ACCESS CONTROL CONFIGURATIONS

(71) Applicant: Block, Inc., San Francisco, CA (US)

(72) Inventors: Truan Savage, Brooklyn, NY (US);
Madeeha Ghori, Fremont, CA (US);
Ryan Tai, Menlo Park, CA (US)

(73) Assignee: Block, Inc., Oakland, CA (US)

( * ) Notice: Subject to any disclaimer, the term of this patent is extended or adjusted under 35 U.S.C. 154(b) by 368 days.

(21) Appl. No.: 18/179,930

(22) Filed: Mar. 7, 2023

(51) Int. Cl.
| | |
|---|---|
| *G06F 21/62* | (2013.01) |
| *G06F 16/435* | (2019.01) |
| *G06F 21/60* | (2013.01) |
| *H04L 9/40* | (2022.01) |

(52) U.S. Cl.
CPC ........ G06F 21/6218 (2013.01); G06F 16/435 (2019.01); G06F 21/602 (2013.01); H04L 63/102 (2013.01)

(58) Field of Classification Search
CPC .. G06F 21/6218; G06F 16/435; G06F 21/602; H04L 63/102
See application file for complete search history.

(56) References Cited

U.S. PATENT DOCUMENTS

| | | | | | |
|---|---|---|---|---|---|
| 7,260,556 | B2 * | 8/2007 | Stefik | ................. | H04N 21/6377 |
| | | | | | 705/52 |
| 8,010,511 | B2 * | 8/2011 | Brock | .................... | G06F 21/10 |
| | | | | | 707/694 |

| | | | | | |
|---|---|---|---|---|---|
| 8,131,785 | B1 * | 3/2012 | Goel | .................. | G11B 27/3027 |
| | | | | | 707/828 |
| 8,862,517 | B2 * | 10/2014 | Padhye | ............... | G06F 21/6209 |
| | | | | | 380/277 |
| 9,213,986 | B1 * | 12/2015 | Buchheit | .................. | H04N 5/85 |
| 9,323,906 | B2 * | 4/2016 | Auger | ..................... | G06F 21/10 |
| 9,578,289 | B2 * | 2/2017 | Roberts | ............. | G06Q 30/0274 |
| 9,936,229 | B1 * | 4/2018 | Wagenaar | ........ | H04N 21/23106 |
| 10,068,101 | B2 * | 9/2018 | Durham | .................. | H04L 63/20 |
| 10,552,584 | B1 * | 2/2020 | Taraki | ................. | G06F 21/6218 |
| 11,075,891 | B1 * | 7/2021 | Long | ..................... | H04L 9/3213 |
| 11,657,852 | B1 * | 5/2023 | Zavesky | .......... | H04N 21/23418 |
| | | | | | 386/278 |
| 11,868,168 | B2 * | 1/2024 | Haitsuka | ................. | G06F 16/61 |
| 12,141,250 | B2 * | 11/2024 | Goldston | ................ | G06F 16/61 |
| 12,271,877 | B1 * | 4/2025 | Ghosh | ................... | H04L 9/3213 |
| 2005/0049886 | A1 * | 3/2005 | Grannan | ............... | G06Q 30/06 |
| | | | | | 705/902 |
| 2006/0021068 | A1 * | 1/2006 | Xu | .......................... | G06F 21/10 |
| | | | | | 726/30 |

(Continued)

*Primary Examiner* — Jason Chiang

(74) *Attorney, Agent, or Firm* — IP Spring

(57) ABSTRACT

A media content platform is described. In accordance with the described techniques, a first request is received from an artist entity to make a media content item available for modification by other entities on the media content platform. The first request includes one or more access controls that control use of the media content item. The media content item is stored on the media content platform. A second request is received from a requesting entity to modify the media content item. The second request accepts the one or more access controls. Access to the media content item for modification is granted to the requesting entity. A new media content item that incorporates at least a portion of the media content item is received from the requesting entity is received.

20 Claims, 23 Drawing Sheets

(56)  References Cited

U.S. PATENT DOCUMENTS

| | | | | |
|---|---|---|---|---|
| 2006/0129842 | A1* | 6/2006 | Herberger ............... | G06F 21/10 |
| | | | | 713/189 |
| 2007/0078773 | A1* | 4/2007 | Czerniak ................. | G06F 21/10 |
| | | | | 705/57 |
| 2007/0083380 | A1* | 4/2007 | Martinez ................. | G06F 21/10 |
| | | | | 705/26.1 |
| 2007/0214252 | A1* | 9/2007 | Kushima ............... | G06F 16/182 |
| | | | | 707/E17.032 |
| 2008/0091845 | A1* | 4/2008 | Mills .................... | H04L 67/303 |
| | | | | 709/246 |
| 2008/0249942 | A1* | 10/2008 | Barrs .................. | G06F 21/1063 |
| | | | | 705/51 |
| 2008/0249943 | A1* | 10/2008 | Barrs .................. | G06F 21/1062 |
| | | | | 705/51 |
| 2008/0250065 | A1* | 10/2008 | Barrs .................... | G06Q 30/02 |
| 2009/0287987 | A1* | 11/2009 | Alles ...................... | G06Q 20/10 |
| | | | | 705/1.1 |
| 2012/0290635 | A1* | 11/2012 | Yuki ...................... | G06Q 10/10 |
| | | | | 709/202 |
| 2014/0189876 | A1* | 7/2014 | Messinger ........... | G06F 21/105 |
| | | | | 726/26 |
| 2014/0223099 | A1* | 8/2014 | Kidron ................. | G06F 16/435 |
| | | | | 711/118 |
| 2015/0012383 | A1* | 1/2015 | Touboul ............ | G06Q 30/0609 |
| | | | | 705/26.35 |
| 2015/0074397 | A1* | 3/2015 | Dube ...................... | G06F 16/93 |
| | | | | 713/168 |

| | | | | |
|---|---|---|---|---|
| 2015/0235013 | A1* | 8/2015 | Sundaresan ........ | G06Q 30/0206 |
| | | | | 726/28 |
| 2016/0110313 | A1* | 4/2016 | Prakash .................. | G06F 30/00 |
| | | | | 715/202 |
| 2016/0188181 | A1* | 6/2016 | Smith ................. | G06F 3/04886 |
| | | | | 715/765 |
| 2016/0246948 | A1* | 8/2016 | Xiao ........................ | G06F 17/16 |
| 2017/0374399 | A1* | 12/2017 | Rao .................. | H04N 21/23418 |
| 2019/0155870 | A1* | 5/2019 | Prakash ............... | G06F 40/103 |
| 2020/0228880 | A1* | 7/2020 | Iyer ...................... | H04N 21/251 |
| 2021/0248214 | A1* | 8/2021 | Goldston ................ | G06F 21/16 |
| 2021/0279305 | A1* | 9/2021 | Goldston ............... | G06F 16/41 |
| 2022/0092153 | A1* | 3/2022 | Cantrell ................ | G06F 7/5443 |
| 2022/0337439 | A1* | 10/2022 | McCoy ............... | H04L 9/3247 |
| 2022/0366022 | A1* | 11/2022 | Goldston ............... | G06F 16/61 |
| 2022/0374503 | A1* | 11/2022 | Goldston .............. | G06F 3/0481 |
| 2023/0143854 | A1* | 5/2023 | Venezia ............... | H04L 9/3213 |
| | | | | 705/65 |
| 2023/0169113 | A1* | 6/2023 | Pham ................... | G06F 16/639 |
| | | | | 700/94 |
| 2023/0186262 | A1* | 6/2023 | Busch ................ | G06F 21/1065 |
| | | | | 705/51 |
| 2023/0222187 | A1* | 7/2023 | Goldston ............. | G06F 16/686 |
| | | | | 726/28 |
| 2023/0325473 | A1* | 10/2023 | Buffard ............... | G06F 21/1064 |
| | | | | 713/155 |
| 2024/0112280 | A1* | 4/2024 | Zavesky ............... | G06Q 50/01 |
| 2024/0112703 | A1* | 4/2024 | Wu .................. | H04N 21/23418 |
| 2025/0165565 | A1* | 5/2025 | Inoko .................. | G06Q 20/123 |

* cited by examiner

400

136

406

404

NETWORK(S)
114

BLOCKCHAIN NETWORK 402

408

BLOCKCHAIN NODE 408

BLOCKCHAIN
MANAGER 412

414

BLOCKCHAIN 410

BLOCK 416

HASH 418

TRANSACTION DATA
420

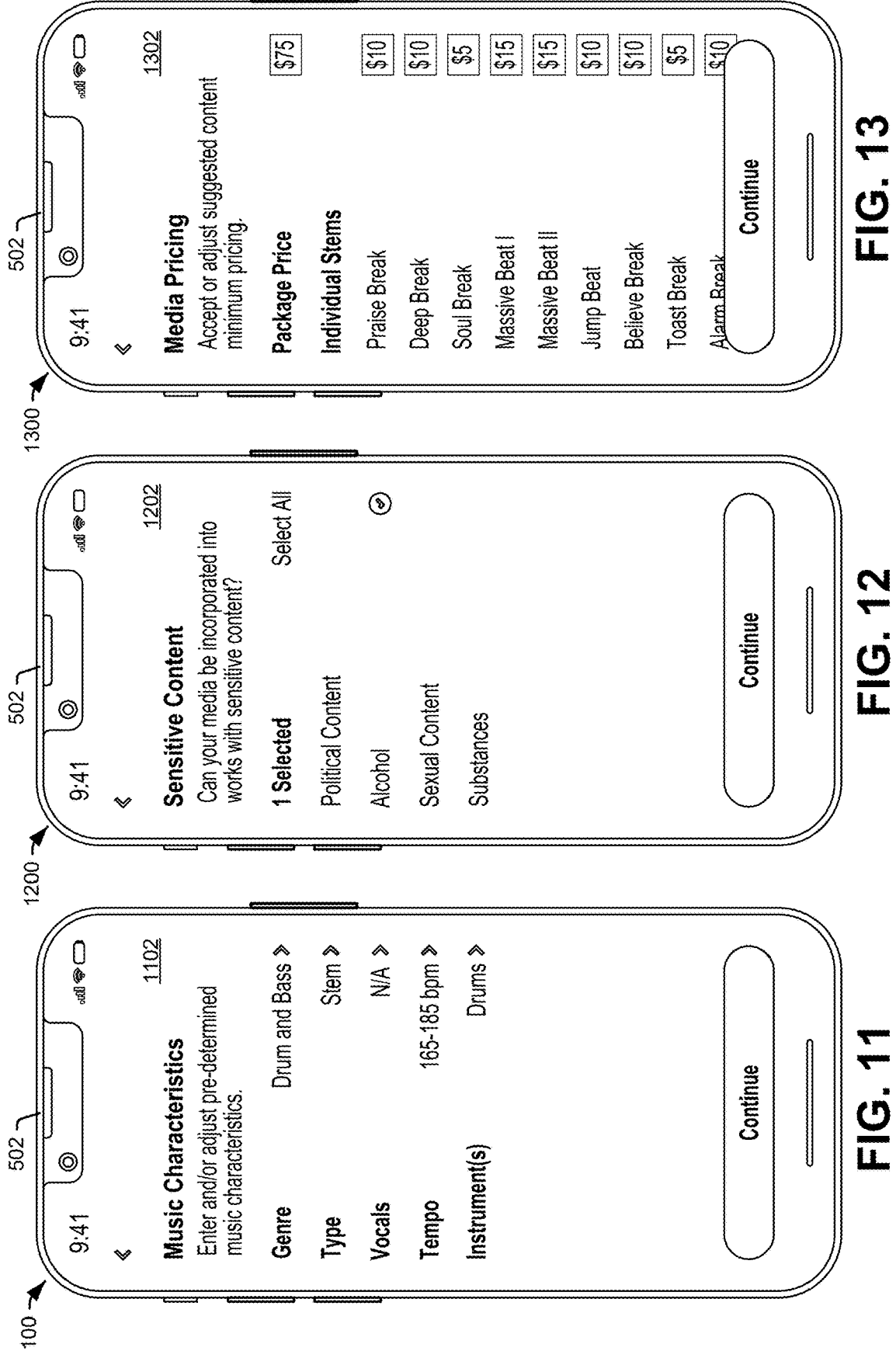

FIG. 11

Music Characteristics    1102

Enter and/or adjust pre-determined music characteristics.

| Genre | Drum and Bass ≫ |
| Type | Stem ≫ |
| Vocals | N/A ≫ |
| Tempo | 165-185 bpm ≫ |
| Instrument(s) | Drums ≫ |

Sensitive Content    1202

Can your media be incorporated into works with sensitive content?

1 Selected         Select All

Political Content

Alcohol

Sexual Content

Substances

Media Pricing    1302

Accept or adjust suggested content minimum pricing.

| Package Price | $75 |

Individual Stems

| Praise Break | $10 |
| Deep Break | $10 |
| Soul Break | $5 |
| Massive Beat I | $15 |
| Massive Beat II | $15 |
| Jump Beat | $10 |
| Believe Break | $10 |
| Toast Break | $5 |
| Alarm Break | $10 |

Continue

3700 ⎯

3702
RECEIVE, BY A MEDIA CONTENT PLATFORM, A REQUEST FROM A FIRST ARTIST ENTITY TO MAKE A MEDIA CONTENT ITEM AVAILABLE FOR MODIFICATION BY OTHER ENTITIES ON THE MEDIA CONTENT PLATFORM, THE REQUEST INCLUDING ONE OR MORE ACCESS CONTROLS THAT CONTROL USE OF THE MEDIA CONTENT ITEM IN DERIVATIVE WORKS

3704
STORE THE MEDIA CONTENT ITEM ON THE MEDIA CONTENT PLATFORM, THE STORING MAKING THE MEDIA CONTENT ITEM AVAILABLE FOR MODIFICATION AND ASSOCIATING THE MEDIA CONTENT ITEM WITH ONE OR MORE CHARACTERISTICS OF THE MEDIA CONTENT ITEM AND THE ONE OR MORE ACCESS CONTROLS

3706
MINT AN NFT IN ASSOCIATION WITH THE MEDIA CONTENT ITEM ON A BLOCKCHAIN

3708
SURFACE, TO A SECOND ARTIST ENTITY VIA A USER INTERFACE OF THE MEDIA CONTENT PLATFORM, A SUBSET OF MEDIA CONTENT ITEMS FROM MEDIA CONTENT ITEMS THAT ARE AVAILABLE FOR ACCESS, THE SUBSET OF MEDIA CONTENT ITEMS THAT ARE SURFACED INCLUDING THE MEDIA CONTENT ITEM

3710
RECEIVE, VIA THE USER INTERFACE OF THE MEDIA CONTENT PLATFORM, A REQUEST FROM THE SECOND ARTIST ENTITY TO MODIFY THE MEDIA CONTENT ITEM

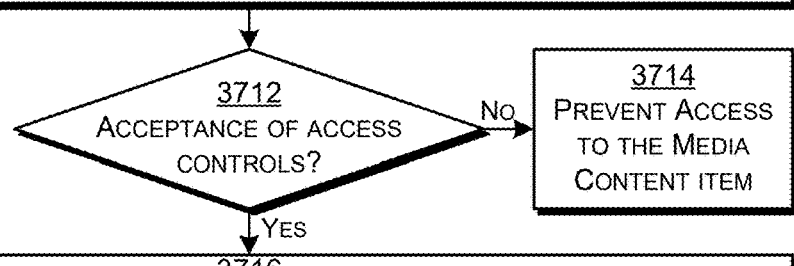

3712
ACCEPTANCE OF ACCESS CONTROLS? — No → 3714 PREVENT ACCESS TO THE MEDIA CONTENT ITEM

Yes

3716
PROVIDE, TO THE SECOND ARTIST ENTITY, THE MEDIA CONTENT ITEM AND AN AUTHORIZATION FOR ACCESSING THE MEDIA CONTENT ITEM THAT INCLUDES THE ONE OR MORE ACCESS CONTROLS

3718
RECEIVE, FROM THE SECOND ARTIST ENTITY, A NEW MEDIA CONTENT ITEM THAT INCORPORATES AT LEAST A PORTION OF THE MEDIA CONTENT ITEM

3720
MINT AN NFT IN ASSOCIATION WITH THE NEW MEDIA CONTENT ITEM ON THE BLOCKCHAIN

FIG. 37

3800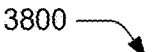

3802
RECEIVE, BY A MEDIA CONTENT PLATFORM, A REQUEST FROM A SOURCE ARTIST ENTITY TO ENABLE ACCESS, VIA THE MEDIA CONTENT PLATFORM, TO A MEDIA CONTENT ITEM OF THE SOURCE ARTIST ENTITY BY DERIVATIVE ARTIST ENTITIES

3804
DISPLAY, BY THE MEDIA CONTENT PLATFORM, A USER INTERFACE CONFIGURED TO ENABLE THE SOURCE ARTIST ENTITY TO DEFINE ONE OR MORE ACCESS CONTROLS THAT CONTROL USAGE OF THE MEDIA CONTENT ITEM BY THE DERIVATIVE ARTIST ENTITIES

3806
RECEIVE, VIA THE USER INTERFACE DISPLAYED BY THE MEDIA CONTENT PLATFORM, USER INPUT DEFINING THE ONE OR MORE ACCESS CONTROLS THAT CONTROL USAGE OF THE MEDIA CONTENT ITEM

3808
LIST THE MEDIA CONTENT ITEM ON THE MEDIA CONTENT PLATFORM, THE LISTING ENABLING THE MEDIA CONTENT ITEM TO BE ACCESSED VIA THE MEDIA CONTENT PLATFORM

3810
ACCESS REQUESTED?

No

3814
MAINTAIN LISTING OF THE MEDIA CONTENT ITEM

YES

3812
OUTPUT, TO THE SOURCE ARTIST ENTITY, A NOTIFICATION THAT A DERIVATIVE ARTIST ENTITY HAS SELECTED THE MEDIA CONTENT ITEM USE IN A DERIVATIVE WORK

3902
RECEIVE, BY A MEDIA CONTENT PLATFORM, A REQUEST FROM A DERIVATIVE ARTIST ENTITY TO MAKE A DERIVATIVE WORK AVAILABLE ON THE MEDIA CONTENT PLATFORM, THE DERIVATIVE WORK INCORPORATING AT LEAST A PORTION OF A MEDIA CONTENT ITEM CREATED BY A SOURCE ARTIST ENTITY

3904
PROCESS THE DERIVATIVE WORK TO DETECT THAT THE DERIVATIVE WORK INCORPORATES THE MEDIA CONTENT ITEM, INCLUDING IDENTIFYING A USAGE AMOUNT OF THE MEDIA CONTENT ITEM IN THE DERIVATIVE WORK

3906
OUTPUT, TO THE DERIVATIVE ARTIST ENTITY VIA A USER INTERFACE OF THE MEDIA CONTENT PLATFORM, ACCESS CONTROLS DEFINED BY THE SOURCE ARTIST ENTITY FOR INCLUSION OF THE MEDIA CONTENT ITEM IN DERIVATIVE WORKS

3908
RECEIVE, FROM THE DERIVATIVE ARTIST ENTITY VIA THE USER INTERFACE OF THE MEDIA CONTENT PLATFORM, A SELECTION OF ONE OR MORE ACCESS CONTROLS

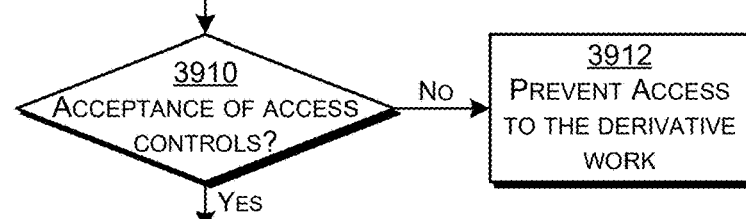

3910
ACCEPTANCE OF ACCESS CONTROLS?

No ⟶

3912
PREVENT ACCESS TO THE DERIVATIVE WORK

YES

3914
PROVIDE ACCESS TO THE DERIVATIVE WORK VIA THE MEDIA CONTENT PLATFORM

3916
PROVIDE, TO THE DERIVATIVE ARTIST ENTITY, AN AUTHORIZATION FOR INCLUDING THE MEDIA CONTENT ITEM IN THE DERIVATIVE WORK THAT INCLUDES THE ONE OR MORE ACCESS CONTROLS

3918
MINT AN NFT IN ASSOCIATION WITH THE DERIVATIVE WORK ON A BLOCKCHAIN, THE NFT INCLUDING A SMART CONTRACT GENERATED BASED ON THE ONE OR MORE ACCESS CONTROLS

3920
ALLOCATE REVENUE GENERATED BY THE DERIVATIVE WORK TO THE SOURCE ARTIST ENTITY AND THE DERIVATIVE ARTIST ENTITY ACCORDING TO THE SMART CONTRACT

FIG. 39

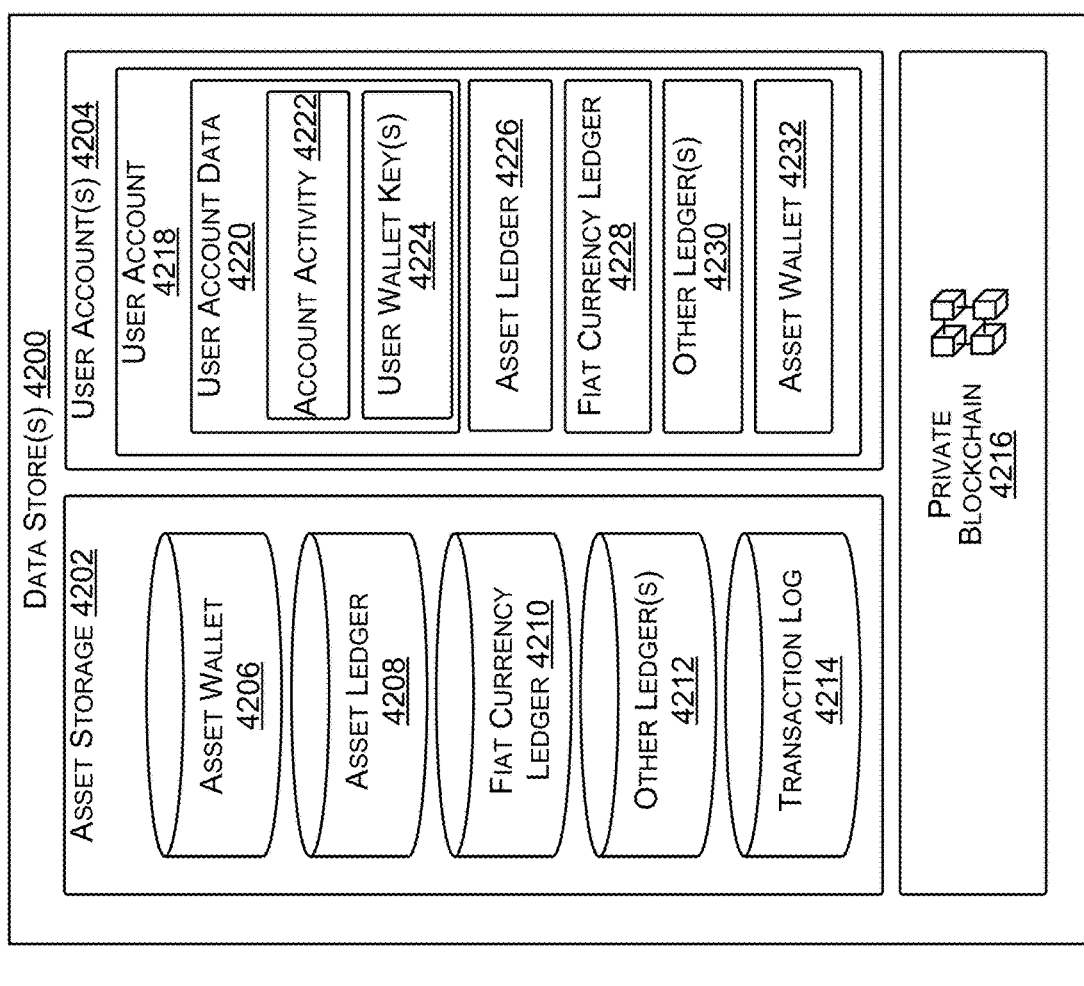
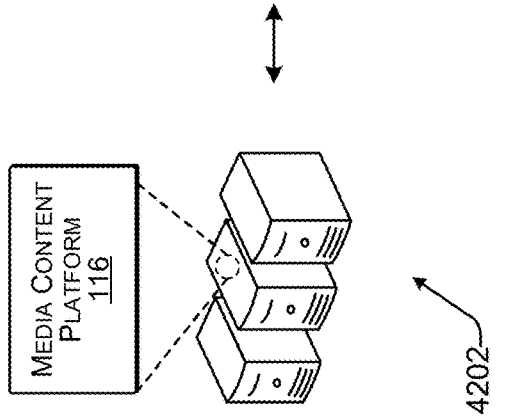
FIG. 42

MEDIA CONTENT MODIFICATION WITH ACCESS CONTROL CONFIGURATIONS

TECHNICAL FIELD

Media content platforms can be implemented as dedicated applications as well as web pages that enable entities to upload media content for access by other entities. Media content platforms fail to provide tools for entities to utilize media content in a way that efficiently utilizes the resources and data available on the media content platforms.

BRIEF DESCRIPTION OF THE DRAWINGS

FIGS. 5-36 depict non-limiting examples of user interfaces of a media content platform, according to embodiments described herein.

FIG. 37 depicts a procedure for surfacing media content for modification in an example implementation of a media content platform, according to an embodiment described herein.

FIG. 38 depicts a procedure for receiving a request from a source artist entity to make a media content item available for modification in an example implementation of a media content platform, according to an embodiment described herein.

FIG. 39 depicts a procedure for receiving a request from a derivative artist to make a derivative work available in an example implementation of a media content platform, according to an embodiment described herein.

FIG. 42 depicts an environment associated with a ledger system with which techniques for media content modification with access control configurations described herein can be implemented, according to an embodiment described herein.

DETAILED DESCRIPTION

Figure 1:
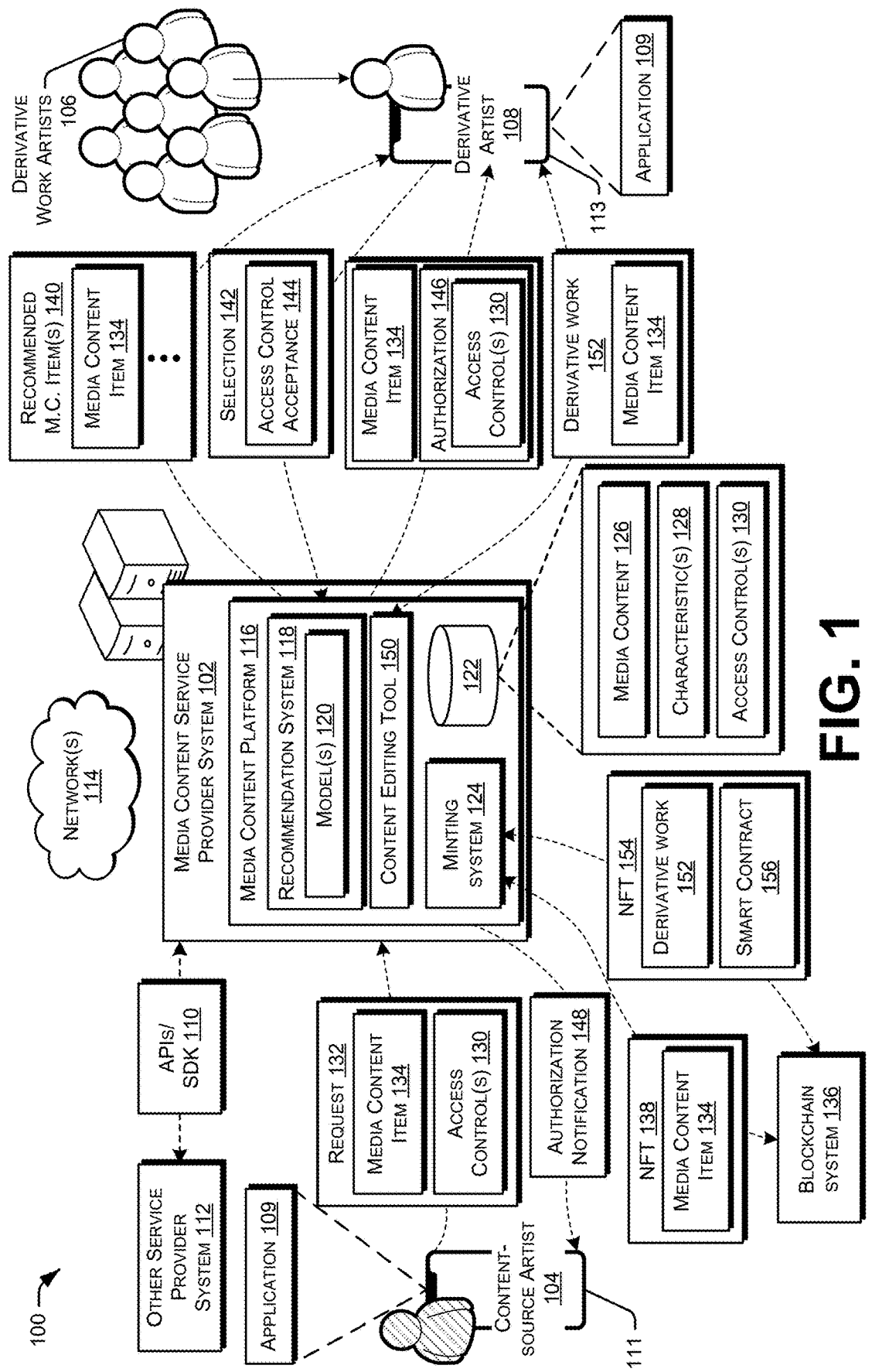
FIG. 1 depicts a block diagram of a non-limiting example environment for media content modification with access control configurations, according to an embodiment described herein.

Disclosed methods and systems include a media content platform that utilizes blockchain technology to facilitate access controls for media content items (e.g., songs, stems, vocal tracks, drumbeats, videos, images, and so on) that enable creating new, derivative works (e.g., remixes, samples, etc.) with those media content items integrated. Generally, a content-source artist entity (e.g., a rights-holding artist) directly creates one or more original media content items, whereas a content-consumer artist entity (e.g., a remix and/or sample artist entity) creates new content, at least in part, by modifying or using existing media content items created by content-source artist entities. For example, a content-consumer artist entity may select a song (or a portion of the song) to sample and/or remix in creating new content. Many content-source artist entities would like to provide access to the content-source artist entity's original media content to content-consumer artist entities to track revenue (e.g., licensing and/or royalty revenue), as well as increased exposure that may occur as a result of the content-source artist entity's original media content being included in the derivative work.

However, the creation of derivative works by content-consumer artist entities may be hindered by conventional processes involved in integrating an original media content item into a derivative work. For instance, conventional processes fail to provide content-source artist entities or other rights holders (e.g., music labels, producers, etc.) with functionality to implement access controls for content-consumer artist entities. Specifically, conventional processes rely upon computational and network resource-intensive techniques for content-consumer entities to communicate with and obtain usage rights to original media content items from content-source artist entities. For example, negotiation between a content-source artist entity and a content-consumer artist entity can involve the transmission of numerous back-and-forth and ad-hoc communications over various communication channels and/or mediums, such as email, phone, text, messenger platforms, etc., in order to establish and/or control deployment of the media content item by a creator of the derivative work (e.g., the content-consumer artist). The negotiation may further include resource-intensive electronic storage of numerous versions of an agreement. Consequently, the creative process of the content-consumer artist entity may be stifled by negotiating an agreement with the content-source artist entities before even creating a new work.

The problems with conventional systems described above deter some content-consumer artist entities from obtaining rights to media content items from content-source artist entities and/or other rights holders. Therefore, some content-consumer artist entities instead choose to remix or sample an original media content item without pre-clearance with the rights holder(s) of an original media content item. In conventional systems, computational and network resource-intensive problems continue when a content-consumer artist entity chooses to remix or sample the original media content item without pre-clearance. For example, a rights holder of the original media content item may implement numerous back-and-forth communications over various communication channels and electronic storage of communication documentation to halt use of or obtain compensation for use of the original media content item.

To this end, techniques described herein reduce the back-and-forth communication, as well as computational and network resource-intensive inefficiencies, by enabling content-source artist entities and content-consumer artist entities to provide input via interactive elements of user interfaces of a centralized media content platform. From the standpoint of a content-source artist entity, for instance, the user interfaces can enable the user to provide inputs via interactive elements to select access controls such as which portions of a media content item are being made available for derivative works, types of derivative works allowed, platforms via which the derivative works can be surfaced, and royalties to be distributed based on use of the original work and/or consumption of the derivative work. From the standpoint of a content-consumer artist entity that is using the media content in a derivative work, the user interfaces can enable the user to specify access controls regarding how the derivative work will be used/distributed, such as media type(s) of the derivative work and platforms via which the derivative work can be surfaced. Further, the content-consumer artist entity may select from available media content that matches access controls that the content-consumer artist entity has selected as filter criteria to meet the needs of the content-consumer artist entity. Media content that does not match the filter criteria may not be shown to the content-consumer artist, further reducing extraneous electronic communications that are unlikely to result in a derivative work being pre-cleared and/or generated. By reducing the number and ad-hoc nature of communications between such entities, the techniques described herein enable media content item use by a content-consumer artist entity of a derivative work without the use of, or with a reduced use of, computer processing, computer storage, and/or associated time delays relative to conventional back-and-forth communication over various channels and/or mediums. Additionally, bandwidth and storage usage are reduced as a result from the reduction of communication between entities.

Furthermore, conventional techniques for tracking how media content is used by a content-consumer artist of a digital work (e.g., in what digital formats), via which channels the derivative work is surfaced (e.g., via what social media channels, streaming platforms, in association with what brands), and the extent to which the derivative work is consumed for the purpose of distributing royalties, may also involve numerous communications between various parties as well as storage of data in an ad-hoc manner. The numerous communications and the data storage used to track the propagation of derivative works across various mediums can consume communication channel bandwidth as well as significant storage space for storing not only those communications, but also for storing the data describing use. Moreover, a source of the media content (e.g., the content-source artist entity) and a user incorporating the media content (e.g., the content-consumer artist entity) may store redundant data describing use of a content item in a derivative work and/or may store inconsistent data that parties may need to reconcile, e.g., before royalties are distributed.

Whether the content-consumer artist entity obtains rights to an original media content item, tracking use of the derivative work that contains at least a portion of the original media content item is unachievable with conventional systems. For instance, the derivative work may be deployed across numerous channels (e.g., social networking services, streaming services, etc.), to numerous devices, and so forth. Conventional systems fail to provide a mechanism for tracking such deployment and controlling access to the original media content item across numerous channels and to numerous devices, especially when a derivative work is created from the original media content item. Consequently, the content-source artist entity loses control of the content-source artist entity's work across such channels when the derivative work is deployed, as well as loss of revenue for the original media content item if the original media content item is unknowingly deployed.

The techniques described herein provide a system for associating tokens, e.g., non-fungible tokens (NFTs), with media content and/or portions of media content that is made available for derivative works via the media content platform. The NFTs associated with a media content item or a portion of a media content item may be used to track transfers of the media content item to other users, such as users that use such media content in derivative works (e.g., the content-consumer artist entities). In one or more implementations, the described techniques also involve minting an NFT for the derivative work on a blockchain, which enables use of the source media content as part of the derivative work to be programmatically tracked. Further, by implementing a smart contract-type functionality that details access controls in the NFT of the derivative work, royalties can be automatically distributed to the source of the media content (e.g., the content-source artist). This eliminates the need for the parties to exchange and store information about how and where the source media content is being used and eliminates the need for parties to track the propagation of derivative content using the works. By doing so, the described techniques reduce the use of computer processing and communication bandwidth consumed by conventional techniques in connection with exchanging communications for tracking use of media content according to the access controls. The described techniques also reduce an amount of data stored by potentially adverse parties in connection with determining how to distribute royalties, such as data describing which platforms a derivative work has surfaced on, how many users the derivative works is surfaced to, a geographic location where the derivative work is surfaced, and so on.

Although the techniques discussed herein are described in relation to "artists," the techniques are applicable to other entities, such as to facilitate the sharing of media content between various types of artists and other entities. Example entities for which the described media content platform may be useful include but are not limited to producers, distributors, labels, actors and actresses, athletes, crafts people, personalities, business people, academics, podcast hosts and/or guests, fitness personalities, merchandisers, chefs, restauranteurs, facility or venue owners/managers, fashion designers, influencers, models, and promoters, to name just a few.

FIG. 1 is a block diagram of a non-limiting example environment 100. In one embodiment, the environment includes a media content service provider system 102 and various users of the service provider system, which include a content-creating artist entity, hereafter a content-source artist 104, of a population of content-creating artist entities (not shown) and a population of derivative work-creating artist entities (e.g., content-consumer artists), hereafter derivative work artists 106, an example of which is a derivative work-creating artist entity (hereafter a derivative artist 108).

In one or more implementations, for instance, the media content service provider system 102 is, or includes, an application 109, e.g., a subscription-based digital media streaming application, which executes on a computing device (e.g., a mobile phone or other computing device) with media items stored on a remote server, such as on a server implementing and/or associated with the media content service provider system 102. In this way, the media items are either streamed offline (cached on the local computing device) or streamed online with content streaming in packets. Hence, the media content service provider system 102 may be a digital audio streaming service (e.g., for music and/or podcasts), a digital video streaming service, or a streaming service that provides streaming of various different types of digital media or multimedia. Such a streaming service may be subscription-based, so as to allow the users to stream digital media items (e.g., songs, podcasts, and/or videos) on-demand from a centralized library provided by the media content service provider system 102.

In one or more implementations, the application 109 of the media content service provider system 102, at least in part, surfaces media content (e.g., music) to the derivative work artists 106, such as media content that has been made available by the content-creating artists entities to the derivative work artists 106 for incorporation into derivative works (e.g., creations that include portions of a previously created media content, such as remixes or samples of the previously created media content). In addition to surfacing available media content, the media content service provider system 102 also facilitates providing and enforcing access controls for media content of a content-source artist 104 for use by a derivative artist 108, e.g., for incorporation into such derivative works, as discussed above and below.

Additionally or alternatively, the application 109 of the media content service provider system 102 is a content-sampling or remixing application communicatively coupled, e.g., through dedicated application programming interfaces (APIs) and/or software development kits (SDKs). For example, the non-limiting example environment 100 includes APIs/SDKs 110, which communicatively couple the media content service provider system 102 to at least one other service provider system 112 that is or deploys one or more application(s), such as a content creation application (or suite of them), streaming application, lending application, payment application, appointment application, loyalty application, and so on. The content-source artist 104 and the derivative work artists 106 (including the derivative artist 108) access the media content service provider system 102 via one or more computing devices, which execute thereon applications as described herein. In at least one implementation, the content-source artist 104 and the derivative work artists 106 (including the derivative artist 108) have user accounts with the media content service provider system 102. In at least one other implementation, one or more of those users have not signed up for user accounts with the media content service provider system 102.

In accordance with the described techniques, one or more users of the media content service provider system 102 are designated as "artists," which collectively form a population of artists (not shown). The population of artists generate media content for the media content service provider system 102, for other service providers (e.g., for one or more streaming services), for live performances, and/or for exposure to an audience in various ways. In one or more implementations, the media content service provider system 102 provides the "artist" designation to users that have provided digital evidence that those users generate media content for the media content service provider system 102, for other service providers, for live performances, and/or for exposure to an audience in various ways. In one or more implementations, the media content service provider system 102 activates the "artist" designation for a user by updating data (e.g., one or more fields) in user data maintained by the media content service provider system 102 in association with that user.

Regarding communication among the various depicted entities, the content-source artist 104 and the derivative artist 108 are depicted with respective computing devices, which represents how they and other users (e.g., other original content artists and/or other derivative artists of the population of derivative work artists 106) access the functionality of the media content service provider system 102. In particular, the content-source artist 104 is depicted with computing device 111, and the derivative artist 108 is depicted with computing device 113. The computing device 111 and the computing device 113 are both depicted including the application 109. By enabling user interaction with various user interfaces of the application 109, the computing device 111 and the computing device 113 provide the content-source artist 104 and the derivative artist 108, respectively, with access to the various functionalities of the media content service provider system 102. Without the computing device 111 and the computing device 113, the media content access provided by the media content service provider system 102, in accordance with the described techniques, is not provided to the content-source artist 104 and the derivative artist 108. This is in part because the described techniques utilize information specified by the content-source artist 104 and the derivative artist 108 through interaction with user interfaces and via information automatically (e.g., without user input) pulled from the computing devices (e.g., using one or more APIs), such as location information, listener data, and so on. The devices of the content-source artist 104 and the derivative artist 108 can be connected to each other and those of one or more other users (e.g., the derivative work artists 106 and other content-source artists), along with the media content service provider system 102 and the other service provider system 112, via one or more network(s) 114, an example of which is the Internet.

Computing devices that implement the environment 100 are configurable in a variety of ways. A computing device, for instance, is configurable as a server, a desktop computer, a laptop computer, a mobile device (e.g., assuming a hand-held configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as further described in relation to FIG. 44.

The media content service provider system 102 is depicted including media content platform 116, which includes a recommendation system 118 having one or more model(s) 120. The media content platform 116 further includes storage 122 and a minting system 124. The storage 122 is depicted storing media content 126, such as media content of the population of the content-source artists that has been made accessible by those artists to other entities, e.g., for incorporation by the derivative work artists 106 into remixes or other new, derivative creations that use sampling. The media content 126 may include audio files (e.g., songs, stems, multitracks), video files, animations, images, and/or other types of content. In the context of music, a "sample" is a reused portion of a previously created song (e.g., a mixed and mastered composition), a previously created stem (e.g., an isolated portion of the song that typically includes a single instrumentation, such as a drum stem, a vocal stem, a guitar stem, etc.), or a previously created multitrack (e.g., individual audio files within each stem, such as individual lead vocal and backing vocal tracks that may be combined in the vocal stem). Samples can be modified or used as-is in the derivative work, which has a new and distinct composition from the sample source. For example, the tempo and/or pitch of the sample may be adjusted, the sample may be looped or rearranged, and/or the sample may be otherwise manipulated in the derivative work. In contrast, a "remix" is a reconstructed and/or reimagined version of an existing song. In a remix, elements of the existing song may be rearranged, replaced, or otherwise modified. The remix may have a same or different song structure, instrumentation, melodic features, and/or tempo compared with the existing song.

The storage 122 is also depicted storing characteristic(s) 128 associated with the media content 126 and access control(s) 130 for use with the media content 126, which will be discussed in more detail below. The storage 122 may be configured in various ways to store data. For instance, the storage 122 may include or otherwise have access to one or more databases, virtual storage, and so forth.

In one or more implementations, to make media content accessible to the derivative work artists 106, a content-source artist 104 provides a request 132 to the media content platform 116 to enable access to a media content item 134 of the content-source artist 104. In the illustrated example, the request 132 includes the access control(s) 130, which control use of the media content item, e.g., by the derivative work artists 106. By way of example, the request 132 may be generated responsive to receiving user input from the content-source artist 104 via a sequence of user interfaces, which guide the content-source artist 104 through a workflow of selecting the media content item 134 (which may correspond to a portion of a media content item in one or more implementations) and defining the access control(s) 130 based on selections of one or more user interface controls, as discussed in more detail below.

It is to be appreciated that in at least one implementation, the media content item 134 is a derivative work previously created by the content-source artist 104. By way of example, the media content item 134 may be a remix or include sample(s) from media content provided by other content-source artists. Such previously created derivative works may be made available by the content-source artist 104 for use in new derivative works by the derivative work artists 106. For example, the content-source artist 104 may interact with the media content service provider system 102 as one of the derivative work artists 106, generate a derivative work using media content items surfaced via the recommendation system 118, and then provide all or a portion of the derivative work to the media content platform 116 via the request 132 in order to make the derivative work available for further remixing or sampling by the derivative work artists 106.

In one or more implementations, the media content platform 116 predictively guides the artist's selections of media content items to make available via the media content platform 116 as well as the access controls for the media content items. By way of example, the recommendation system 118 may utilize one or more models 120 to analyze the media content item 134 using machine learning to generate one or more recommended access controls 130 for the media content item 134. In addition to or as an alternative to using machine learning, the media content platform 116 includes at least one user interface that guides the content-source artist 104 through adding the access control(s) 130, such as shown in FIGS. 5-14 and described below. In at least one implementation, the recommendation system 118 may make suggestions for the access control(s) 130 based on trends, such as social network trends and the like. As an example, the recommendation system 118 may generate a recommended amount of time that the derivative artist 108 is permitted to use the media content item for sampling and/or remixing (e.g., 6 months, 1 year, or perpetual). As another example, the recommendation system 118 may generate one or more recommended platforms where the derivative artist 108 is permitted to use the media content item 134 as part of a derivative work (e.g., various social media platforms, video streaming platforms, music streaming platforms, websites or pages, and so on). As another example, the recommendation system 118 may generate one or more recommended types of media content that the media content item 134 is permitted to be incorporated into as part of the derivative work (e.g., advertisement, video, music video, television series, movie, etc.). In some implementations, the recommendation system 118 collates communications between the content-source artist 104 and the derivative artist 108 from different communication channels including, for example, social media, email, etc., and determines and/or pre-populates the access control(s) 130 according to information in the communications.

The one or more recommended access controls may then be surfaced to the content-source artist 104 via one or more user interfaces for selection by the content-source artist 104. For example, the recommendation system 118 may use machine learning to surface recommendations to the content-source artist 104 regarding media content items to make available for modification as well as recommended access controls that define how the media content items can be surfaced and used in derivative works. By way of example, the recommendation system 118 may surface a recommended period of time of 6 months to the content-source artist 104. The content-source artist 104 can then select this recommended period of time to associate this access control 130 with the media content item 134. Further, the recommendation system 118 may surface a plurality of recommended access controls for the media content item 134 (e.g., multiple durations of use) and enable the content-source artist 104 to select one or more of those access controls. Each of the one or more selected access controls is used by the recommendation system 118 to match the media content item 134 to derivative work artists 106. For example, the one or more selected access controls are presented to a derivative artist to which the media content item 134 is surfaced, and the derivative artist can select a desired access control option from the one or more access controls made available by the content-source artist 104.

The media content platform 116 thus receives the request 132 from the content-source artist 104, and the media content platform 116 enables access to the media content item 134. By way of example, the media content platform 116 surfaces the media content item 134 to client devices of users of the media content platform 116, e.g., users with sufficient permission(s) and based on the access controls 130. For example, the media content platform 116 generates a listing of the media content item 134, which is listed on the media content platform 116 with listings for a plurality of other media items, e.g., other media items of the content-source artist 104 and/or other artists. In one or more implementations, the media content platform 116 surfaces various listings (e.g., displays them) to users (e.g., one or more of the derivative work artists 106) as recommendations, enables users to search the listings for media content items (e.g., by artist, by title, by genre, access control(s) 130, or other characteristic(s) 128 of the media content items), enables users to search and/or browse the listings based on stem type (e.g., vocal track, drum track, guitar track, etc.), enables users to browse the listings of media content items, categorizes listings of the media content items, and so forth. In other words, the media content platform 116 may receive search terms from a user device, and accordingly filter which listings are surfaced to the user device. In some implementations, the search terms may correspond to access controls, and thus the media content platform 116 may provide relevant listings based on one or more desired access controls received from a derivative work artist.

In accordance with the described techniques, the media content platform 116 associates the media content item 134 with one or more of the characteristic(s) 128. Examples of the characteristic(s) 128 include, but are not limited to, artist (e.g., name), title (e.g., of the media content item), description (e.g., as provided by the artist or another entity associated with the artist, such as a manager or agent), genre, instrumentation, beats per minute, mood, the presence or absence of lyrical content, actual lyrics, subject of the media content (e.g., lyrical or visual subject matter), the presence or absence of instrumental content, length of media content item, format, language, and presence or absence of "explicit" subject matter, to name just a few. In one or more implementations, the media content platform 116 associates the media content item 134 with one or more of the characteristic(s) 128 using one or more machine learning models, such as natural language processing (NLP) models, audio signal processing models, image processing models, and so on. In at least one variation, the media content platform 116 may maintain data (e.g., metadata) and/or implement some mechanism that persists associated characteristics with respective media content items.

Additionally, the media content platform 116 associates the media content item 134 with the access control(s) 130, which may include one or more terms in various scenarios. Broadly, the access control(s) 130 control use of the media content item 134 and a derivative work that incorporates the media content item 134, such as created by an entity (e.g., a derivative artist 108) that acquires the media content item 134 for modification. For example, the access control(s) 130 are included as part of and/or define a license for use of the media content item 134 by the derivative artist 108 in a derivative work. Examples of the access control(s) 130 include, but are not limited to, an amount of time an entity (e.g., the derivative artist 108) is permitted to use the media content item 134 (e.g., as part of a derivative work) i.e., a "duration", one or more locations (e.g., countries, states, cities, or other definable geographic regions) where the entity is permitted to use the media content item 134, a type of modification that can be performed on the media content item 134 to generate a derivative work (e.g., remixing and/or sampling), a type of media within which the media content item 134 is permitted to be incorporated via a derivative work (e.g., sample, remix, advertisement, video, music video, television series, movie, etc.), platforms via which a derivative work incorporating the media content item 134 is permitted to be surfaced (e.g., various social media platforms, video streaming platforms, music streaming platforms, websites or pages, and so on), a subject matter of a derivative work that incorporates the media content item 134 that is permitted (e.g., political content or alcohol content) and/or not permitted (e.g., sexual content or controlled substance content), and whether the entity is permitted to "publicly perform" a derivative work that includes the media content item 134, to name just a few. An additional example of the access control(s) 130 includes royalties or another form of compensation that will be owed to the content-source artist 104 from monetization or deployment of derivative works created by the derivative work artists 106, including additional derivative works created therefrom, and any fees for use of the media content item 134. It is to be appreciated that when the media content item 134 is itself a derivative work, the access control(s) 130 may encompass and/or affect terms of the media content item(s) included therein. In other words, an access control that is implemented in an original work may carry "downstream" to a first derivative work that incorporates the original work, as well as to a second derivative work that incorporates the first derivative work, and so forth.

In one or more implementations, the recommendation system 118 uses the model(s) 120 to generate recommendations regarding a monetary value (e.g., a per-use fee, access fee, and/or royalty payout) of the media content item 134, which may be included in the access control(s) 130. For example, the recommendation system 118 may output, via a user interface, a lowest recommended value (e.g., a floor value) for the media content item 134 and/or a predicted market rate for the media content item 134. By way of example, the monetary values recommended for media content items created by popular, well-known artists may be greater than those created by up-and-coming or lesser-known artists. As another example, a royalty payout may increase as a percentage or portion of the derivative work that utilizes the media content item 134 increases. As yet another example, the royalty payout may increase as a percentage or portion of the media content item 134 that is used in the derivative work increases. Additionally or alternatively, the recommendation system 118 may use the model(s) 120 to generate recommendations for media content packages, prices of the media content packages, and so forth. A media content package may include a plurality of stems that can be used together or separately in one or more derivative works. By way of example, the media content package may be a drum beat package that includes various beat patterns, drum sounds (e.g., woodblock, tambourine, snare drum, triangle, high hat, etc.), and the like of a particular drumming style (e.g., type of rhythm) or genre of music.

In at least one implementation, the recommendation system 118 may implement a dynamic pricing structure, where a price of the media content item 134 for entering into new authorization agreements fluctuates based on market factors. The market factors may include, for example, a demand for the type of media content of the media content item 134, a popularity of the content-source artist 104, and so forth. By way of example, after the media content item 134 is made available on the media content platform 116, the recommendation system 118 may utilize the model(s) 120 to adjust the monetary value for new authorization agreements for the media content item 134. However, in some examples, the monetary value may remain above the floor value set by the content-source artist 104. Alternatively or additionally, a subsequent change in pricing may not affect access control(s) 130 that have already been accepted by the derivative artist 108.

In one or more implementations, the media content platform 116 associates the access control(s) 130 with the media content item 134 responsive to receiving the request 132. For instance, the media content service provider system 102 associates the access control(s) 130 with the media content item 134 as part of listing the media content item 134 on the media content service provider system 102, such that a listing of the media content item 134 surfaced to the derivative work artists 106 includes the access control(s) 130. In at least one variation, the media content platform 116 may maintain data (e.g., metadata) and/or implement a mechanism that persists associated access controls with respective media content items.

As will be elaborated herein, the media content platform 116 may utilize non-fungible tokens (NFTs) and a blockchain system 136 to track usage of media content items in derivative works. In accordance with the described techniques, the media content platform 116 includes a variety of functionality for creating NFTs and executing transactions involving NFTs, e.g., minting NFTs, creating smart contracts with different terms (e.g., royalties and/or fractional ownership structures and rules) to govern transactions involving an NFT, initiating execution of smart contracts encoded by NFTs, and so forth.

In the example illustrated in FIG. 1, the media content platform 116 includes the minting system 124, which is configured to "mint" NFTs. In one or more variations, the minting system 124 is included in the at least one other service provider system 112 and accessed by the media content service provider system 102 via the APIs/SDKs 110. To mint an NFT, the minting system 124 causes the NFT to be created on a blockchain of the blockchain system 136 and programmatically encodes, or encodes an association of, the corresponding media content item with the NFT. As elaborated herein, the minting system 124 is configured to mint NFTs for the media content item 134 and/or derivative works created using the media content item 134. In the depicted non-limiting example environment 100, the minting system 124 is shown generating an NFT 138 in association with the media content item 134. That is, the minting system 124 programmatically encodes a unique identity of the media content item 134 that enables usage of the media content item 134 to be digitally tracked and programmatically encodes an association of the media content item 134 with the NFT 138. By way of example, NFT 138 generated by the minting system 124 may programmatically encode an association of the metadata for the media content item 134 with the NFT 138. The metadata for the media content item 134 may include a fingerprint (e.g., a music fingerprint) of the media content item 134 (e.g., a spectrogram of the media content item 134 that includes a time-frequency representation of the audio contained therein), a description of the media content item 134, information regarding the content-source artist 104, a digital record of transactions involving the media content item 134, the access control(s) 130 associated with the media content item 134, a storage location of the media content item 134, and/or public addresses of wallets (e.g., digital wallets, such as blockchain-based wallets) of those who have been authorized to use and/or distribute the media content item 134, to name just a few. In one or more implementations, information, or portions of the information, encoded into the NFT 138 may be based on user input to enter the information, e.g., via a user interface of the media content platform 116 in connection with submitting the request 132. For example, the content-source artist 104 selects the access control(s) 130 via a user interface of the media content platform 116, and the selected access control(s) 130 are programmatically encoded with the media content item 134 in the NFT 138.

Accordingly, in such examples, the access control(s) 130 may be triggered and executed without further input from the content-source artist 104 in order to prevent unauthorized use of the media content item 134 and so forth.

The minting system 124 may encode an association of this metadata with the NFT 138, for example, by encoding the actual data (e.g., the audio fingerprint and/or the digital content) in the NFT 138, encoding unique identifiers of the actual data in the NFT 138, and/or encoding one or more addresses where such data is located (e.g., a storage location) in the NFT 138. In operation, the minting system 124 provides data as specified by a token standard associated with the blockchain system 136. For example, the minting system 124 packages and communicates the actual metadata to be encoded and/or packages and communicates the association (e.g., identifier and/or addresses) to be encoded according to the token standard. Additional details regarding the blockchain system 136 and minting NFTs are provided herein, for example, with respect to FIG. 4.

By using the NFT 138, a provenance of the media content item 134 is also tracked. For example, a transfer of the media content item 134 cannot occur, due to programmatic features of NFTs, without the transfer being digitally recorded. As such, the NFT 138 may enable the media content platform 116 to track subsequent usage of the media content item 134 more easily (e.g., by the derivative work artists 106). It is to be appreciated that in variations, the NFT 138 is not minted for the media content item 134, and the media content item 134 is instead tracked based on its inclusion in a derivative work for which an NFT is minted, as will be elaborated below.

In accordance with the described techniques, the media content platform 116 surfaces one or more media content items to the derivative work artists 106. For example, the media content platform 116 surfaces listings to the derivative work artists 106 via an interface of the media content platform 116, where the listings each list a respective media content item made accessible on the media content platform 116 by a respective artist entity (or by an entity associated with the artist entity). For instance, the media content platform 116 surfaces listings for such media content items to the derivative work artists 106 via a user interface of the media content platform 116 based on the derivative work artists 106 signing into the media content platform 116, launching or opening an application of the media content platform 116, providing user input via a user interface of the media content platform 116 to recommend media content items for use in a derivative work, providing user input via a user interface of the media content platform 116 to search for media content items, and so forth. In the context of interactions with an individual derivative artist, consider the following discussion in relation to the derivative artist 108.

In accordance with the described techniques, the media content platform 116 may surface recommended media content item(s) 140 (which may be referred to in one or more figures as recommended M.C. item(s) 140) to the derivative artist 108. The recommended media content item(s) 140 include the media content item 134 from the content-source artist 104. The recommended media content item(s) 140 may be surfaced to the derivative artist 108, for instance, via a user interface of the media content platform 116 and responsive to various actions of the derivative artist 108 with the media content platform 116, such as one or more of the actions described above, e.g., opening an application, requesting a recommendation of media content items, searching for media content items, and so on.

Alternatively or in addition, the media content platform 116 may process data associated with the derivative artist 108 and/or the content-source artist 104 and, based on the processing, generate and surface the recommended media content item(s) 140 automatically (e.g., without input from the derivative artist 108), such as based on the data indicating satisfaction of one or more thresholds. Examples of such thresholds include an amount of time without interacting with the platform, a number of times media content items have been recommended to other derivative work artists 106, a threshold amount of consumption of an artist's media content (e.g., above or below the threshold), a prediction that generating a derivative work that includes the media content item 134 of the content-source artist 104 (and/or other artists) will likely result in a metric (e.g., number of listens or views of the derivative work) that satisfies a threshold, and so forth. Recommended media content item(s) 140 may be communicated to the derivative artist 108 from the media content platform 116 or generated automatically responsive to a variety of triggers without departing from the spirit or scope of the described techniques.

The media content platform 116 may surface notifications to devices of the derivative work artists 106 without receiving an explicit request for media content items for use in derivative work in a variety of other instances as well, such as a "match score" between an artist and a derivative artist being above a threshold score. In examples, the match score may correspond to one or more of a popularity of the content-source artist 104 and/or the derivative artist 108, a genre of the content-source artist 104 and a genre of the derivative artist 108, a likelihood of the derivative artist 108 to use media content items of other artists in derivative works, and so on. The media content platform 116 may provide a notification recommending media content items in a web browser or an application associated with the media content platform 116 executing on a device of the derivative artist 108, as a push notification, and so forth. The media content platform 116 may provide a notification recommending media content items in other ways without departing from the spirit or scope of the described techniques, such as via an automated voice message, a text message, an email, and so forth.

In one or more implementations, the recommended media content item(s) 140 are generated using the model(s) 120 of the recommendation system 118. In one or more implementations, the recommendation system 118 determines a fingerprint for a recommendation of media content items to the derivative artist 108 and/or underlying data associated with providing a recommendation, such as derivative artist data, derivative work data (e.g., describing the derivative work being created by the derivative artist 108 and/or previously created derivative works associated with the derivative artist 108), content-source artist data, audio, and video data. In one or more implementations, this underlying data is obtained through a capture device, an example of which is a computing device of the derivative artist 108, which may track activity of the derivative artist 108, such as across different communication channels (e.g., text, email, computer applications, calendar, social networks, an application of the media content platform 116) that can indicate a purpose or sentiment associated with obtaining a media content item, using a camera of the computing device, using location tracking capabilities of the computing device, using sound capturing an interpretation functionality of the computing device, using touch and/or gesture tracking functionality of the computing device, and so forth. This recommendation fingerprint can be compared with one or more fingerprints in a database with representative media content items (or portions of media content items) to identify a match, e.g., at the time when the fingerprint is generated. Matches need not be exact in various implementations, due to differences in levels, extraneous noise, imprecise or uncorrelated start times, etc., but may be considered to be matching if the two fingerprints correspond above a threshold. In other implementations, the recommendation system 118 may compare the generated fingerprint to other fingerprints over a prior period, such as a five-minute period. The recommendation system 118 may use any type of analysis to compare fingerprints, including principle component analysis (PCA), Latent Dirichlet allocation (LDA), or any other such statistical analysis methods. In some implementations, the recommendation system 118 may generate match scores for the match of a derivative artist fingerprint to other fingerprints in the database, and identify as matching a fingerprint with a highest match score. In a further implementation, the recommendation system 118 may adapt match scores based on historical data associated with a client device of the derivative artist 108, such as based on communications happening on a communication channel or other actual derivative works generated by the derivative artist 108 and other derivative work artists 106 and/or content-source artists. Examples of actual communications which may be described by historical data to determine a match include, but are not limited to, liking a post or responding to a message, sentiment(s) of one or more messages (e.g., positive, neutral, or negative) between the derivative artist 108 and other entities using natural language processing, etc.

In one or more implementations, the recommendation system 118 determines which media content items of the media content 126 to recommend to the derivative artist 108 (e.g., including the media content item 134 of the content-source artist 104) by using the model(s) 120. In one or more implementations, the model(s) 120 include one or more machine learning models, examples of which include neural networks, natural language-based models, regression models, graph networks, convolutional neural networks, reinforcement learning models, classifiers, autoencoders, structured models, unstructured models, and so on. The model(s) 120 may be configured as, or include, other types of models without departing from the spirit or scope of the described techniques. These different models may be built or trained (or the models otherwise learned), respectively, using different data and different algorithms due, at least in part, to different architectures and/or learning paradigms.

The particular model(s) 120 used to generate the recommended media content item(s) 140 may depend at least in part on a context of surfacing a recommendation to the derivative artist 108. For example, the derivative artist 108 may specify one or more characteristics or terms of media content that the derivative artist 108 is searching for to use in a derivative work. For instance, the derivative artist 108 may specify a particular genre, instrumentation, beat structure, and so forth. As noted above, the recommended media content item(s) 140 may be surfaced to the derivative artist 108 automatically and without express user input requesting the recommended media content item(s) 140, and in such cases, a context of the recommendation may be different than if expressly requested by the derivative artist 108. Regardless, the derivative artist 108 may wish to use media content in one or more derivative works for various reasons without departing from the spirit or scope of the described techniques, and the media content platform 116 may present a user interface to the derivative artist 108 that allows the derivative artist 108 to specify one or more desired characteristics of a media content item to use in a derivative work.

In some examples, a request for recommended media content items may include one or more natural language inputs indicating reason(s) that the derivative artist 108 is looking for media content items, and the model(s) 120 may be configured in such cases to parse and interpret the natural language input using natural language processing to match items of the media content 126 with the derivative artist 108, e.g., using "fuzzy matching." The model(s) 120 selected for use to generate the recommended media content item(s) 140, from the available model(s) 120, may be based on the specified reasons or other reasons, such as a type of derivative work, genre of the derivative work, and so on.

As input, the model(s) 120 may be configured to receive a variety of data to generate the recommended media content item(s) 140. To this end, the model(s) 120 may also be trained using a variety of data. For example, the model(s) 120 may be trained using the media content 126, the characteristic(s) 128, and/or the access control(s) 130. For example, the model(s) 120 may be trained based on sound characteristics. In this way, the model(s) 120 may be trained to determine sounds that are similar to input sounds (e.g., from music selected by the derivative artist 108 as a search query), sounds that match input search terms, sounds that are complementary with a sample derivative work or previous derivative works provided by the derivative artist 108, sounds that if combined with a partial derivative work of the derivative artist 108 would yield a derivative work similar to popular derivative works or would yield a derivative work that an audience (e.g., one or more market segments) is predicted to like, and so forth.

Alternatively or in addition, the model(s) 120 may be trained based on access control acceptance, e.g., whether the derivative artist 108 and/or other derivative work artists 106 have accepted various access controls historically. Accordingly, such a model may predict access controls that the derivative artist 108 (or one of the derivative work artists 106) is likely to accept in connection with a given media content item 134. In one implementation, an affinity engine (not shown) can be used to determine similarity with the derivative artist 108 to generate a list of similar derivative work artists 106, content-source artists, media content items, genres, or access controls, e.g., based on the derivative artist 108's ratings of items of the media content 126, historical preferences, media content use data (e.g., use of previous media content items in derivative works), and/or explicit and/or implicit user behavior. Additionally, in at least one implementation, an affinity calculation can create exclusion rules, e.g., ignore from the list the top N most popular media content items (or artists, albums, genres) when calculating a similarity between a derivative artist and a media content item and/or content-source artist. Similarly, the affinity engine can create preference rules, e.g., to accept certain content-source artists who provide derivative work-friendly access controls associated with media content items and/or have provided media content items which have been observed in use with successful derivative works (in terms of one or more performance metrics). Additionally or alternatively, the affinity engine can approach affinity by highlighting the dissimilarities, e.g., instances where a derivative artist has never used a media content item of a content-source artist.

Additionally or alternatively, during training of the model(s) 120, editorial pairs of a derivative work and an incorporated media content item, where the derivative work includes the incorporated media content item, may be used as a ground truth for the recommended media content item(s) 140 provided by the model(s) 120, such that during training, the outputs of the model(s) 120 are compared to the pairs. In one or more implementations, the editorial pairs may include historical derivative works, pairs recommended by "experts" in the artistic field (e.g., managers, label heads, producers, etc.). Such editorial pairs may correspond to "acceptable" pairs of derivative works and incorporated media content items, e.g., the derivative works that have met the streaming metrics set by a content-source artist or derivative artist or a third party and/or recommended by artistic experts. Thus, during training, the output of the model(s) 120 may be "rewarded" when the output corresponds to acceptable pairs, such as by adjusting internal weights of the models to encourage such output and/or reinforce underlying policies (e.g., of a reinforcement model). The training may also use "unacceptable" pairs of derivative works and incorporated media content items during training. For example, when the output of the model(s) 120 corresponds to unacceptable pairs of derivative works and incorporated media content items during training, the model(s) 120 may be "penalized," such as by adjusting the internal weights to discourage such output and/or to penalize the underlying policies (e.g., of a reinforcement model). The training data comprising "unacceptable" pairs may include derivative works that did not meet streaming metrics, derivative works indicated as bad by artistic experts, and so forth. In one or more implementations, the output of the model(s) 120 during training (and subsequent retraining of the model(s) 120) is compared to training data which comprises acceptable and unacceptable pairs of derivative works and incorporated media content, where pairs of the derivative works and incorporated media content in the training data may be labeled as such, e.g., "acceptable" or "unacceptable."

In one or more implementations, relevancy scores output by the model(s) 120 correspond to a predicted likelihood that use of the media content item 134 by the derivative artist 108 in a derivative work of media content (not shown) would produce some number of views, downloads, streams, amount of conversion, etc. of the derivative work. In at least one variation, higher relevancy scores (e.g., 1, or closer to 1) indicate a prediction that use of the media content item 134 by the derivative artist 108 in a derivative work will result in more views, downloads, streams, amount of conversion, etc. Further, lower relevancy scores (e.g., 0, or closer to 0) may indicate a prediction that use of the media content item 134 by the derivative artist 108 in a derivative work will result in fewer views, downloads, streams, amount of conversion, etc.

In one or more implementations, the recommendation system 118 uses the model(s) 120 to generate a relevancy score for one or more media content items associated with the access control(s) 130 that increase the likelihood of use of the respective media content item for one or more uses specified by the derivative artist 108 in connection with a given derivative work. For example, the recommendation system 118 may deterministically remove from consideration media content items having access controls that specify a shorter amount of time for use than the derivative artist 108 specifies is desired in connection with a derivative work. This prevents items of the media content 126 that do not satisfy one or more threshold metrics from being recommended to the derivative artist 108. The one or more media content items recommended to the derivative artist 108 in the recommended media content item(s) 140 may be further filtered. For example, the one or more media content items recommended to the derivative artist 108 may be filtered by selecting a number of top media content items (e.g., the top 3 media content items on relevancy scores, the top 5 media content items based on relevancy scores, and so forth), by selecting media content items that satisfy a threshold relevancy, and so forth. Those media content items are then included in the recommended media content item(s) 140 and surfaced to the derivative artist 108, e.g., via a user interface.

In at least one implementation, the media content platform 116 promotes and/or features new and upcoming artists by surfacing such artists' content to the derivative artist 108. By way of example, the media content platform 116 may select or otherwise designate particular artists as new and upcoming based on artist data associated with respective artists and curate a library of media content items created by the new and upcoming artists that can be authorized for modification by the derivative work artists 106. The artist data may include, for example, a number and identity of media content items created by the artist, a popularity of each media content item (e.g., a number of plays, a chart ranking, sales), a publishing company (e.g., record label) associated with the artist, status measures (e.g., awards won by the artist or other performance measures), and the like. The library may be surfaced to the derivative artist 108 as part of the recommended media content item(s) 140 or in addition to the recommended media content item(s) 140. Moreover, the media content platform 116 may invite rising artists within the derivative work artists 106 to create new, derivative works using media content items from the library. In this way, the media content platform 116 may promote independent publishing companies and less established artists.

In accordance with the described techniques, the derivative artist 108 provides a selection 142 of the media content item 134 via a user interface. This may include an access control acceptance 144, which accepts the access control(s) 130 associated with the media content item 134. In one or more implementations, the selection 142 and/or the access control acceptance 144 are received via a user interface of the media content platform 116 (or a series of user interfaces), as described in more detail below. In at least one variation, the user interface presents various access control or a range of access controls for the media content item 134 that the content-source artist 104 indicated are acceptable for use of the media content item 134. By way of example, the content-source artist 104 may specify, via a user interface of the media content platform 116, that use of at least a number of months (e.g., 3 months) is permitted, and the media content platform 116 may present via a user interface to the derivative artist 108 numerous options for using the media content item 134 for the number of months or longer (e.g., a 3-month use, a 6-month use, a 12-month use, unlimited time use, and so on). Additionally or alternatively, the content-source artist 104 may specify, via a user interface of the media content platform 116, a number of usages of the media content item 134 by the derivative artist 108 that is permitted (e.g., incorporation into one derivative work, 2 derivative works, 3 derivative works, unlimited usages, and so on). In this example, the derivative artist 108 may be able to accept any of the plurality of options, each of which are permitted according to the access control(s) 130 specified by the content-source artist 104. Accordingly, selecting one of these options by the derivative artist 108 may correspond to acceptance of at least one of the access control(s) 130. Indeed, the derivative artist 108 may accept the access control(s) 130 specified by the content-source artist 104 for the media content item 134 in a variety of ways without departing from the spirit or scope of the techniques described herein. Moreover, accepting one or more of the access control(s) 130 may serve as a request by the derivative artist 108 to modify the media content item 134 according to the selected access control(s) 130. Once transmitted over the network(s) 114, the media content platform 116 thus receives the selection 142 of the media content item 134 along with the access control acceptance 144.

Based on this, the media content platform 116 generates an authorization 146 for use of the media content item 134 which includes the access control(s) 130. In particular, the authorization 146 is generated by the media content platform 116 to permit the derivative artist 108 (or an entity corresponding to the supervisor) to use the media content item 134 according to the access control(s) 130 of the authorization 146. The media content platform 116 provides the authorization 146 to the derivative artist 108. For example, the media content platform 116 communicates a document and/or some other digital mechanism (e.g., a smart contract) corresponding to the authorization 146 to the derivative artist 108. Alternatively or additionally, the media content platform 116 presents the authorization 146 (and/or the access controls of the authorization) to the derivative artist 108 via a user interface. Thus, the derivative artist 108 receives access to the media content item 134 of the content-source artist 104 (e.g., for use in a derivative work) from the media content platform 116, along with the authorization 146 which meets the access control(s) 130 specified by the content-source artist 104 for using the media content item 134.

The illustrated example also includes an authorization notification 148. In one or more implementations, the media content platform 116 provides the authorization notification 148 to the content-source artist 104. The authorization notification 148 indicates that the media content item 134 has been authorized for modification, e.g., by the derivative artist 108 agreeing to the access control(s) 130 defined by the content-source artist 104. In at least one variation, the media content platform 116 provides a dashboard (e.g., via a user interface) to the content-source artist 104, which provides a status of one or more of the content-source artist 104's media content items (e.g., in terms of authorization for use in derivative works). By way of example, the media content platform 116 provides a dashboard that lists the media content items which the artist has requested to list on the media content platform 116, e.g., as being available for one or more derivative work artists 106 to use in derivative works. In one or more implementations, the dashboard may also indicate media content items of the content-source artist 104 which are electronically visible (e.g., known) to the media content platform 116 but are not listed for use. Such a dashboard may provide various information about the status of listed items, examples of which include an indication of whether a media content has been permitted for use by a derivative artist, a number of derivative artists permitted to use the media content item, a number of permitted (e.g., authorized) usages for the item, an amount of money obtained as a result of authorizations generated for the media content item, expirations of authorizations for a media content item, a popularity of a media content item for modification, a prediction or rating of how a media content item would perform if made available for modification and/or if the control(s) 130 for the item were changed (e.g., to be less stringent or more stringent), recommendations for adjusting the control(s) 130, recommendations for authorizing different portions of a media content item (e.g., if a limited portion of the media content item is authorized for modification), and so forth.

In one or more implementations, the media content platform 116 further includes a content editing tool 150. In one or more implementations, the content editing tool 150 is a third-party tool (e.g., content creation and/or editing application or a suite of such applications), such as one provided by another service provider system. The content editing tool 150 may be a remixing and/or sampling tool, for example, that the derivative artist 108 may interact with during creation of a derivative work 152 and that incorporates at least a portion of the media content item 134 in a modified format. That is, some or all of the media content item 134 is incorporated in the derivative work 152, which includes additional or different musical characteristics from the media content item 134. By way of example, the additional or different musical characteristics include additional or different instrumentation, song structure, lyrics, tempo, melody, rhythm, and/or pitch. The content editing tool 150 may receive user input from the derivative artist 108 via a user interface of the media content platform 116, for example, that enables the derivative artist 108 to make modifications to the media content item 134 (e.g., splicing, tempo changes, pitch changes, compression, effects such as reverb and distortion, and so forth) as well as compose or upload additional media content to generate the derivative work 152. The derivative artist 108 may use other content (e.g., audio) editing programs in addition to or as an alternative to the content editing tool 150 of the media content platform 116.

In one or more implementations, the media content platform 116 receives the derivative work 152 from the derivative artist 108 (e.g., via the content editing tool 150). In at least one variation, for instance, the access control(s) 130 may specify that the derivative artist 108 submits the derivative work 152 to the media content platform 116. Alternatively, the content editing tool 150 generates the derivative work 152 directly. In some cases, the media content platform 116 verifies that the derivative work 152 has incorporated the media content item 134. For example, the media content platform 116 may compare musical characteristics (e.g., using machine learning) from the media content item 134 and the derivative work 152 and determine that there is a match between one or more of the musical characteristics. If the media content platform 116 determines that the media content item 134 has not been incorporated into the derivative work 152, the media content platform 116 may forego executing one or more of the access controls 130 in association with the derivative work 152. However, if the media content platform 116 determines that the derivative work 152 does incorporate the media content item 134, the access controls 130 associated with the media content item 134 are associated with the derivative work 152 as described above and below.

Upon receiving the derivative work 152 from the derivative artist 108 or generating the derivative work 152 via the content editing tool 150, the minting system 124 mints an NFT 154 associated with the derivative work 152 that controls the use of the derivative work 152 based on the access control(s) 130. By way of example, the access control(s) 130 may specify exclusive streaming rights of the derivative work 152 at the media content platform 116 for a specified duration (e.g., 3 months, 6 months, 12 months, or another duration). As another example, the NFT 154 may enable the media content platform 116 to manage royalties for underlying rights holders (e.g., the content-source artist 104 and the derivative artist 108) via a smart contract 156 on the blockchain system 136. By way of example, the smart contract 156 includes the access control(s) 130 of the authorization agreement between derivative artist 108 and the content-source artist 104 directly written into lines of code that are stored across the blockchain system 136. The code automatically executes, controls, and/or documents events and actions surrounding the derivative work 152 according to the access control(s) 130.

In at least one implementation, the smart contract 156 controls a multi-sync wallet that receives and disburses royalties (e.g., payments for revenue generated by streaming, purchasing, etc. of the derivative work 152) to the content-source artist 104 and/or the derivative artist 108 (as well as any other rights-holding entities of the derivative work 152) according to the access control(s) 130. For example, the multi-sync wallet may directly or indirectly receive revenue payments and programmatically disburse the payments to the content-source artist 104 and the derivative artist 108 (e.g., via digital wallets of the content-source artist 104 and the derivative artist 108) according to percentages or fixed values defined in the access control(s) 130 and without additional user interaction to initiate the disbursement or the allocation. As such, the smart contract 156 reduces accounting steps compared with conventional accounting systems, reduces data stored using conventional accounting techniques, and reduces network transmissions that are required by conventional accounting systems.

In this way, the NFT 154 enables the derivative work 152 to be accurately and automatically tracked without additional user input from either the content-source artist 104 or the derivative artist 108. It is to be appreciated that the derivative work 152 may be associated with a plurality of NFTs, such as the NFT 154 for the derivative work 152 itself, the NFT 138 for the media content item 134 included in the derivative work 152, and NFTs for any other media content items (or portions thereof) included in the derivative work 152. Accordingly, any of the access control(s) 130 included in smart contracts of any media content items (or portions thereof) may be triggered and executed without further input from rights holders to the derivative work 152, including to pay royalties to the rights holders, prevent unauthorized use of the derivative work, and so forth.

In the non-limiting example environment 100, the NFT 154 is depicted being programmatically recorded to the blockchain system 136 from the media content platform 116. Additionally or alternatively, the media content platform 116 may provide the derivative work 152 to one or more entities, media content platforms (e.g., streaming platforms, social media platforms, etc.), databases (e.g., the storage 122), and so forth. By way of example, the media content platform 116 may make the derivative work 152 having the programmatically encoded NFT 154 accessible to listeners via a music streaming application or user interface of the media content service provider system 102.

In at least one variation, the derivative artist 108 receives the media content item 134 prior to receiving the authorization 146. By way of example, the media content platform 116 receives the derivative work 152 and identifies media content included therein and generates the access control(s) 130 accordingly. For example, the media content platform 116 may be configured to parse the derivative work 152, detect the underlying and unique media content portions within the derivative work 152, and identify the rights-holding artists of the unique media content portions, an example of which is the media content item 134. That is, the recommendation system 118 may utilize one or more models 120 that analyze the derivative work 152 using machine learning to generate one or more recommended access controls 130 based on usage of the media content item 134 that is detected by the model(s) 120 in the derivative work 152 (e.g., a portion of the media content item 134 used, a portion of the derivative work 152 that includes the media content item 134, and so forth), a monetary value of the media content item 134 (e.g., as suggested based on a popularity of the content-source artist 104 and/or the media content item 134), and/or other term(s) that dictate how the derivative work 152 is to be surfaced and how the content-source artist 104 is to be compensated. Additionally or alternatively, the recommendation system 118 may detect the underlying and unique media content portions within the derivative work 152, including the media content item 134, using NFTs associated with those media content portions (e.g., the NFT 138).

In at least one variation, the access control(s) 130 enable the media content item 134 to be provided to the derivative artist 108 prior to receiving the access control acceptance 144 provided that derivative works using the media content item 134 are not publicly released prior to receiving the access control acceptance 144. By way of example, the media content platform 116 may surface the media content item 134 to the derivative artist 108, and the derivative artist 108 may create the derivative work 152 utilizing at least a portion of the media content item 134, which is received by the media content platform 116. In at least one implementation, the media content platform 116 is configured to detect usage of the media content item 134 even when the media content item 134 is not obtained from the media content platform 116 itself, such as when the derivative artist 108 receives the media content item 134 directly from the content-source artist 104 or from another platform.

Once the derivative work 152 is received, the media content platform 116 may present the access control(s) 130 to the derivative artist 108 via a user interface. As also described above, in at least one variation, the user interface presents various access controls or a range of access controls for the media content item 134 that the content-source artist 104 indicated are acceptable for use of the media content item 134. Based on receiving the access control acceptance 144 from the derivative artist 108, the media content platform 116 generates the authorization 146, provides the authorization 146 to the derivative artist 108, and provides the authorization notification 148 to the content-source artist 104. By enabling the derivative artist 108 to create the derivative work 152 prior to receiving the authorization 146 for the media content item 134, the derivative artist 108 may try out media content items without committing to the access control(s) 130, which may enhance a creative process of the derivative artist 108. Additionally, enabling the derivative artist 108 to try out media content items without first committing to an agreement reduces resource-intensive communications between the derivative artist 108 and the content source artist 104 (or other rights holders) that are common in conventional systems that implement an "agreement first" approach.

In the context of users of the media content platform 116 that are permitted to list media content 126 with the media content platform 116, such that media content created by the users is surfaced, e.g., to the derivative work artists 106, consider the following discussion.

In one or more implementations, in order for a user to become designated as a content-source artist 104 with the media content service provider system 102, the user onboards or "registers" with the media content service provider system 102. To register to become a content-source artist 104, for instance, a user may provide registration data to the media content service provider system 102. The media content service provider system 102 may limit which users are qualified to be designated as content-source artists based on the registration data. In one or more instances, for example, the media content service provider system 102 may deny a user permission to access the media content platform 116 based on the registration data and, as a result of such denial, the media content service provider system 102 may not designate the user status as an artist.

In one or more implementations, the media content service provider system 102 includes an identity verification (IDV) system (not shown) to ensure identity verification with respect to the user and confirm that a user registering to become an artist "is who they say they are," which may include provision of various information such as social media accounts, email addresses, personally identifying information, biometric information, and so forth. If, based on the review of the registration data, the IDV system determines that user is "who they say they are" the media content service provider system 102 may allow the user to be designated as an artist (e.g., one of the content-source artists and/or the derivative work artists 106). In short, for example, the media content service provider system 102 may allow the user to be designated as an artist as long as the user meets one or more acceptance criteria, e.g., based on artist preferences and permissions to be included in the media content platform 116, based on likelihood that an artist may be interested in providing stems and/or producing samples or remixes (such as above 50% likelihood), based on a likelihood that at least one of the derivative work artists 106 will be interested in using media content from the artist, and so on. In one or more implementations, the media content service provider system 102 may also implement various criteria to limit the population of artists to actual artists, such as by requesting users to provide one or more samples of media content they produced or performed, one or more reviews, and so forth.

The media content service provider system 102 may thus grant a user that meets the criteria for becoming an artist permission to access functionality of the media content platform 116 or permission to access a portion of functionality of the media content platform 116. For instance, lesser-known artists may be granted permission to access a subset of the total functionalities of the media content platform 116, whereas more well-known artists are granted permission to access all of the total functionalities or a subset with more of the total functionalities. Alternatively or in addition, some functionality may be withheld from an artist entity until the artist entity satisfies some threshold, at which point a larger number of the functionalities are "unlocked" for the artist. The locking and unlocking of functionalities translates into making parts of those functionalities visible or invisible (or visible but with a locked status and indicating specific steps that the artist needs to take to unlock) via a graphical user interface of the media content service provider system 102 or the at least one other service provider system 112. In one or more implementations, there may be tiers of functionality to unlock at varying thresholds. For example, if media content of an artist is authorized for use in derivative works more than a threshold number of times (e.g., 5 times) by one or more of the derivative work artists 106 in a threshold period of time (e.g., a year), the artist can then have its media content surfaced to a wider range of derivative work artists 106, with tighter controls on use of the media content, as an example.

The functionalities made available and/or exposed to an artist (e.g., visible and locked) can also be modified based on the dynamic nature of an artist's listener data, where functionalities are both added and removed on a periodic basis. In some implementations, an artist can provide specific data, such as identity verification data, concert date and/or ticket information, performance videos, and so on, to further unlock or access the media content platform 116.

However, if based on review of the registration data, the IDV system determines that the user is not "who they say they are" the media content service provider system 102 may deny the user designation as an artist. Moreover, in one or more implementations, the media content service provider system 102 may also include functionality to notify the actual artist or person that an imposter is attempting to register as the actual artist or person on the media content platform 116. This can prevent fraud, intellectual property infringement (or theft), security vulnerabilities, and so on. Manners in which the media content service provider system 102 may inform the actual artist or person include, but are not limited to, email, phone, social media messaging, text, and so forth.

In the context of communication flow between the content-source artist 104, the media content platform 116, the derivative artist 108, and the blockchain system 136, consider the following discussion.

Figure 2:
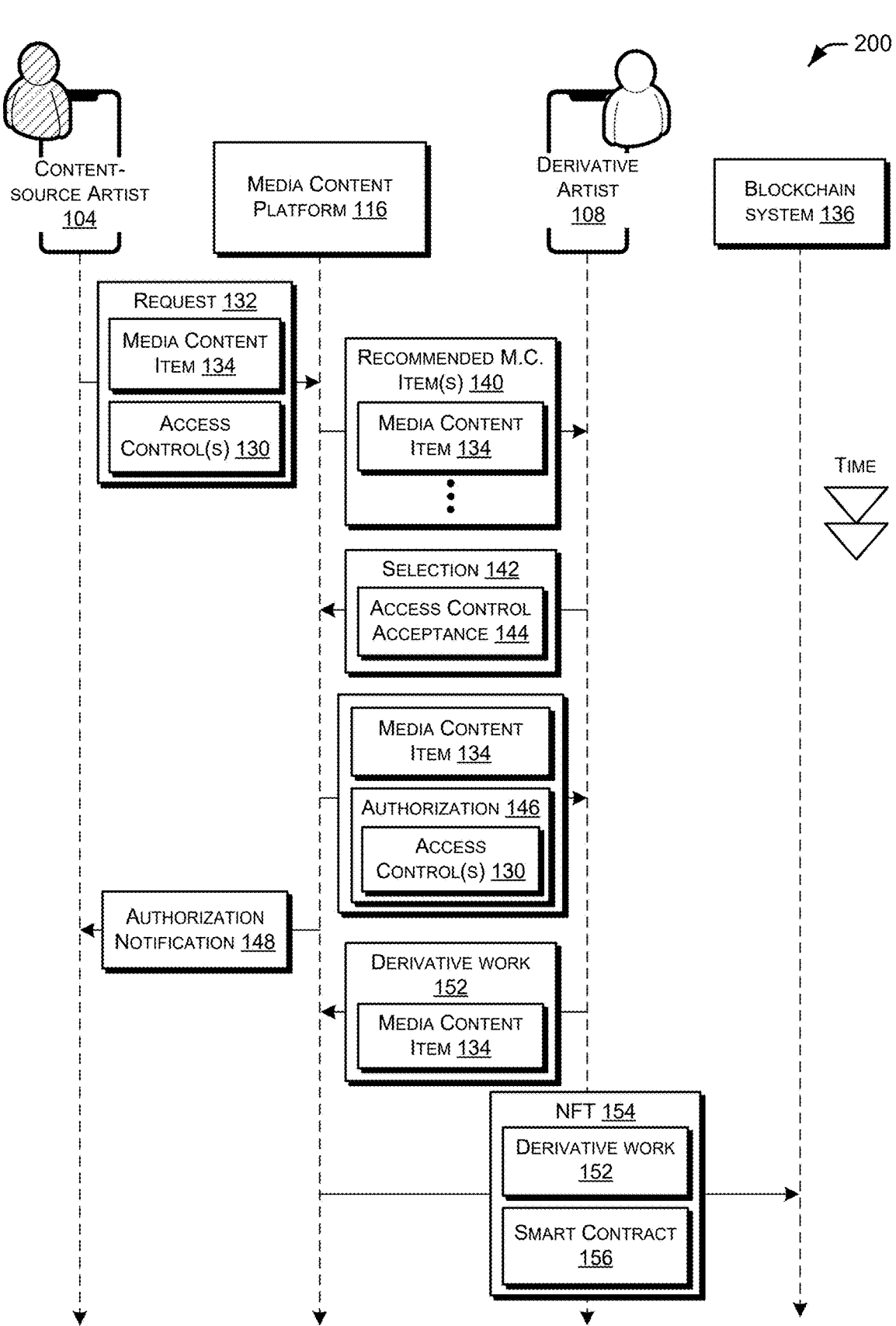
FIG. 2 depicts a first non-limiting example of interactions of the media content platform with content-source artist entities and derivative artist entities that obtain media content of the content-source artist entities for use in derivative works.

FIG. 2 depicts a first non-limiting example 200 of interactions of the media content platform with content-source artist entities and derivative artist entities that obtain media content of the content-source artist entities for use in derivative works.

The example 200 includes a variety of example control signals (e.g., electronic communications and interactions) between the content-source artist 104, the media content platform 116, the derivative artist 108, and the blockchain system 136 over time. In this example 200, the electronic communications and interactions are positioned vertically based on time (illustrated on the righthand portion of the example), such that electronic communications and interactions closer to a top of the example occur prior to electronic communications and interactions farther from the top of the example. It follows also that electronic communications or interactions closer to a bottom of the example occur subsequent to electronic communications and interactions farther from the bottom. Moreover, vertical spacing between the electronic communications and interactions is not meant to suggest a particular passage of time between the electronic communications and interactions (e.g., time is not to scale). For example, milliseconds, seconds, hours, days, weeks, months, or years may pass between various electronic communications and interactions. Additionally, the electronic communications between the content-source artist 104 and the media content platform 116 and between the derivative artist 108 and the media content platform 116 are conducted using client devices of the content-source artist 104 and the derivative artist 108, such as by using smart watches, mobile phones, laptops, or desktop computers of the content-source artist 104 and the derivative artist 108.

In this example 200, the content-source artist 104 is depicted providing the request 132 to enable access to the media content item 134 along with access control(s) 130 that control use of the media content item 134 in derivative works to the media content platform 116, and the media content platform 116 receives the request 132. As discussed above and below, the request 132 may be received by the media content platform 116 based on user input of the content-source artist 104 via a user interface of the media content platform 116 (or a series of user interfaces), such as user input to select the media content item 134 and/or one or more of the access control(s) 130. In one or more implementations, the media content platform 116 may subsequently list the media content item 134, such that the listing enables the media content item 134 to be accessed via the media content platform 116. The media content platform 116 may also associate the media content item 134 with one or more characteristic(s) 128 of the media content item 134 and the access control(s) 130 specified in the request 132.

Subsequent to the request 132, the media content platform 116 is depicted providing the recommended media content item(s) 140, which include the media content item 134, to the derivative artist 108, which is depicted receiving the recommended media content item(s) 140. By way of example, the media content platform 116 surfaces the recommended media content item(s) 140 to the derivative artist 108 via one or more user interfaces. In one or more scenarios, the recommended media content item(s) 140 are a subset of the media content 126 items that content-source artists request to be made available for access via the media content platform 116. As discussed above, the recommended media content item(s) 140 that are surfaced to the derivative artist 108 may be determined using one or more of the model(s) 120 of the recommendation system 118, such as based on characteristics of the derivative artist 108, characteristics of the content-source artist 104, characteristics of the recommended media content item(s) 140, and/or characteristics of a derivative work for which the derivative artist 108 is looking for a media content item.

The derivative artist 108 is then depicted providing a selection 142 of the media content item 134 for modification, which is received by the media content platform 116. In at least one variation, the selection 142 includes access control acceptance 144 of the access control(s) 130 that control access of the media content item 134 and were specified by the content-source artist 104 for controlling use of the media content item 134. Based on the selection 142, the media content platform 116 is configured to generate the authorization 146, which permits use of the media content item 134 under the access control(s) 130. In other words, the media content platform 116 generates the authorization 146 to include the access control(s) 130 accepted via the access control acceptance 144.

After generation of the authorization 146, the media content platform 116 provides, and the derivative artist 108 receives, the authorization 146 with the access control(s) 130. Along with the authorization 146, the media content platform 116 also provides the media content item 134 and/or access to the media content item 134 for use, e.g., in a derivative work, to the derivative artist 108. In one or more implementations, for example, the derivative artist 108 receives the media content item 134 from the media content platform 116, e.g., by downloading the media content item 134 from the media content platform 116. Additionally or alternatively, the derivative artist 108 receives the media content item 134 from the media content platform 116 in a different type of communication, such as an email. Although not depicted in FIG. 2, in at least one implementation, the media content platform 116 mints an NFT that is associated with the media content item 134 (e.g., the NFT 138), and the NFT is verified and recorded to the blockchain system 136.

In one or more implementations, the media content platform 116 provides the authorization notification 148 to the content-source artist 104, e.g., based on providing the media content item 134 and/or the authorization 146 to the derivative artist 108. For example, the content-source artist 104 receives a notification via an application of the media content platform 116, e.g., on a home screen of a client device or when opening the application.

The derivative artist 108 is depicted submitting the derivative work 152 including at least a portion of the media content item 134 (e.g., as sampled and/or remixed) to the media content platform 116. The media content platform 116 receives the derivative work 152, mints the NFT 154, and programmatically encodes an association between the NFT 154 and the derivative work 152. The NFT 154 includes the smart contract 156 configured to execute one or more of the access control(s) 130, which is implemented on the blockchain system 136.

Figure 3:
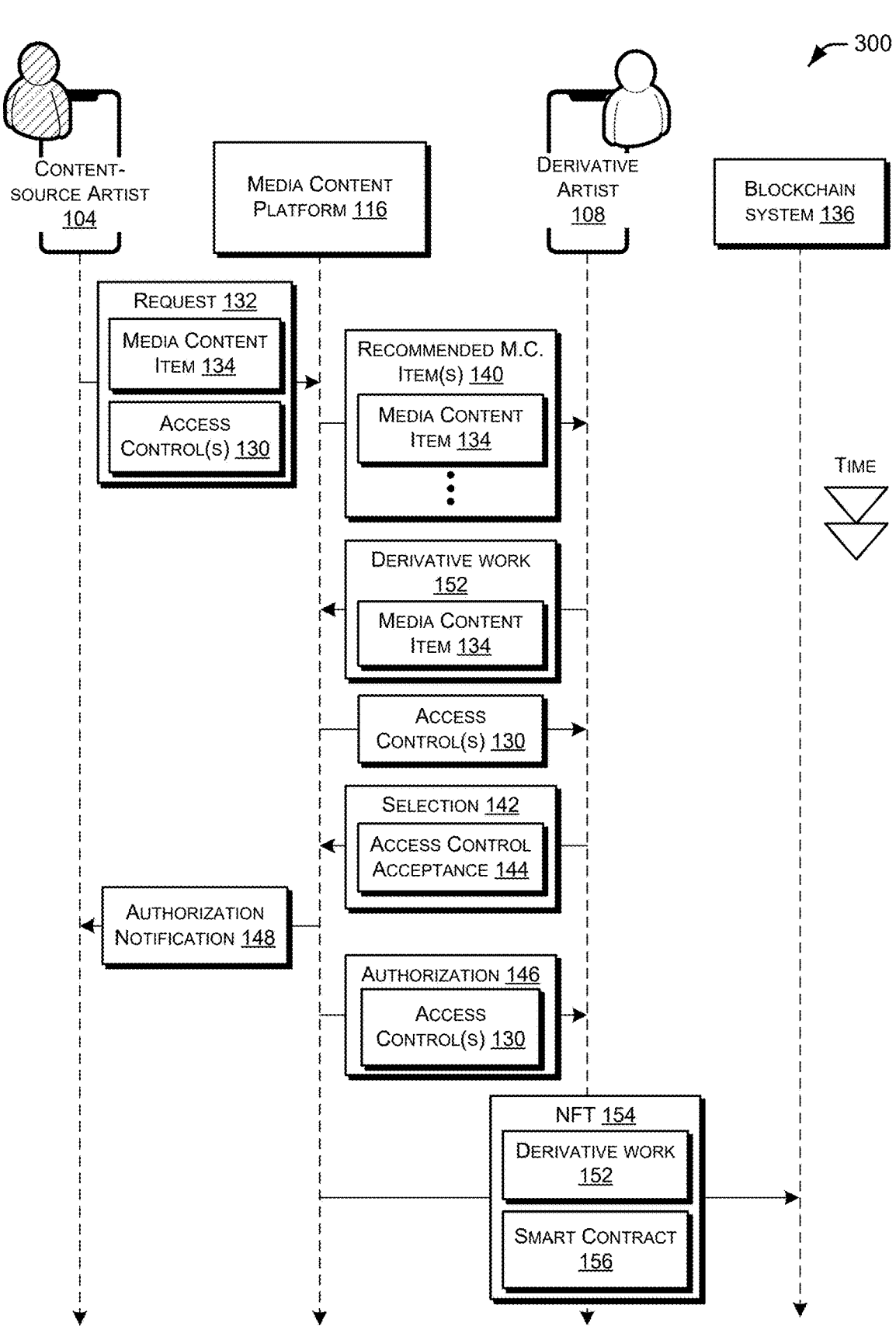
FIG. 3 depicts a second non-limiting example of interactions of the media content platform with content-source artist entities and derivative artist entities that obtain media content of the content-source artist entities for use in derivative works.

FIG. 3 depicts a second non-limiting example 300 of interactions of the media content platform with content-source artist entities and derivative artist entities that obtain media content of the content-source artist entities for use in derivative works.

The example 300 includes a variety of example control signals (e.g., electronic communications and interactions) between the content-source artist 104, the media content platform 116, the derivative artist 108, and the blockchain system 136 over time. In this example 300, the electronic communications and interactions are positioned vertically based on time (illustrated on the righthand portion of the example), such that electronic communications and interactions closer to a top of the example occur prior to electronic communications and interactions farther from the top of the example. It follows also that electronic communications or interactions closer to a bottom of the example occur subsequent to electronic communications and interactions farther from the bottom. Moreover, vertical spacing between the electronic communications and interactions is not meant to suggest a particular passage of time between the electronic communications and interactions (e.g., time is not to scale). For example, milliseconds, seconds, hours, days, weeks, months, or years may pass between various electronic communications and interactions. Additionally, the electronic communications between the content-source artist 104 and the media content platform 116 and between the derivative artist 108 and the media content platform 116 are conducted using client devices of the content-source artist 104 and the derivative artist 108, such as by using smart watches, mobile phones, laptops, or desktop computers of the content-source artist 104 and the derivative artist 108.

Similar to the example 200, in this example 300, the content-source artist 104 is depicted providing the request 132 to enable access to the media content item 134 along with access control(s) 130 that control use of the media content item 134 in derivative works to the media content platform 116, and the media content platform 116 receives the request 132. As discussed above and below, the request 132 may be received by the media content platform 116 based on user input of the content-source artist 104 via a user interface of the media content platform 116 (or a series of user interfaces), such as user input to select the media content item 134 and/or one or more of the access control(s) 130. In one or more implementations, the media content platform 116 may subsequently list the media content item 134, such that the listing enables the media content item 134 to be accessed via the media content platform 116. The media content platform 116 may also associate the media content item 134 with one or more characteristic(s) 128 of the media content item 134 and the access control(s) 130 specified in the request 132.

Subsequent to the request 132, the media content platform 116 is depicted providing the recommended media content item(s) 140, which include the media content item 134, to the derivative artist 108, which is depicted receiving the recommended media content item(s) 140. By way of example, the media content platform 116 surfaces the recommended media content item(s) 140 to the derivative artist 108 via one or more user interfaces, such as described above and below.

In the example 300, the media content platform 116 is depicted receiving the derivative work 152, which includes at least a portion of the media content item 134, from the derivative artist 108. Unlike the example 200 of FIG. 2, the derivative artist 108 creates the derivative work 152 and provides the derivative work 152 to the media content platform 116 without first accepting the access control(s) 130 for the media content item 134.

The media content platform 116 receives the derivative work 152 and provides the access control(s) 130 to the derivative artist 108, such as based on the one or more model(s) 120 processing the derivative work 152 to determine without user interaction how the media content item 134 is used in the derivative work 152 (e.g., an amount of the media content item 134 used, an amount changed, etc.). The derivative artist 108 is then depicted providing a selection 142 of access control acceptance 144 of the access control(s) 130 that control access of the media content item 134, which is received by the media content platform 116. Based on the selection 142, the media content platform 116 is configured to generate the authorization 146, which permits use of the media content item 134 under the access control(s) 130. In other words, the media content platform 116 generates the authorization 146 to include the access control(s) 130 accepted via the access control acceptance 144, even after the derivative work 152 is already created.

After generation of the authorization 146, the media content platform 116 provides, and the derivative artist 108 receives, the authorization 146 with the access control(s) 130. Along with the authorization 146, the media content platform 116 optionally provides the authorization notification 148 to the content-source artist 104, e.g., based on the selected access control(s) 130 of the authorization 146 provided to the derivative artist 108.

Additionally, in response to receiving the access control acceptance 144 from the derivative artist 108, the media content platform 116 mints the NFT 154, which is implemented on the blockchain system 136. By way of example, minting the NFT 154 includes programmatically encoding an association between the smart contract 156 (configured to execute one or more of the access control(s) 130) and the derivative work 152.

Figure 4:
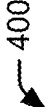
FIG. 4 depicts a non-limiting example environment for implementing a blockchain system, according to an embodiment described herein.

In the context of the blockchain system 136, consider the following example of FIG. 4.

FIG. 4 is an illustration of an environment 400 in an example implementation that is operable to employ techniques described herein. The environment 400 includes the blockchain system 136, which includes a blockchain network 402 (e.g., a distributed network) including a plurality of nodes. The environment 400 further includes a plurality of client devices, represented in the environment 400 by a client device 404 and a client device 406. For instance, the client device 404 may be the computing device 111 corresponding to (or associated with) the content-source artist 104, and the client device 406 may be the computing device 113 corresponding to (or associated with) the derivative artist 108. In an alternative example, the client device 404 may correspond to the computing device 113 of the derivative artist 108, and the client device 406 may correspond to the computing device 111 of the content-source artist 104.

The nodes of the blockchain network 402 and the client devices 404 and 406 are communicatively coupled, one to another, via the one or more networks 114.

Computing devices that implement the environment 400 are configurable in a variety of ways. A computing device, for instance, is configurable as a server, a desktop computer, a laptop computer, a mobile device (e.g., having a handheld configuration, such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although reference is made to a computing device in the singular in instances in the following discussion, "a computing device" may also represent any number of different computing devices, such as multiple servers of a server farm utilized to perform operations "over the cloud" as further described in relation to FIG. 44.

In accordance with the described techniques, the blockchain system 136 is implemented by a node 408 of the blockchain network 402. Each of the nodes 408 of the blockchain network 402 is runtime implemented using processing, memory, and network resources of respective computing devices that operate as the infrastructure of a blockchain 410. In variations, the underlying computing resources leveraged to implement an individual blockchain node 408 may be local to a particular computing device. However, in other variations, the underlying computing resources leveraged to implement an individual blockchain node 408 may be distributed and/or virtualized. In the illustrated example, the node 408 is depicted including a blockchain manager 412 and storage 414, the storage 414 being an example of an underlying computing resource leveraged by the blockchain manager 412 to implement the node 408. Other underlying resources of one or more computing devices are also made available for operating the node 408. Broadly, the blockchain manager 412 is configured to leverage those resources to implement the node 408 on behalf of the one or more computing devices.

By way of example, the blockchain manager 412 manages the storage 414 of the one or more computing devices implementing the node 408, such as by causing a copy of the blockchain 410 to be maintained in the storage 414. The copy of the blockchain 410 stored at the storage 414 may be a partial or full copy of the blockchain 410, depending on one or more characteristics of the node 408 (e.g., a type) and/or a time (e.g., whether updates have been made to the blockchain 410 via other nodes in the blockchain network 402). The blockchain manager 412 may manage other resources of the computing devices in connection with operation of the node 408, such as memory and processors of those devices to perform computations (e.g., transaction validation), operating systems of those devices, and network connections of those devices (e.g., to commit changes to the blockchain 410 and to receive updates to the node 408's copy of the blockchain 410), to name just a few. In short, the nodes 408, communicate, process, and manage data that makes up the blockchain 410. As illustrated in FIG. 4, the nodes 408 are interconnected in the blockchain network 402 to exchange data via one or more computer networks, such as the Internet. In this way, the nodes 408 operate as a peer-to-peer network in a distributed and decentralized manner.

Broadly, the blockchain 410 is formed using a plurality of blocks 416, illustrated in FIG. 4 as including a respective hash 418 and transaction data 420. The transaction data 420 of the block 416 includes batches of validated transactions that are hashed and encoded. A subsequently generated block in the blockchain 410 includes the hash 418, which is a cryptographic hash of the block 416 in the blockchain 410, thereby linking blocks to each other to form the blockchain 410. As a result, the blocks 416 cannot be altered retroactively without altering each subsequent block in the blockchain 410 and in this way protecting against attacks by malicious parties.

In order to publish blocks for addition to the blockchain 410, a node 408 may be implemented as a "miner" to add a block of transactions to the blockchain 410. In one or more implementations, other blockchain nodes may communicate transactions received at those nodes to one or more mining nodes for validation. Mining nodes may perform peer-to-peer computations to check if transactions intended for the blockchain 410 are valid and, if validated, may add validated transactions to a block 416 that those blockchain nodes are building. If the transactions are determined to be valid, for instance, then the transaction data 420 describing those transactions is encoded in or otherwise stored on a respective block 416, which is linked to the blockchain 410 such that the new block is "at the end" or "at the top" of the blockchain 410, e.g., through inclusion of the hash 418 of a previous block in the chain.

The nodes 408 then broadcast this transaction history via the blockchain network 402 for sharing with other blockchain nodes. This acts to synchronize the blocks 416 of the blockchain 410 across the distributed architecture of computing devices. A variety of "types" of blockchain nodes may be used to implement the blockchain 410. By way of example, the blockchain 410 may be implemented at least in part using "full" blockchain nodes, which are nodes that store an entirety of the blockchain 410, e.g., locally in computer-readable storage media of respective computing devices of the blockchain nodes. Other types of blockchain nodes may also be employed to implement additional functionality, such as for governing voting events, execution of protocol operations, rules enforcement, and so forth.

The blockchain 410 may be leveraged to provide a diverse range of functionality. Due in part to the distributed storage and updating of the blockchain 410 over the blockchain network 402, the blockchain 410 may store its data in a decentralized manner, without a centralized database (e.g., run by a clearinghouse), and thus operate as a distributed ledger. The decentralized storage of the blockchain 410 overcomes one of the disadvantages of centralized storage, which is that centralized storage essentially has a single point of failure. It is to be appreciated that in one or more implementations, the blockchain 410 may be public (e.g., like Bitcoin and Ethereum blockchains), such that transactions on the blockchain 410 are generally viewable with a connection to the Internet. Alternatively, the blockchain 410 may be configured as a private blockchain, in one or more implementations. When the blockchain 410 is a "private" blockchain, the computing devices used to implement the blockchain nodes may be controlled by a centralized authority, such as a company or a consortium of entities.

As a distributed ledger, the blockchain 410 supports the secure transfer of digital assets, such as the transfer of a cryptocurrency and/or tokens. Often, cryptocurrencies (e.g., coins of the cryptocurrency) are the native assets to blockchains, whereas tokens are created "on top" of these blockchains. Tokens may be created "on top" of the blockchain 410 by using a "token standard," which allows the token to interoperate with the blockchain 410's network of nodes according to one or more protocols of the blockchain, such that the transaction data 420 and the hashes 418 of the blocks 416 are leveraged to create, trade, and update tokens. By way of example, the Bitcoin blockchain's native asset is Bitcoin or "BTC", a cryptocurrency. As another example, the Ethereum blockchain's native asset is a cryptocurrency called Ether or "ETH." Nevertheless, tokens may be created on top of the 424 by using one or more of the blockchain network 402's token standards for creating tokens. By way of example, Ethereum's token standards for creating tokens include ERC-20, ERC-721, ERC-1155, and EIP-2309, to name just a few.

Regardless of the particular blockchain protocol(s) and features used, the tokens created on top of the blockchain 410 may be "programmable," meaning that they run on software protocols and can be configured to include logic executed by computing resources (e.g., of the nodes 408). This enables the tokens to implement smart contracts that define conditions for the token and the blockchain network 402's rules of engagement. Broadly, a "smart contract" is self-executing code that carries out a set of instructions in accordance with terms of the contract, and this carrying out of the set of instructions is then validated by the blockchain 410. For instance, the self-executed code is sent to an address on the blockchain 410 as a blockchain transaction and, at the address, the code sent is validated, e.g., by a consensus mechanism of the blockchain 410. Once validated, this transaction may be included in a block 416, such that the smart contract is initiated and irrevocable.

In addition or alternatively, tokens, which are implemented according to a token standard (e.g., ERC-721 or ERC-1155) and by leveraging the architecture and protocols of the blockchain 410, can be programmatically encoded as non-fungible assets that are individually unique and cannot be directly interchanged with other similar tokens "like-for-like." In accordance with the described techniques, for instance, the architecture and protocols of the blockchain system 136 can be leveraged to create non-fungible tokens (NFTs) on the blockchain 410. By using the transaction validation carried out by the nodes, the blockchain 410 certifies that a given NFT is digitally unique and thus not interchangeable with other NFTs. When an NFT is minted (e.g., programmatically brought into existence, such as by the minting system 124 of FIG. 1), the blockchain 410's protocols generate a unique token identifier that is encoded in the NFT. The unique identifier may be generated using one or more randomization approaches. As used herein, the term "non-fungible" refers to the property of a token to uniquely represent an asset, such that a digital signature of the token represents the underlying asset in a way that is not directly interchangeable with (e.g., "like-for-like"), or equal to, any other tokens. This contrasts with cryptocurrencies, which are "fungible" because two coins of a same cryptocurrency (e.g., two Ether or two Bitcoins) can be traded or exchanged for one another and are of equal value.

Instead, each NFT is programmatically created to include a unique, non-transferable identity that distinguishes it from other NFTs. In one or more implementations, a given NFT may encode underlying digital content, e.g., underlying digital art, an image, music, a video, in-game content, text (e.g., a story or writing), a composition of multiple types of digital media, a file, or a 3D-model, to name just a few. By way of example with reference to FIG. 1, the NFT 138 may encode the media content item 134, and the NFT 154 may encode the derivative work 152. Alternatively or additionally, a given NFT may encode an association with or to the digital content, e.g., a uniform resource locator (URL) or other location information that describes a location where the digital content and/or data about the digital content is stored. In one or more examples, for instance, rather than encoding the digital content for storage in the NFT, the digital content may be stored in third-party storage, e.g., the storage 122 of the media content platform 116 of FIG. 1. As discussed above and below, an NFT created and maintained on the blockchain 410 is configured to encode other information in addition to underlying digital content, or an association with the underlying digital content.

In variations, the blockchain system 136 includes a decentralized network as a "layer 2" network that sits on top of the blockchain network 402, which is a "layer 1" network. One example of the decentralized network is the Lightning Network, which is a "layer 2" network that sits on top of the Bitcoin blockchain network, which is "layer 1." Other examples of blockchain networks that are layer 1 networks include, but are not limited to, the Ethereum blockchain network, the Litecoin blockchain network, the Ripple blockchain network, and the Hyperledger blockchain network. Other examples of decentralized networks that are layer 2 networks (because a corresponding framework or protocol is built on top of a blockchain network) include, but are not limited to, Ethereum Plasma, Raiden, and RIF Lumino.

In the context of user interfaces presented to the content-source artist 104 in connection with requesting to enable access to a media content item and selecting one or more access controls to control use of the media content item in derivative works, consider the following discussion of FIGS. 5-17. In one or more implementations, such user interfaces are displayed via appropriately configured display devices that are associated with computing devices, e.g., the display devices are integral with the computing devices or are communicably coupled (via a wired or wireless connection to them). The depicted form factor (mobile phone) should not be considered limiting.

Figures 5, 6, 7:
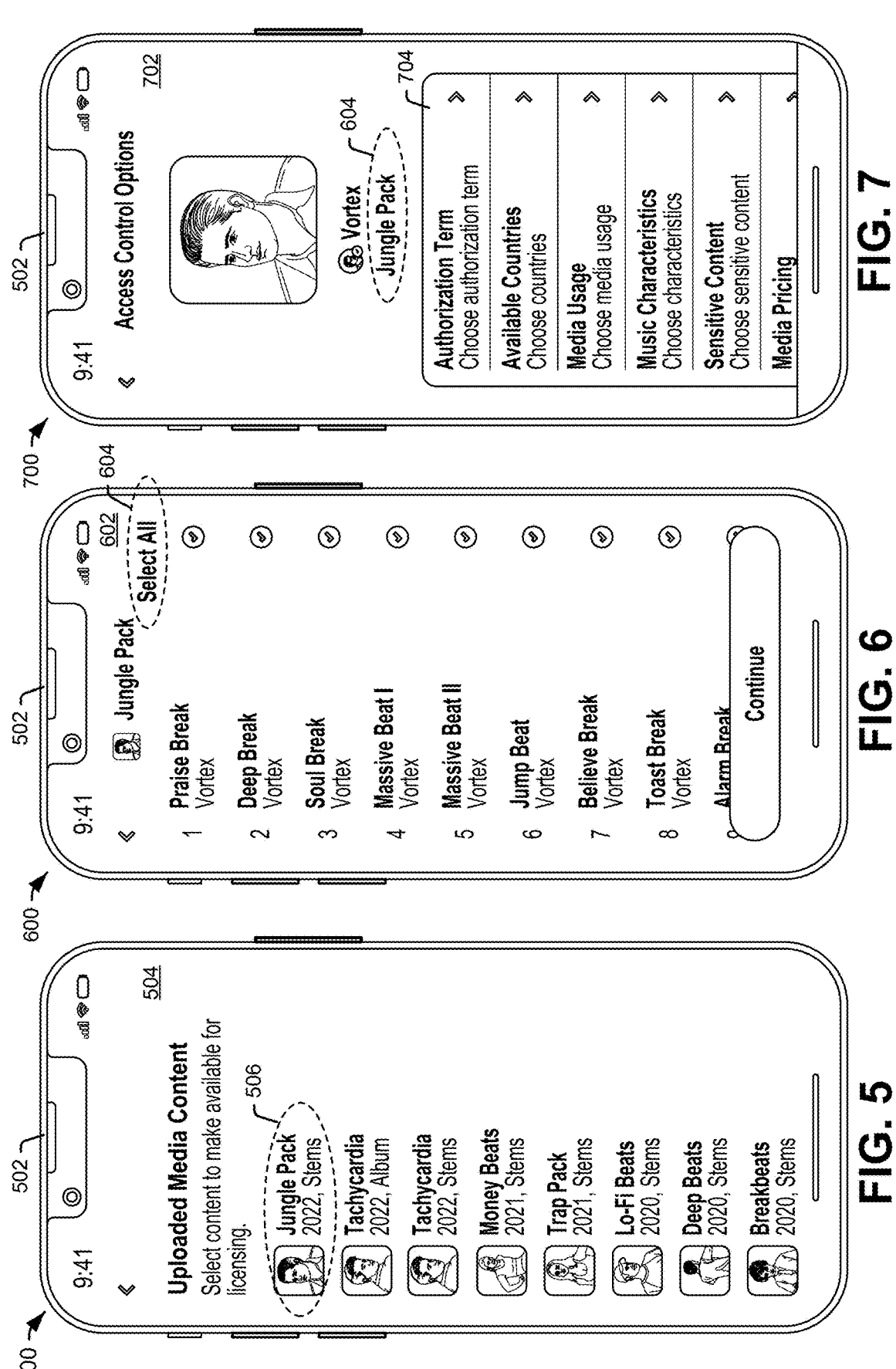

FIG. 5 depicts a non-limiting example 500 of a user interface of a media content platform that enables modification of media content items for use in derivative works.

The illustrated example 500 depicts a computing device 502 displaying a user interface 504 for the content-source artist 104. In this example 500, the user interface 504 surfaces a collection (e.g., a library) of media content items (e.g., a collection of albums, stems, and/or multitracks) to the content-source artist 104. Collections of media content items may be configured in various ways in accordance with the described techniques, such as by album (e.g., a collection of songs or digital images), package (e.g., stem packages), by time, by category, or by some other technique (e.g., a clustering technique) that is usable to group media content items into a plurality of groups. By way of example, the content-source artist 104 may upload songs of an album (e.g., mastered tracks) and/or corresponding stems that compose the song (e.g., an album called "Tachycardia" and a corresponding collection of stems called "Tachycardia"). In one or more implementations, the user interface allows the content-source artist 104 to select one or more of groups of media content items to "drill down" further to view a plurality of individual media content items.

In this example 500, the collection of media content items presented by the user interface 504 includes a plurality of groups of media content items (e.g., a plurality of albums or packages), including individual group 506 of media content items (e.g., a package of stems called "Jungle Pack"). In accordance with the described techniques, the individual group 506 may be selectable to display one or more media content items that form the individual group 506.

FIG. 6 depicts a non-limiting example 600 of a user interface of a media content platform.

The illustrated example 600 depicts the computing device 502 displaying a user interface 602 for the content-source artist 104. In one or more implementations, the user interface 602 is another interface in a series or sequence of user interfaces presented to the content-source artist 104, which enable the content-source artist 104 to select a media content item to make accessible on the media content platform 116 and select one or more access controls for authorizing modification of the media content item in derivative works (and thus control use of the derivative works themselves). In this example 600, the user interface 602 presents a plurality of media content items, such as a plurality of media content items (e.g., songs or stems) that are selectable based on user input (e.g., individually or more than one) to request that they be made accessible via the media content platform 116.

In this example, the user interface 602 depicts a selection 604. In the context of FIG. 5, the plurality of media content items presented via the user interface 602 may correspond to the media items included in the individual group 506, e.g., a plurality of stems included in the depicted stem package, "Jungle Pack." In the depicted example 600, the selection 604 includes the "select all" feature, which selects every media content item of the individual group 506. It is to be understood that in other examples, the selection 604 includes one or more individual media items. In one or more implementations, the recommendation system 118 may utilize one or more models 120 to analyze media content of the content-source artist 104 in order to recommend one or more media items to make available for modification in derivative works and surface this recommendation to the content-source artist 104 via the user interface 602.

FIG. 7 depicts a non-limiting example 700 of a user interface of a media content platform.

The illustrated example 700 depicts the computing device 502 displaying a user interface 702 for the content-source artist 104. In one or more implementations, the user interface 702 is another interface in a series or sequence of user interfaces presented to the content-source artist 104, which enable the content-source artist 104 to select a media content item to make accessible on the media content platform 116 and select one or more access controls to control use of the media content item in derivative works. In this example 700, the user interface 702 presents a navigation menu 704, which has various access control subsets that are selectable for the content-source artist 104 to view and/or specify the access controls (e.g., the access control(s) 130) for controlling access to the selection 604 and that relate to a subset of the access controls. Examples of such subsets include, but are not limited to, authorization term (e.g., an amount of time for which the selected media content can be authorized for use in derivative works), available countries (e.g., countries where a derivative work that includes the selected media content item can be distributed), media type (e.g., a format in which the media content item is provided and/or a format into which the media content item is permitted to be incorporated), digital media characteristics, and media length (e.g., how much of the media content is being made available for modification by other entities if not the entire media content item), to name just a few. In one or more implementations, the media content platform 116 may present a sequence of the user interfaces, where each user interface corresponds to a different subset of the access controls, and the navigation menu 704 may enable the content-source artist 104 to return to the user interface that corresponds to a particular access control subset to view and/or modify terms of that subset without repeating the entire sequence of user interfaces.

Figures 8, 9, 10:
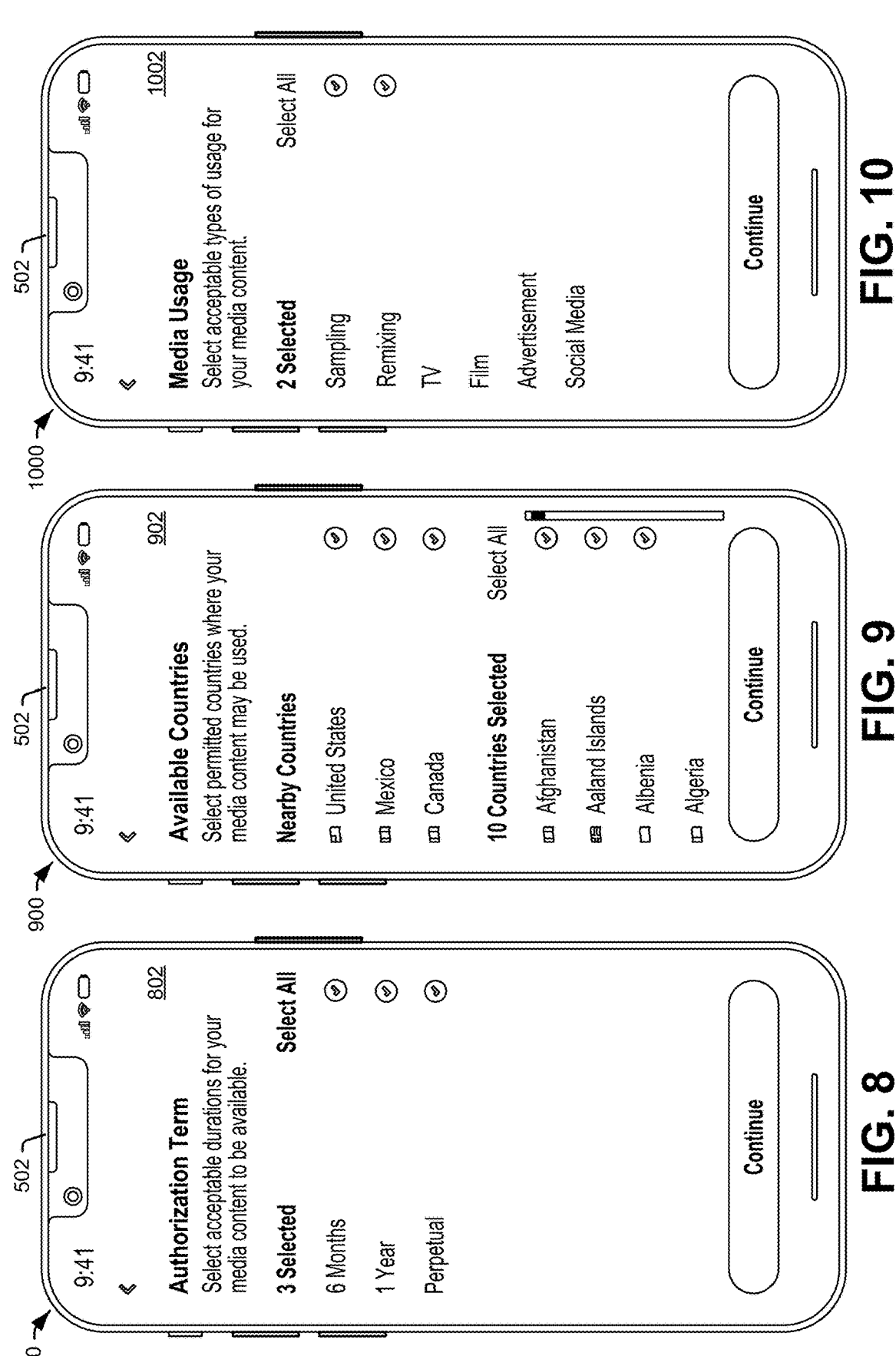

FIG. 8 depicts a non-limiting example 800 of a user interface of a media content platform.

The illustrated example 800 depicts the computing device 502 displaying a user interface 802 for the content-source artist 104. In one or more implementations, the user interface 802 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 802 is generated in response to the content-source artist 104 selecting "Authorization Term" in the navigation menu 704 of the user interface 702 of FIG. 7. In this example 800, the user interface 802 enables a content-source artist 104 to select one or more of the access control(s) 130 for controlling modification of the selected media content item. In particular, the user interface 802 enables a content-source artist 104 to select one or more amounts of time (e.g., durations for an authorization term) for which the selected media content item can be used, e.g., by one of the derivative work artists 106.

In one or more implementations, the recommendation system 118 may utilize one or more models 120 to analyze the media content item 134 in order to recommend an amount of time for which the selected media content item can be used. For example, the media content platform 116 may visually distinguish one or more of the amounts of time depicted in the user interface 802 to recommend that the content-source artist 104 select this recommended term.

FIG. 9 depicts a non-limiting example 900 of a user interface of a media content platform.

The illustrated example 900 depicts the computing device 502 displaying a user interface 902 for the content-source artist 104. In one or more implementations, the user interface 902 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 902 is generated in response to the content-source artist 104 selecting "Available Countries" in the navigation menu 704 of the user interface 702 of FIG. 7.

In this example 900, the user interface 902 enables a content-source artist 104 to select one or more of the access control(s) 130 for controlling access to the selected media content item. In particular, the user interface 902 enables the content-source artist 104 to select one or more geographic locations (e.g., countries) in which the selected media content item can be used, e.g., by one of the derivative work artists 106.

In one or more implementations, the recommendation system 118 may utilize one or more models 120 to analyze the media content item 134 in order to recommend a geographic location in which the selected media content item can be used. For example, the media content platform 116 may visually distinguish one or more of the geographic locations (e.g., Mexico) depicted in the user interface 902 to recommend that the content-source artist 104 select this recommended geographic location.

FIG. 10 depicts a non-limiting example 1000 of a user interface of a media content platform.

The illustrated example 1000 depicts the computing device 502 displaying a user interface 1002 for the content-source artist 104. In one or more implementations, the user interface 1002 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 1002 is generated in response to the content-source artist 104 selecting "Media Usage" in the navigation menu 704 of the user interface 702 of FIG. 7.

In this example 1000, the user interface 1002 enables a content-source artist 104 to select one or more of the access control(s) 130 for controlling access to the selected media content item. In particular, the user interface 1002 enables the content-source artist 104 to select one or more usages of the selected media content item, including type(s) of media content in which the selected media content item can be incorporated (e.g., a target media content type of a derivative work being created by the derivative artist 108) and/or a type of modification to be performed on the selected media content item (e.g., remixing and/or sampling).

In one or more implementations, the recommendation system 118 may utilize one or more models 120 to analyze the media content item 134 in order to recommend a type of media content in which the selected media content item can be used. For example, the media content platform 116 may visually distinguish one or more of the types of media content depicted in the user interface 1002 (e.g., film or TV) to recommend that the content-source artist 104 select this type of media content.

FIG. 11 depicts a non-limiting example 1100 of a user interface of a media content platform.

The illustrated example 1100 depicts the computing device 502 displaying a user interface 1102 for the content-source artist 104. In one or more implementations, the user interface 1102 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 1102 is generated in response to the content-source artist 104 selecting "Music Characteristics" in the navigation menu 704 of the user interface 702 of FIG. 7.

In this example 1100, the user interface 1102 enables the content-source artist 104 to select one or more characteristics of the selected media content item, such as characteristics that are searchable (e.g., by the derivative work artists 106) to find the media content item, characteristics that are useable to group the media content item with other similar media content items, and/or characteristics that are useable to distinguish the media content item from other dissimilar media content items. In accordance with the described techniques, the characteristics selected via the user interface 1102 include one or more of the characteristic(s) 128 that are made available as options by the media content platform 116 via the user interface 1102, and such that the media content platform 116 can associated the selected media content item with selected characteristics once the request 132 is received from the content-source artist 104.

FIG. 12 depicts a non-limiting example 1200 of a user interface of a media content platform.

The illustrated example 1200 depicts the computing device 502 displaying a user interface 1202 for the content-source artist 104. In one or more implementations, the user interface 1202 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 1502 is generated in response to the content-source artist 104 selecting "Sensitive Content" in the navigation menu 704 of the user interface 702 of FIG. 7.

In this example 1200, the user interface 1202 enables the content-source artist 104 to select one or more of the access control(s) 130 for controlling access to the selected media content item. In particular, the user interface 1202 enables the content-source artist 104 to select subject matter of the media content into which the selected media content item is permitted to be incorporated. Alternatively, the user interface 1202 enables the content-source artist 104 to select subject matter of the media content into which the selected media content item is not permitted to be incorporated. In either case, selection of such an option may prompt the derivative artist 108 to specify the subject matter of the derivative work into which they intend to incorporate the selected media content item, and the derivative artist 108 may be prohibited by the access controls from incorporating the selected media content item into a derivative work that relates to subject matter that is not permitted based on the selected access controls.

In one or more implementations, the recommendation system 118 may utilize one or more models 120 to analyze the media content item 134 in order to recommend subject matter of the media content into which the selected media content item is permitted to be incorporated. For example, the media content platform 116 may visually distinguish one or more of different subject matter types depicted in the user interface 1202 (e.g., alcohol) to recommend that the content-source artist 104 select this recommended type of permitted subject matter.

FIG. 13 depicts a non-limiting example 1300 of a user interface of a media content platform.

The illustrated example 1300 depicts the computing device 502 displaying a user interface 1302 for the content-source artist 104. In one or more implementations, the user interface 1302 is another interface in a series or sequence of user interfaces presented to the content-source artist 104, which enable the content-source artist 104 to select a media content item to make accessible on the media content platform 116 and select one or more access controls for authorizing modification of the media content item in derivative works. By way of example, the user interface 1502 is generated in response to the content-source artist 104 selecting "Media Pricing" in the navigation menu 704 of the user interface 702 of FIG. 7.

In this example 1300, the user interface 1302 enables the content-source artist 104 to select one or more of the access control(s) 130 for controlling access to the selected media content item. In particular, the user interface 1302 enables the content-source artist 104 to set prices for accessing the media content on the media content platform 116 (e.g., by the derivative work artists 106). By way of example, the content-source artist 104 may set a package price, the payment of which gives the derivative artist 108 access to every media content item within the individual group 506, and/or individual prices for individual media content items.

In either case, in at least one implementation, the prices set by the content-source artist 104 may be lowest acceptable prices (e.g., "a floor value") that may increase according to additional access control(s) 130 selected by the derivative artist 108. For instance, the floor value may refer to the price of the package or individual media content item for a minimum available term length, a single usage and/or media type, one geographic location, and the like. As such, the media pricing may be configured to scale according to selections made by the derivative artist 108, such as increasing as a term length increases, according to instructions (e.g., one or more pricing algorithms) of the recommendation system 118.

In addition to or as an alternative to fee-for-use media pricing, the user interface 1302 may enable the content-source artist 104 to set royalty fees for monetization of the selected media content item(s) in derivative works (e.g., in the derivative work 152). By way of example, the content-source artist 104 may set the royalty fees as a percentage of gross or net revenues generated from the derivative works that use the selected media content items. In at least one implementation, the content-source artist 104 may set a plurality of royalty fees according to tiers describing a contribution of the selected media content item(s) to a derivative work. By way of example, the percentage owed to the content-source artist 104 may increase as a usage of the selected media content item(s) in the derivative work increases.

In one or more implementations, the recommendation system 118 may utilize one or more models 120 to analyze the media content item 134 in order to recommend the media pricing, which may be output to the content-source artist 104 for approval or adjustment via the user interface 1302. For example, the model(s) 120 may determine a market rate for the type of content selected to be made available via the media content platform 116 via the selection 604 based on, for example, a popularity of and/or demand for the type of content, a popularity of the content-source artist 104, an availability of similar content, a complexity of the content, and the like. As an example, the floor value and/or a royalty fee percentage suggested by the recommendation system 118 for media content of a more popular artist may be greater than the floor value and/or royalty fee percentage suggested for similar media content of a less popular artist. As another example, the floor value and/or royalty fee percentage suggested by the recommendation system 118 for a media content item in higher demand may be greater than the floor value and/or royalty fee percentage suggested for a media content item in lower demand.

Figures 14, 15, 16:
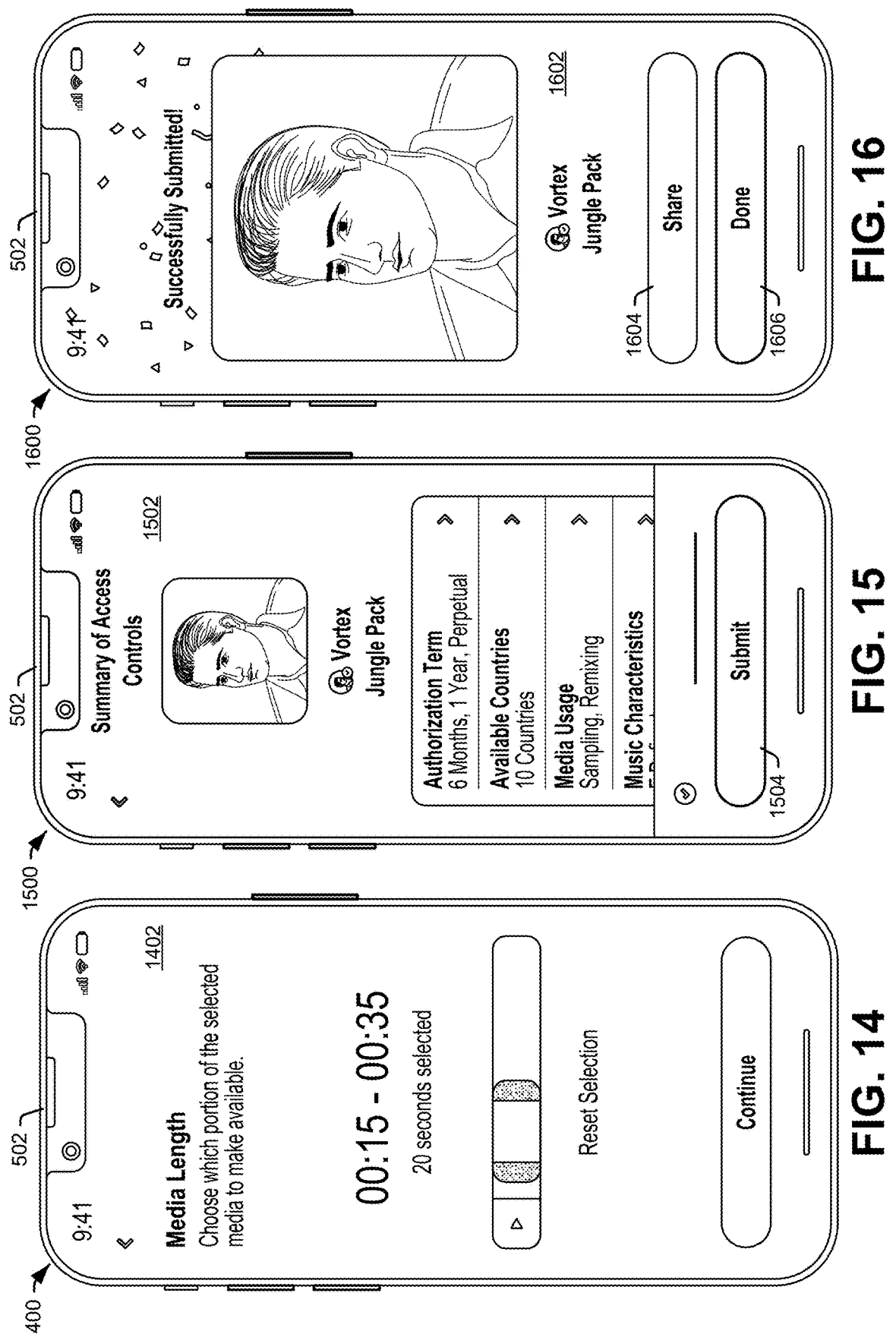

FIG. 14 depicts a non-limiting example 1400 of a user interface of a media content platform.

The illustrated example 1400 depicts the computing device 502 displaying a user interface 1402 for the content-source artist 104. In one or more implementations, the user interface 1402 is another interface in a series or sequence of user interfaces presented to the content-source artist 104, which enable the content-source artist 104 to select a media content item to make accessible on the media content platform 116 and select one or more access controls for authorizing modification of the media content item in derivative works.

In this example 1400, the user interface 1402 enables the content-source artist 104 to select which portion of the selected media content item to make available (e.g., to the derivative work artists 106) on the media content platform 116 for modification. In one or more implementations, the user interface 1402 enables the content-source artist 104 to select an entirety of the media content item or one or more portions of it (e.g., 20 seconds). In at least one implementation, the content-source artist 104 may select the media length individually for each selected media content item (e.g., as selected via the user interface 602 of FIG. 6).

In one or more implementations, the recommendation system 118 may utilize one or more models 120 to analyze the media content item 134 in order to recommend a particular portion of the media content item 134 to make available on the media content platform 116 for modification. For example, the media content platform 116 may automatically generate and display a representation of the recommended portion of the media content item 134 which should be made available for modification.

FIG. 15 depicts a non-limiting example 1500 of a user interface of a media content platform.

The illustrated example 1500 depicts the computing device 502 displaying a user interface 1502 for the content-source artist 104. In one or more implementations, the user interface 1502 is another interface in a series or sequence of user interfaces presented to the content-source artist 104, which enable the content-source artist 104 to select a media content item to make accessible on the media content platform 116 and select one or more access controls for authorizing modification of the media content item in derivative works. In this example 1500, the user interface 1502 enables the content-source artist 104 to submit, e.g., based on selection of an interface control 1504, the request 132 to enable access to the selected media content item for modification (e.g., by the derivative work artists 106) on the media content platform 116. In one or more implementations, the content-source artist 104 provides an express acceptance of terms and conditions of the media content platform 116 (e.g., based on user input). Alternatively or in addition, the selection of the interface control 1504 implies acceptance of the terms and conditions of the media content platform 116.

FIG. 16 depicts a non-limiting example 1600 of a user interface of a media content platform.

The illustrated example 1600 depicts the computing device 502 displaying a user interface 1602 for the content-source artist 104. In one or more implementations, the user interface 1602 is another interface in a series or sequence of user interfaces presented to the content-source artist 104, which enable the content-source artist 104 to select a media content item to make accessible on the media content platform 116 and select one or more access controls for authorizing modification of the media content item in derivative works.

In this example 1600, the user interface 1602 includes a notification that the request 132 was successfully submitted by the content-source artist 104 (and received by the media content platform 116). Additionally, the user interface 1602 enables the content-source artist 104 to select an option 1604 to share that the selected media content item is available on the media content platform 116 for modification, such as to share via the media content platform 116, a different platform (e.g., a social media platform), email, text message, and so forth. The user interface 1602 is also depicted presenting another option 1606, e.g., a "done" option, to end the media content and access control selection process. In one or more implementations, selection of the other option 1606 returns the content-source artist 104 to a particular user interface of the media content platform 116, such as a home screen of the platform or a dashboard of the content-source artist 104. In some cases, such as the option 1606 being selected, the media content item may be made available on the media content platform 116 "exclusively"—e.g., available to the derivative artists 108 on the media content platform 116 without being available on other platforms. Examples are also considered in which the media content item is available on the media content platform 116 for a limited amount of time (e.g., one week, one month, etc.) prior to being made available to other platforms. By making the media content item available on the media content platform 116 without being available on other platforms, such as for a limited time, the derivative artists 108 may be encouraged to utilize the media content platform 116 to create derivative works, such as by using the content editing tool 150. The end-to-end capabilities of the media content platform 116 to share, create, track, and monetize derivative works consolidates and reduces redundant communications as well as reduces storage of redundant data, increasing processing efficiency of the system.

It is to be appreciated that in one or more implementations, one or more of the user interfaces discussed in relation to FIGS. 5-16 may not be presented to the content-source artist 104, e.g., as part of requesting that access to a media content item be enabled and/or selecting access controls for controlling access to the media content item. Certainly, different user interfaces may be surfaced by the media content platform 116 to the content-source artist 104 to enable the content-source artist 104 to request that access to a media content item be enabled and/or to select access controls for controlling access to the media content item.

In the context of user interfaces presented to the derivative artist 108 in connection with selecting a media content item and selecting one or more access controls with which to obtain authorization for modifying a selected media content item, consider the following discussion of FIGS. 17-30. In one or more implementations, such user interfaces are displayed via appropriately configured display devices that are associated with computing devices, e.g., the display devices are integral with the computing devices or are communicably coupled (via a wired or wireless connection to them). The depicted form factor (mobile phone) should not be considered limiting.

Figures 17, 18, 19:
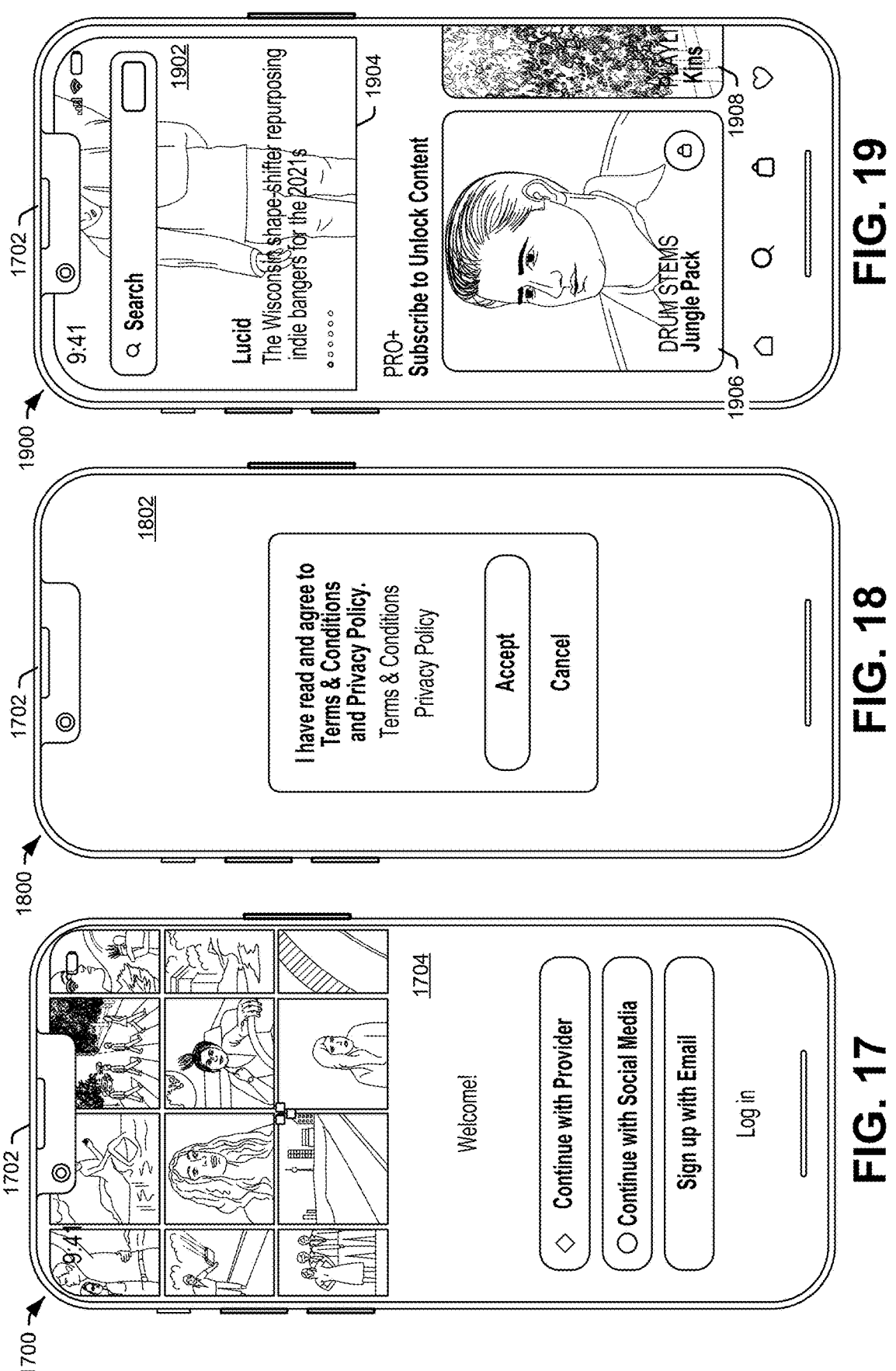

FIG. 17 depicts a non-limiting example 1700 of a user interface of a media content platform.

The illustrated example 1700 depicts a computing device 1702 displaying a user interface 1704 for the derivative artist 108. In this example 1700, the user interface 1704 presents options for the derivative artist 108 to log in to an account with the media content platform 116, to access the media content platform 116 using credentials from another service provider system (e.g., a social networking platform), and to create an account with the media content platform 116 (e.g., using an email address). In at least one variation, the derivative artist 108 accesses the functionality of the media content platform 116 and/or an application of the platform differently than through the computing device 1702. For instance, the derivative artist 108 is presented a home screen of the application automatically after selecting an icon corresponding to the media content platform 116, such as when the derivative artist 108 has already logged into the application.

FIG. 18 depicts a non-limiting example 1800 of a user interface of a media content platform.

The illustrated example 1800 depicts the computing device 1702 displaying a user interface 1802 for the derivative artist 108. In this example, the user interface 1802 displays a terms and conditions user-interface element, along with controls (e.g., buttons) to accept the terms and conditions of the media content platform 116 or to cancel. In one or more implementations, the functionality of the media content platform 116 is made available to the derivative artist 108 based on acceptance of the terms and conditions and is not made available to the derivative artist 108 if acceptance of the terms and conditions is not received (or only a portion of the functionality is made available). In this example, the user interface 1802 also includes indications for "Terms & Conditions" and "Privacy Policy." In at least one variation, one or more of these indications is selectable to present, respectively, the terms and conditions for the derivative artist 108 to use the media content platform 116 and a privacy policy of the media content platform 116. In one or more implementations, this user interface 1802 is displayed to the derivative artist 108 when they establish an account with the media content platform 116 or when the media content platform 116 updates one or more of its terms and conditions or privacy policy. When the derivative artist 108 accesses the media content platform 116 subsequently (e.g., via an application), this user interface 1802 may not be presented.

FIG. 19 depicts a non-limiting example 1900 of a user interface of a media content platform.

The illustrated example 1900 depicts the computing device 1702 displaying a user interface 1902 for the derivative artist 108. In one or more implementations, the user interface 1902 corresponds to a home screen of an application of the media content platform 116. In this example, the user interface 1902 presents a plurality of recommended media content to the derivative artist 108, including an indication of an artist 1904 and indications of media content items 1906, 1908. In one or more implementations, such indications are selectable. For instance, the indication of the artist 1904 is selectable to navigate to a user interface associated with the artist and the indications of the media content items 1906, 1908 are selectable to navigate to respective user interfaces associated with the media content items. From such user interfaces, media content items may be selectable for further reviewing of access controls for those media content items and initiating authorization for modifying those items. In one or more implementations, the user interface 1902 presents the recommended media content item(s) 140 to the derivative artist 108, e.g., via indications of the media content items. It is to be appreciated that the recommended media content item(s) 140 may be presented to the derivative artist 108 in different ways without departing from the spirit or scope of the described techniques.

Figures 20, 21, 22:
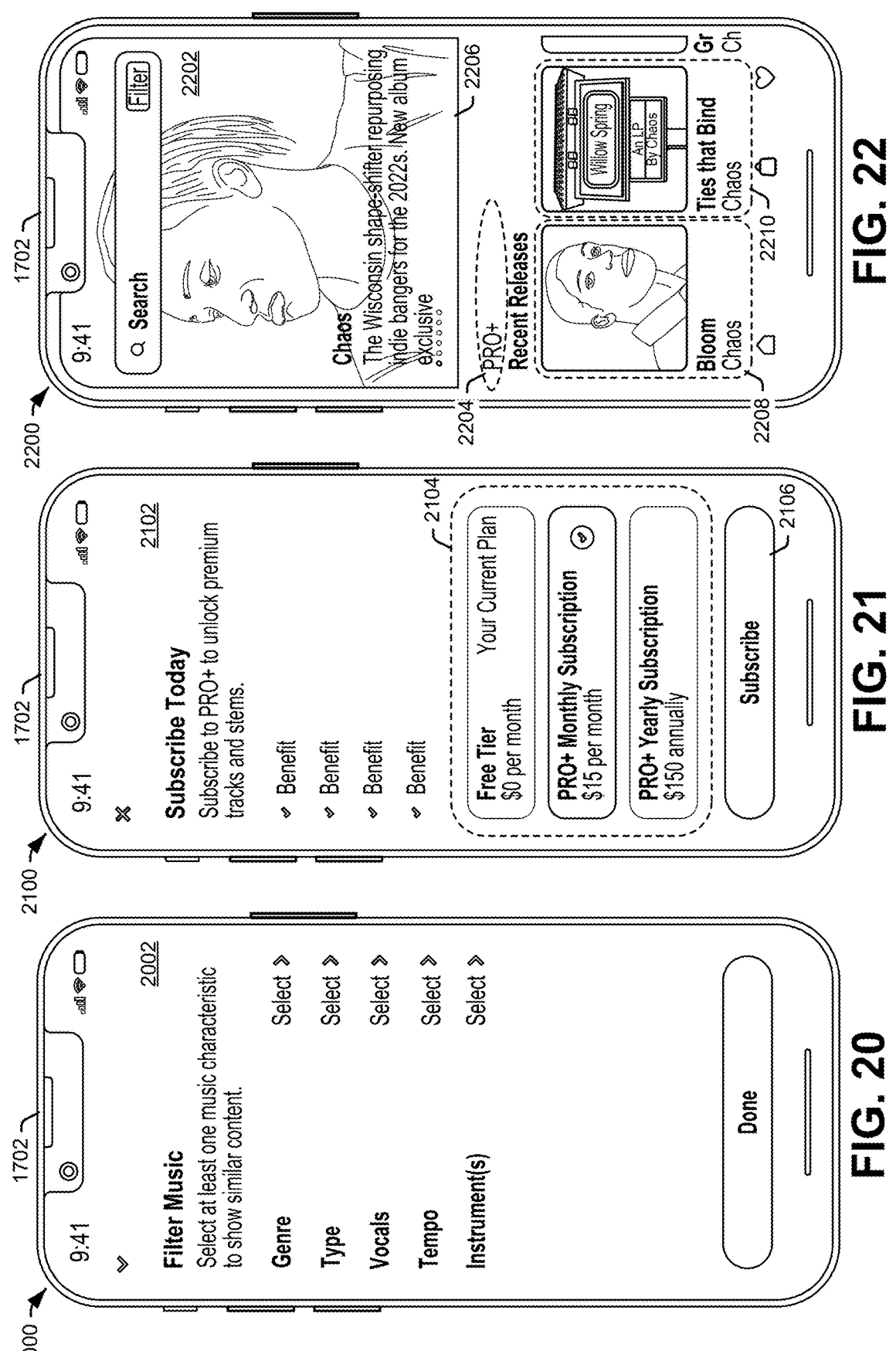

FIG. 20 depicts a non-limiting example 2000 of a user interface of a media content platform.

The illustrated example 2000 depicts the computing device 1702 displaying a user interface 2002 for the derivative artist 108. In this example, the user interface 2002 enables the derivative artist 108 to select desired characteristics of a media content item, such that the selected characteristics are usable by the media content platform 116 to search for and/or recommend media content items to the derivative artist 108. By way of example, the user interface 2002 enables the derivative artist 108 to select audio characteristics of a song, stem, or multitrack that the derivative artist 108 would like to modify by incorporation into a derivative work. Although various characteristics of a song, stem, or multitrack are depicted in the illustrated example 2000, it is to be appreciated that different audio characteristics may be selectable without departing from the spirit or scope of the described techniques, and also that characteristics for different types of media content (e.g., digital images) may be presented and selectable in variations without departing from the spirit or scope of the described techniques.

FIG. 21 depicts a non-limiting example 2100 of a user interface of a media content platform.

The illustrated example 2100 depicts the computing device 1702 displaying a user interface 2102 for the derivative artist 108. In this example, the user interface 2102 presents a plurality of subscription options 2104 to the derivative artist 108, where the subscription options avail the derivative artist 108 to different levels of functionality of the media content platform 116. For instance, in at least one example, a first of the subscription options 2104 permits the derivative artist 108 to access a limited subset of functionality of the media content platform 116 and a second of the subscription options 2104 permits the derivative artist 108 to access more of the functionality (e.g., all or a larger subset of the functionality) or improved functionality relative to the first option. In this example 2100, the user interface 2102 also includes an interface control 2106 to initiate access to the media content platform 116 in accordance with a selected subscription option 2104.

FIG. 22 depicts a non-limiting example 2200 of a user interface of a media content platform.

The illustrated example 2200 depicts the computing device 1702 displaying a user interface 2202 for the derivative artist 108. In one or more implementations, the user interface 2202 corresponds to another home screen of an application of the media content platform 116. In contrast to the user interface depicted in the example 1900, though, the user interface 2202 includes an indication 2204 of an upgraded subscription for the derivative artist 108 with the media content platform 116.

The user interface 2202 also presents a plurality of recommended media content to the derivative artist 108, including an indication of an artist 2206 and indications of media content items 2208, 2210. As noted above, such indications may be selectable. For instance, the indication of the artist 2206 may be selectable to navigate to a user interface associated with the artist, and the indications of the media content items 2208, 2210 may be selectable to navigate to respective user interfaces associated with the media content items. From such user interfaces, media content items may be selectable in order to select and accept access controls for those media content items and/or generate authorization for modifying those items. In one or more implementations, the user interface 2202 may present the recommended media content item(s) 140 to the derivative artist 108, e.g., via indications of the media content items.

Figures 23, 24, 25:
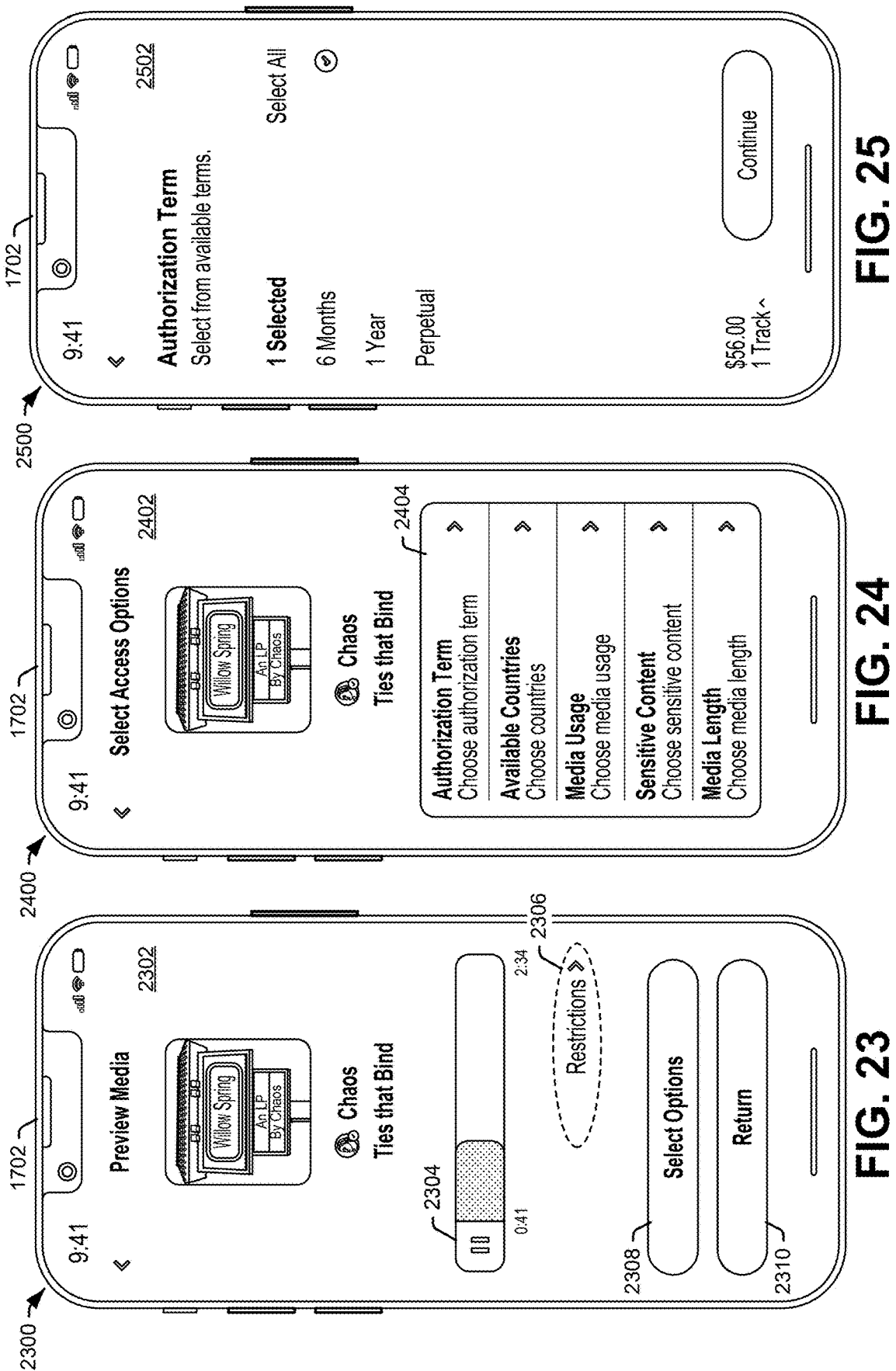

FIG. 23 depicts a non-limiting example 2300 of a user interface of a media content platform.

The illustrated example 2300 depicts the computing device 1702 displaying a user interface 2302 for the derivative artist 108. In one or more implementations, the user interface 2302 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. In this example 2300, the user interface 2302 presents a preview of the selected media content item. For example, the user interface 2302 includes a media playback control element 2304, via which the derivative artist 108 may start or stop playback of the selected media content item (e.g., via speakers of the computing device 1702 or another audio playback device in electronic communication with the computing device 1702). The user interface 2302 further includes an interface element 2306, which in this instance, enables the derivative artist 108 to preview access controls associated with the selected media content item. For example, the access controls define terms for accessing the selected media content item and using (e.g., modifying) the selected media content item in derivative works. In at least one implementation, the user interface 2302 may output a pop-up showing the restrictions in response to the derivative artist 108 tapping, holding, or providing another pre-determined input to the interface element 2306 (e.g., hovering via a mouse pointer).

The user interface 2302 further includes a first option 2308 and a second option 2310. In the depicted non-limiting example 2300, selection of the first option 2308 begins the access control selection and acceptance process for the selected media content item, whereas the second option 2310 returns to a prior user interface (e.g., the user interface 2202 of FIG. 22) to enable the derivative artist 108 to select another media content item.

FIG. 24 depicts a non-limiting example 2400 of a user interface of a media content platform.

The illustrated example 2400 depicts the computing device 1702 displaying a user interface 2402 for the derivative artist 108. In one or more implementations, the user interface 2402 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2402 is generated and presented to the derivative artist 108 in response to the derivative artist 108 selecting the first option 2308 of the user interface 2302 of FIG. 23.

In this example 2400, the user interface 2402 presents a navigation menu 2404, which has various access control subsets that are selectable for the derivative artist 108 to view and/or specify acceptance of various access controls (e.g., the access control(s) 130) that control access to a selected media content item and that relate to a subset of the access controls. Examples of such subsets include, but are not limited to, authorization term (e.g., an amount of time for which the selected media content can be modified in a derivative work), available countries (e.g., countries to which the derivative artist 108 agrees to limit distribution of a derivative work including the selected media item), media type (e.g., a format in which the media content item is obtained by the derivative artist 108 and/or a format into which the media content item is permitted to be incorporated), content related limitations and/or prohibitions, and media length (e.g., how much of the media content is desired for modification), to name just a few. In one or more implementations, the media content platform 116 may present a sequence of the user interfaces, where each user interface corresponds to a different subset of the access controls, and the navigation menu 2404 may enable the derivative artist 108 to return to the user interface which corresponds to a particular access control subset to view and/or accept different access controls of that subset without repeating the entire sequence of user interfaces.

FIG. 25 depicts a non-limiting example 2500 of a user interface of a media content platform.

The illustrated example 2500 depicts the computing device 1702 displaying a user interface 2502 for the derivative artist 108. In one or more implementations, the user interface 2502 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2502 is generated and presented to the derivative artist 108 in response to the derivative artist 108 selecting "Authorization Term" in the navigation menu 2404 of the user interface 2402 of FIG. 24.

In this example 2500, the user interface 2502 enables the derivative artist 108 to provide a selection to accept one or more of the access control(s) 130 that control access to a selected media content item. In particular, the user interface 2502 enables the derivative artist 108 to select one or more amounts of time (e.g., an authorization term) for which the derivative artist 108 desires to be permitted to modify the selected media content item, e.g., in a derivative work.

Figures 26, 27, 28:
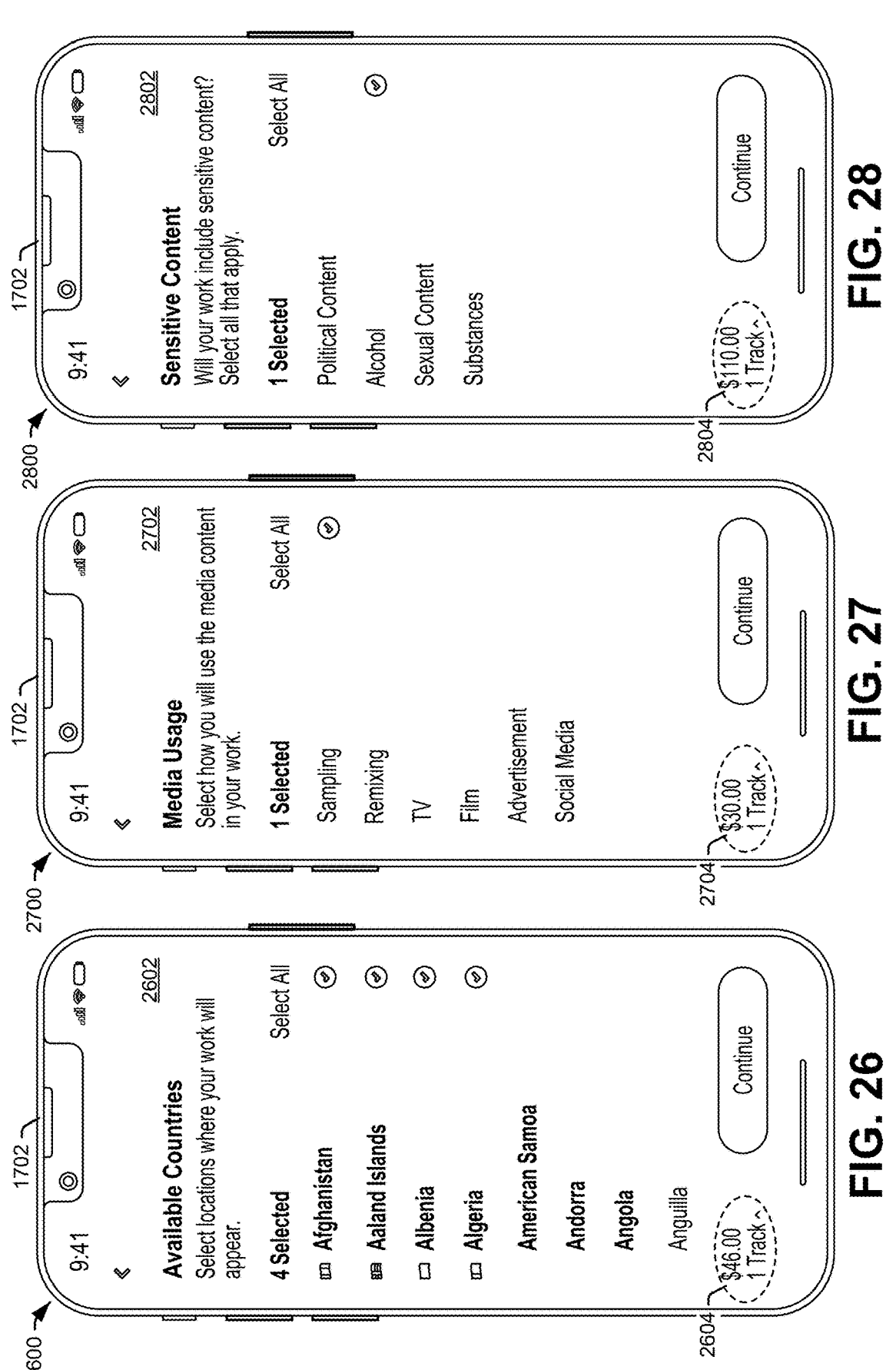

FIG. 26 depicts a non-limiting example 2600 of a user interface of a media content platform.

The illustrated example 2600 depicts the computing device 1702 displaying a user interface 2602 for the derivative artist 108. In one or more implementations, the user interface 2602 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2602 is generated and presented to the derivative artist 108 in response to the derivative artist 108 selecting "Available Countries" in the navigation menu 2404 of the user interface 2402 of FIG. 24.

In this example 2600, the user interface 2602 enables the derivative artist 108 to provide a selection to accept one or more of the access control(s) 130 that control access to a selected media content item. In particular, the user interface 2602 enables the derivative artist 108 to select one or more geographic locations (e.g., countries) where the derivative artist 108 desires to use the selected media content item, e.g., so that the derivative artist 108 is authorized to distribute a derivative work that incorporates the selected media content item in the selected geographic locations. In at least one implementation, a cost 2604 to obtain authorization to modify the media content item changes based on an identity or number of locations selected. For example, the cost 2604 may increase as the number of selected locations increases.

FIG. 27 depicts a non-limiting example 2700 of a user interface of a media content platform.

The illustrated example 2700 depicts the computing device 1702 displaying a user interface 2702 for the derivative artist 108. In one or more implementations, the user interface 2702 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2702 is generated and presented to the derivative artist 108 in response to the derivative artist 108 selecting "Media Usage" in the navigation menu 2404 of the user interface 2402 of FIG. 24.

In this example 2700, the user interface 2702 enables the derivative artist 108 to provide a selection to accept one or more of the access control(s) 130 that control access to a selected media content item. In particular, the user interface 2702 enables the derivative artist 108 to select one or more usages and/or distribution channels of the selected media content item, including type(s) of media content into which the derivative artist 108 agrees to incorporate the selected media content item (e.g., a target media content type of a derivative work being created by the derivative artist 108) and/or a type of modification the derivative artist 108 intends to perform on the selected media content item (e.g., remixing and/or sampling). For example, the "Social Media" option may be selectable to present different social media channels on which the derivative artist 108 would like to distribute the derivative work that incorporates the selected media content item. In at least one implementation, a cost 2704 to authorize modification of the selected media content item changes based on a type or number of media usages selected. For example, the cost 2704 may increase as the number of selected usages increases.

FIG. 28 depicts a non-limiting example 2800 of a user interface of a media content platform.

The illustrated example 2800 depicts the computing device 1702 displaying a user interface 2802 for the derivative artist 108. In one or more implementations, the user interface 2802 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2802 is generated and presented to the derivative artist 108 in response to the derivative artist 108 selecting "Sensitive Content" in the navigation menu 2404 of the user interface 2402 of FIG. 24.

In this example 2800, the user interface 2802 enables the derivative artist 108 to provide a selection to accept one or more of the access control(s) 130 that control access to a selected media content item. In particular, the user interface 2802 enables the derivative artist 108 to select subject matter to which a derivative work that incorporates the selected media content item can relate. For instance, if a subject matter option is selected, the authorization eventually generated by the media content platform 116 permits the derivative artist 108 to incorporate the selected media content item into a derivative work that relates to the selected subject matter. In contrast, if a subject matter option is not selected, the authorization may not permit the derivative artist 108 to incorporate the selected media content item into a derivative work that relates to the selected subject matter. In one or more implementations, selection of a subject matter option corresponds to an increase in a cost 2804 for authorization of the selected subject matter.

Figures 29, 30, 31:
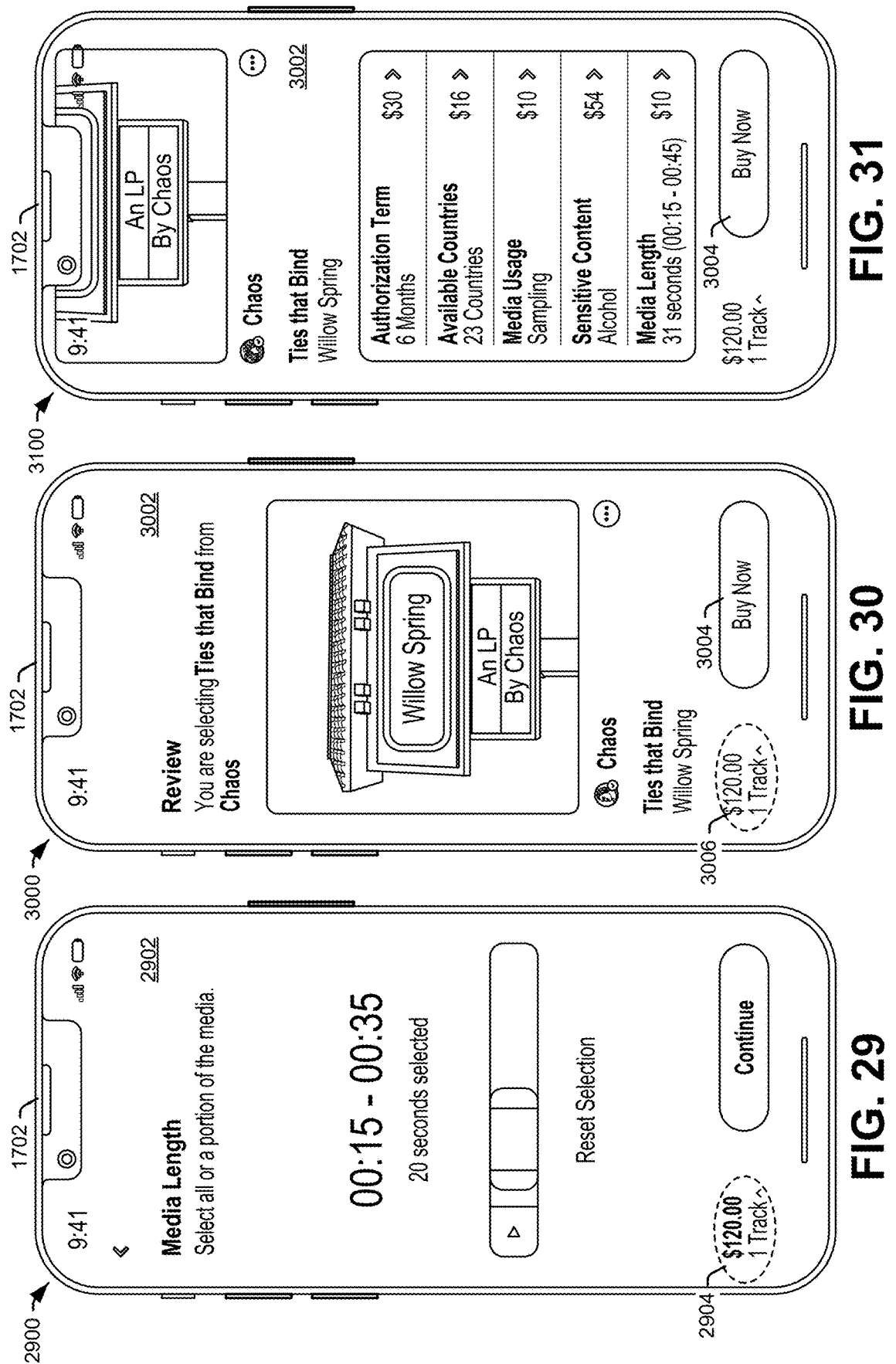

FIG. 29 depicts a non-limiting example 2900 of a user interface of a media content platform.

The illustrated example 2900 depicts the computing device 1702 displaying a user interface 2902 for the derivative artist 108. In one or more implementations, the user interface 2902 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item. By way of example, the user interface 2902 is generated and presented to the derivative artist 108 in response to the derivative artist 108 selecting "Media Length" in the navigation menu 2404 of the user interface 2402 of FIG. 24.

In this example 2900, the user interface 2902 enables the derivative artist 108 to select which portion of the selected media content item to obtain for modification, e.g., from a portion of the media content item that has been made available for modification by the content-source artist 104. In one or more implementations, the user interface 1402 enables the derivative artist 108 to select an entirety of the media content item or one or more portions of it, e.g., 20 seconds. In one or more implementations, selection of a greater media length corresponds to an increase in a cost 2904 to use the selected subject matter.

FIG. 30 depicts a non-limiting example 3000 of a user interface of a media content platform.

The illustrated example 3000 depicts the computing device 1702 displaying a user interface 3002 for the derivative artist 108. In one or more implementations, the user interface 3002 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item.

In this example 3000, the user interface 3002 enables the derivative artist 108 to review a selected media content item as well as the access controls the derivative artist 108 has selected for accessing and modifying the selected media content item. In one or more implementations, the user interface 3002 is scrollable (as depicted in FIG. 31) to review more information which corresponds to the authorization (e.g., selected access controls) than is depicted in the illustrated example 3000. In this example 3000, the user interface also includes a control 3004 (e.g., a button) to select the indicated media content and accept the access controls, including a cost 3006. Although the cost 3006 is shown as a fixed fee, it may be appreciated that in at least one implementation, the cost 3006 additionally or alternatively includes royalty terms. In one or more implementations, responsive to selecting the control 3004, for instance, the derivative artist 108 provides, and the media content platform 116 receives, the selection 142 of the media content item 134 and the access control acceptance 144. In one or more implementations, the selection 142 and the access control acceptance 144 are generated (e.g., by an application) based on receiving input from the derivative artist 108 via one or more user interfaces of a series of user interfaces, such as a series of user interface described above in relation to FIGS. 17-29.

FIG. 31 depicts a non-limiting example 3100 of a user interface of a media content platform.

The illustrated example 3100 depicts the computing device 1702 displaying the user interface 3002 for the derivative artist 108. In this example, however, the user interface 3002 has been scrolled down (e.g., based on user input from the derivative artist 108) to view more information which corresponds to authorizing the modification of indicated media content item in a derivative work. Like FIG. 30, the illustrated example 3100 also includes the control 3004, which persists in the scrolled down view of the user interface 3002 and is selectable via user input to select the indicated media content and accept the access controls.

In at least one implementation, selecting an access control in the user interface 3002 outputs a "request" option that enables the derivative artist 108 to submit requests for modifications to the access control(s) 130 that the content-source artist 104 has indicated as acceptable. For example, selecting the "request" option opens a communication channel between the derivative artist 108 and the content-source artist 104 for negotiating the access control(s) 130. The derivative artist 108 may, for instance, indicate a desired country that is not already available in the access control(s) 130, a desired authorization term that is not already available in the access control(s) 130, and so forth. Upon submission of the request by the derivative artist 108, a notification may be output to the content-source artist 104, such as via a user interface, in near real-time. Further, the user interface may provide selectable options to the content-source artist 104 to approve the request, deny the request, or propose alternative control term(s). As such, the media content service provider system 102 may provide a centralized platform for access control-related negotiations between the derivative artist 108 and the content-source artist 104 that reduces the back-and-forth and ad-hoc nature of conventional systems.

Figures 32, 33, 34:
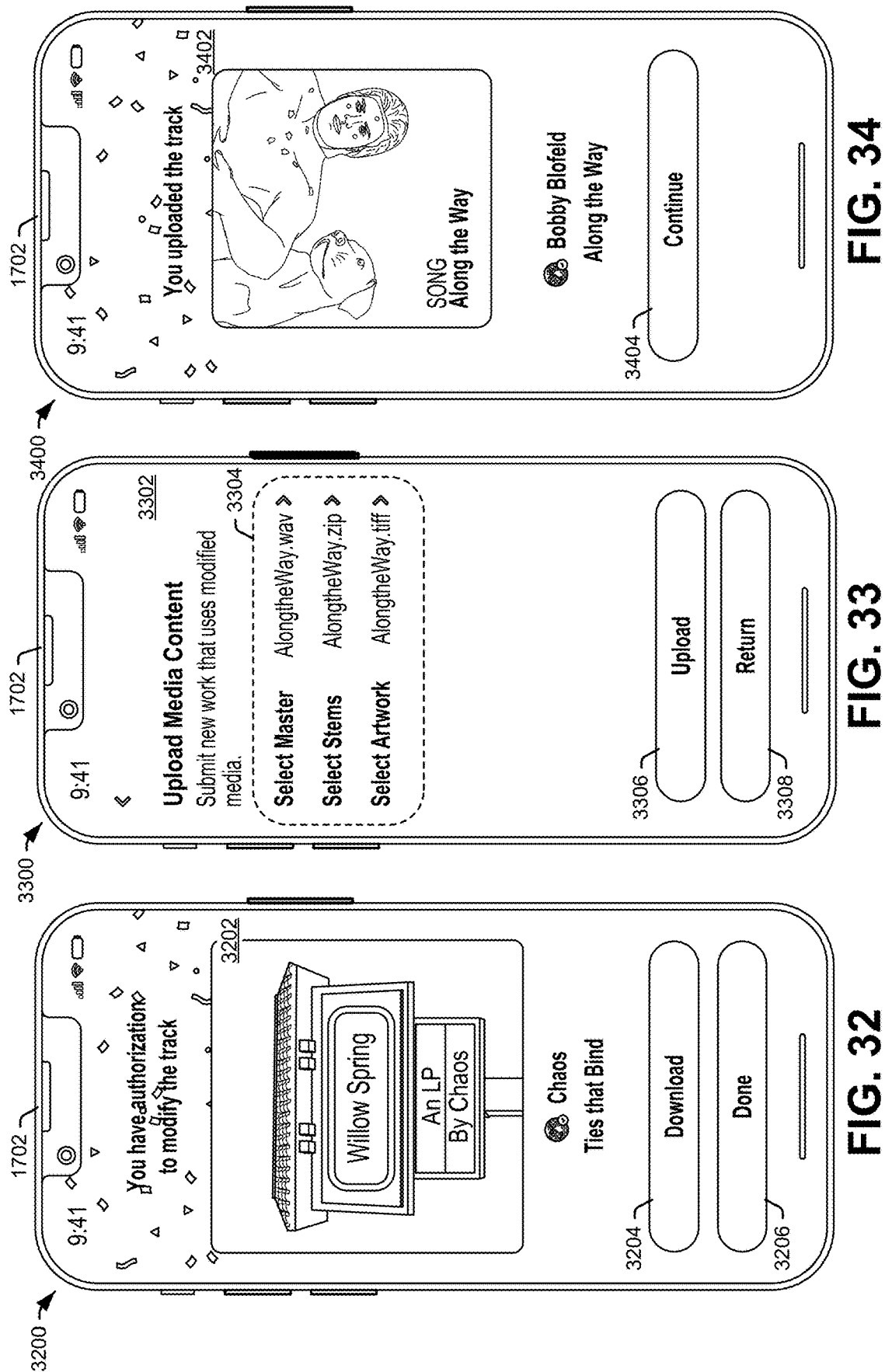

FIG. 32 depicts a non-limiting example 3200 of a user interface of a media content platform.

The illustrated example 3200 depicts the computing device 1702 displaying a user interface 3202 for the derivative artist 108. In one or more implementations, the user interface 3202 is an interface in a series or sequence of user interfaces presented to the derivative artist 108, which enable the derivative artist 108 to select a media content item to authorize for modification in a derivative work and/or select terms of access controls with which to generate an authorization for modifying a selected media content item.

In this example 3200, the user interface 3202 includes a notification that the derivative artist 108 has been granted authorization to modify the media content item 134 (e.g., in response to the derivative artist 108 selecting the control 3004). In one or more implementations, this indicates that media content platform 116 has generated, and the derivative artist 108 has received or has otherwise been granted, the authorization 146 to use the media content item 134 in accordance with the access control(s) 130 included in the authorization. In this example, the user interface 3202 also provides access to the authorized media content item, e.g., the media content item 134. By way of example, the user interface 3202 includes an interface control 3204, which is selectable to obtain the media content item 134. In this example, the interface control 3204 is selectable to download the media content item 134, e.g., to a computing device of the derivative artist 108. Additionally or alternatively, the media content platform 116 may provide access to the media content item 134 via the content editing tool 150. It is to be appreciated that the media content platform 116 may provide, and the derivative artist 108 may access, an authorized media content item in other ways without departing from the spirit or scope of the described techniques.

The user interface 3202 is also depicted presenting another option 3206, e.g., a "done" option, to end the media content selection and term acceptance process. In one or more implementations, selection of the other option 3206 returns the derivative artist 108 to a particular user interface of the media content platform 116, such as a home screen of the platform, a content editing screen associated with the content editing tool 150 (e.g., with the media content item 134 available to use), or a dashboard of the derivative artist 108.

It is to be appreciated that in one or more implementations, one or more of the user interfaces discussed in relation to FIGS. 17-32 may not be presented to the derivative artist 108, e.g., as part of selecting a media content item to modify and/or selecting terms with which to receive authorization to modify a selected media content item. Certainly, different user interfaces may be surfaced by the media content platform 116 to the derivative artist 108 to enable the derivative artist 108 to select a media content item and/or to select the terms with which to modify the media content item.

In the context of user interfaces presented to the derivative artist 108 in connection with receiving the derivative work 152 including at least a portion of the media content item 134, consider the following discussion of FIGS. 33-36. In one or more implementations, such user interfaces are displayed via appropriately configured display devices that are associated with computing devices, e.g., the display devices are integral with the computing devices or are communicably coupled (via a wired or wireless connection to them). The depicted form factor (mobile phone) should not be considered limiting.

FIG. 33 depicts a non-limiting example 3300 of a user interface of a media content platform.

The illustrated example 3300 depicts the computing device 1702 displaying a user interface 3302 for the derivative artist 108. In one or more implementations, the user interface 3302 is an interface in a series or sequence of user interfaces presented to the derivative artist 108, which enable the derivative artist 108 to submit a derivative work that includes a modified media content item (e.g., the derivative work 152) to the media content platform 116. It is to be appreciated that in variations, the derivative artist 108 generates the derivative work 152 at least partially within the media content platform 116 via the content editing tool 150.

In this example 3300, the user interface 3302 includes selection elements 3304 that enable the derivative artist 108 to select file(s) corresponding to the derivative work 152 that are to be uploaded to the media content platform 116. In one or more implementations, the selection elements 3304 include one or more elements for selecting audio file(s), one or more elements for selecting images and/or videos associated with the derivative work 152, and so forth. In at least one implementation, the selection elements 3304 enable the derivative artist 108 to select a mastered version of the derivative work 152 as well as individual stems that comprise the derivative work 152.

In this example, the user interface 3302 also presents a first control option 3306. By way of example, first control option 3306 is selectable to upload the selected file(s), e.g., from the computing device 1702 of the derivative artist 108 to the media content platform 116. It is to be appreciated that the derivative artist 108 may provide the derivative work 152 to the media content platform 116 in other ways without departing from the spirit or scope of the described techniques. By way of example, a third-party platform or distributor may provide the derivative work 152 to the media content platform 116.

The user interface 3302 is also depicted a second option 3308, e.g., a "return" option. In one or more implementations, selection of the second option 3308 returns the derivative artist 108 to a particular user interface of the media content platform 116, such as a home screen of the platform or a dashboard of the derivative artist 108, without uploading the selected file(s).

FIG. 34 depicts a non-limiting example 3400 of a user interface of a media content platform.

The illustrated example 3400 depicts the computing device 1702 displaying a user interface 3402 for the derivative artist 108. In one or more implementations, the user interface 3402 is an interface in a series or sequence of user interfaces presented to the derivative artist 108, which enable the derivative artist 108 to submit a derivative work that includes a modified media content item (e.g., the derivative work 152).

In this example 3400, the user interface 3402 includes a notification that the derivative artist 108 successfully uploaded the derivative work 152 (e.g., in response to the derivative artist 108 selecting the first control option 3306). The user interface 3402 is also depicted presenting a control option 3404, e.g., a "continue" option. In one or more implementations, selection of the control option 3404 generates a subsequent user interface in relation to uploading the derivative work 152, such as will be described in relation to FIG. 35.

Figure 35:
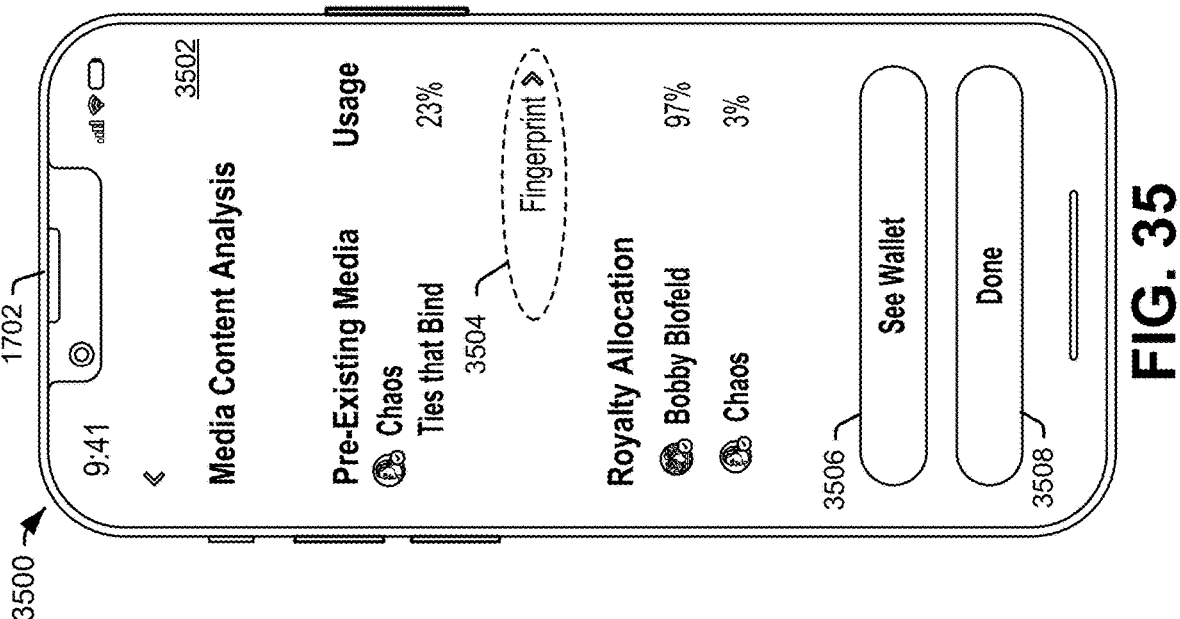

FIG. 35 depicts a non-limiting example 3500 of a user interface of a media content platform.

The illustrated example 3500 depicts the computing device 1702 displaying a user interface 3502 for the derivative artist 108. In one or more implementations, the user interface 3502 is an interface in a series or sequence of user interfaces presented to the derivative artist 108, which enable the derivative artist 108 to submit a derivative work that includes a media content item created by another artist (e.g., the derivative work 152).

In this example 3500, the user interface 3502 includes a media content analysis output, e.g., from the media content platform 116. By way of example, the media content platform 116 may determine an amount of usage of the media content item 134 in the derivative work 152 based on the NFT 138 associated with the media content item 134. Additionally or alternatively, the media content platform 116 may determine usage of the media content item 134 based on a music fingerprint of the derivative work 152, which may be viewable via selection of an interface element 3504. In at least one implementation, the user interface 3502 may output the music fingerprint, which may highlight portions of the derivative work 152 that feature the media content item 134, in response to the derivative artist 108 tapping, holding, or providing another pre-determined input to the interface element 3504 (e.g., hovering via a mouse pointer).

In one or more implementations, the user interface 3502 further indicates an allocation of royalties according to the usage of the media content item 134 in the derivative work 152 and as specified in the access control(s) 130 accepted by the derivative artist 108. By way of example, the media content platform 116 analyzes the media content of the derivative work 152 in response to the derivative artist 108 uploading the derivative work 152 (e.g., via the user interface 3302) and generates or updates a smart contract on the blockchain system 136 based on the analysis. In at least one implementation, generating (or updating) the smart contract includes minting the NFT 154 for the derivative work 152.

In this example, the user interface 3502 also presents a first control option 3506. By way of example, the first control option 3506 is selectable to view a wallet (e.g., digital wallet) that may track assets associated with the derivative artist 108, including NFTs associated with the derivative work 152, licensing fees, smart contracts, royalties, as so forth.

The user interface 3502 is also depicted a second option 3508, e.g., a "done" option. In one or more implementations, selection of the second option 3508 returns the derivative artist 108 to a particular user interface of the media content platform 116, such as a home screen of the platform or a dashboard of the derivative artist 108.

Figure 36:
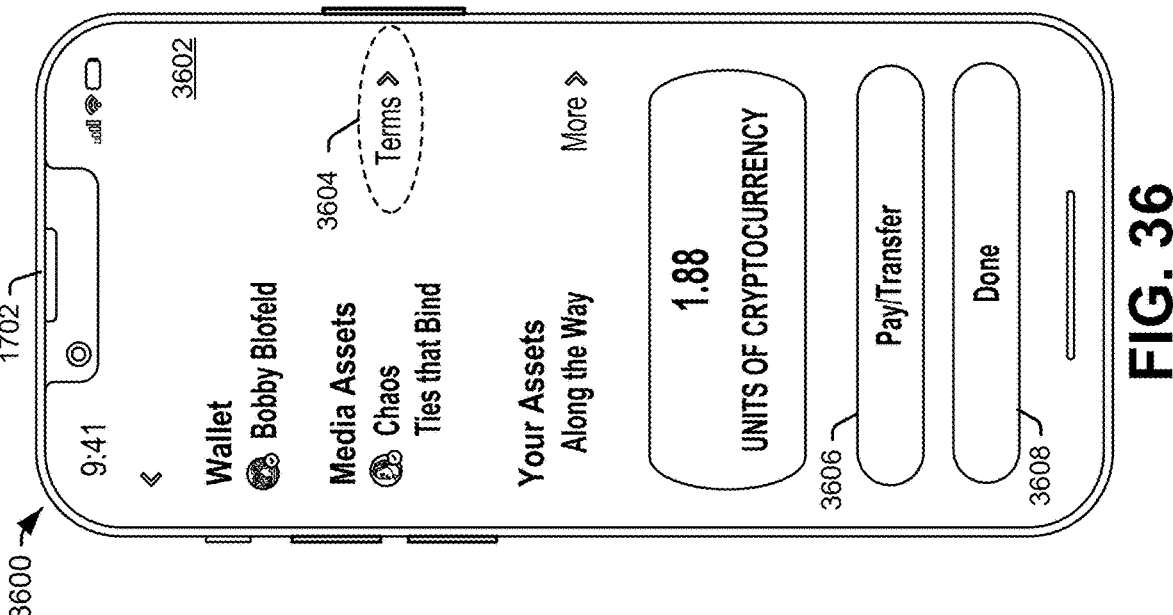

FIG. 36 depicts a non-limiting example 3600 of a user interface of a media content platform.

The illustrated example 3600 depicts the computing device 1702 displaying a user interface 3602 for the derivative artist 108. In one or more implementations, the user interface 3602 is an interface in a series or sequence of user interfaces presented to the derivative artist 108, which enable the derivative artist 108 to control a derivative work that includes a modified media content item (e.g., the derivative work 152).

In this example 3600, the user interface 3602 displays a digital wallet. By way of example, user interface 3602 shows assets that have been authorized for modification by the derivative artist 108 as well as assets at least partially owned by the derivative artist 108, such as the derivative work 152 and currency (e.g., cryptocurrency or government-backed currency). In at least one implementation, the user interface 3602 enables the derivative artist 108 to review access control(s) 130 of the authorization 146, which may be viewable via selection of an interface element 3604. For example, the user interface 3602 may output the authorization 146 in response to the derivative artist 108 tapping, holding, or providing another pre-determined input to the interface element 3604 (e.g., hovering via a mouse pointer).

In one or more implementations, the digital wallet receives payouts from royalties, licensing fees, or other monetary compensation generated by the assets of the derivative artist 108. By way of example, the media content platform 116 may automatically distribute allocated royalties to the derivative artist 108 according to the terms defined by the smart contract. In this example, the user interface 3602 also presents a first control option 3606. By way of example, the first control option 3606 is selectable to submit payments to another user (e.g., of the media content platform 116), receive payments from another user, or transfer assets to another user. For example, selection of the first control option 3606 may generate another user interface that facilitates the payment or transfer. The user interface 3602 is also depicted as having a second option 3608, e.g., a "done" option. In one or more implementations, selection of the second option 3608 returns the derivative artist 108 to a particular user interface of the media content platform 116, such as a home screen of the platform or a dashboard of the derivative artist 108. It is to be appreciated that although the user interface 3602 is described with respect to the derivative artist 108, a similar user interface may be provided to the content-source artist 104 for managing assets.

It is to be appreciated that in one or more implementations, one or more of the user interfaces discussed in relation to FIGS. 33-36 may not be presented to the derivative artist 108, e.g., as part of receiving the derivative work 152 from the derivative artist 108. Certainly, different user interfaces may be surfaced by the media content platform 116 to the derivative artist 108 to enable the derivative artist 108 to upload and manage the derivative work 152.

The following discussion describes examples of procedures for a media content platform. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

FIG. 37 depicts a procedure 3700 for surfacing media content for modification in an example implementation of a media content platform.

A request is received from a first artist entity, by a media content platform, to make a media content item of the first artist entity available for modification by other entities on the media content platform (block 3702). In accordance with the principles discussed herein, the request includes one or more access controls that control use of the media content item in derivative works. By way of example, the first artist entity (e.g., the content-source artist 104) provides the request 132 to the media content platform 116 to enable access to the media content item 134 of the content-source artist 104 via the media content platform 116. The request 132 includes access control(s) 130, which control use of the media content item, e.g., by the derivative work artists 106 (e.g., other entities on the media content platform) in derivative works. By way of example, the request 132 may be generated responsive to receiving user input from the content-source artist 104 via a sequence of user interfaces, which guide the content-source artist 104 through a workflow of selecting the media content item 134 (which may correspond to only a portion of a media content item or a plurality of media content items in one or more implementations) and defining the access control(s) 130 based on selections of one or more user interface controls, as discussed in more detail above.

The media content item is stored on the media content platform (block 3704). In accordance with the principles discussed herein, the listing makes the media content item available for modification and associates the media content item with one or more characteristics of the media content item and the one or more access controls. By way of example, the media content platform 116 receives the request 132 from the content-source artist 104, and the media content platform 116 enables access to the media content item 134 by listing the media content item 134 on the media content platform 116, such that the media content item 134 is surfaced to client devices of users of the media content platform 116, e.g., users with sufficient permission(s). For example, the media content platform 116 generates a listing of the media content item 134, which is listed on the media content platform 116 with listings for a plurality of other media items, e.g., other media items of the content-source artist 104 and/or other artists. As part of the listing, the media content platform 116 associates the media content item 134 with one or more of the characteristic(s) 128. Additionally, in one or more implementations, the media content platform 116 associates the media content item 134 with the access control(s) 130, which may include one or more terms in various scenarios. Broadly, the access control(s) 130 control use of the media content item 134 in derivative works, such as by an entity (e.g., the derivative artist 108) that acquires the media content item 134 for modification. That is, the access control(s) 130 are included as part of and/or define an authorization for use of the media content item 134 by the derivative artist 108, thus also defining terms for controlling access to a derivative work that incorporates the media content item 134. The media content item 134 may be stored along with the characteristic(s) 128 and the access control(s) 130 in the storage 122 of the media content platform 116, for example.

An NFT is minted in association with the media content item on a blockchain (block 3706). By way of example, the media content platform 116 causes the NFT to be created on the blockchain (e.g., of the blockchain system 136), which programmatically encodes, or encodes an association of, the media content item 134 with the NFT (e.g., the NFT 138). In accordance with the techniques described herein, the NFT 138 encodes a unique identity that enables usage and transfer of the media content item 134 (e.g., between users of the media content platform 116) to be digitally tracked. The NFT 138 may also encode the access control(s) 130 associated with the media content item 134. Alternatively, the NFT is minted in association with the media content item irrespective of the access control(s) 130 and independent of how and where the media content item 134 may be used, if at all, in a derivative work.

A subset of media content items from media content items that are available for access are surfaced to a second artist entity via a user interface of the media content platform (block 3708). In accordance with the principles discussed herein, the subset of media content items that are surfaced include the media content item. By way of example, the media content platform 116 surfaces one or more media content items to the derivative work artists 106, including the derivative artist 108 (e.g., the second artist entity). For example, the media content platform 116 surfaces listings to the derivative work artists 106 via an interface of the media content platform 116, where the listings each list a respective media content item made accessible on the media content platform 116 by a respective artist entity (or by an entity associated with the artist entity). The media content platform 116 may surface recommended media content item(s) 140 to the derivative artist 108. The recommended media content item(s) 140 include the media content item 134 from the content-source artist 104. The recommended media content item(s) 140 may be surfaced to the derivative artist 108, for instance, via a user interface of the media content platform 116 and responsive to various actions of the derivative artist 108 with the media content platform 116, such as one or more of the actions described above, e.g., opening an application, requesting a recommendation of media content items, searching for media content items, and so on.

A request to modify the media content item is received from the second artist entity via the user interface of the media content platform (block 3710). By way of example, the derivative artist 108 provides a selection 142 of the media content item 134 via a user interface. The request to modify the media content item 134 includes selecting the media content item 134 for use in a new, derivative work, such as by sampling or remixing the media content item 134.

At block 3712, a determination is made as to whether the second artist entity has agreed to the access controls that control use of the media content item in derivative works. By way of example, the selection 142 of the media content item 134 via the user interface may include the access control acceptance 144, which accepts the access control(s) 130 associated with the media content item 134 that the content-source artist 104 indicated are acceptable for use of the media content item 134 in derivative works. If the selection at block 3710 does not include an access control acceptance that accepts the access controls associated with the media content item, then the media content platform prevents access to the media content item by the second artist entity (block 3714).

If, however, the selection at block 3710 accepts the access controls associated with the media content item, then the media content item and an authorization for accessing the media content item that includes the one or more access controls is provided to the second artist entity (block 3716). By way of example, if it is determined that the derivative artist 108 has accepted the access control(s) 130 associated with the media content item 134, then the media content platform 116 generates the authorization 146 for the media content item 134 that includes the access control(s) 130 and provides the derivative artist 108 access to the media content item 134. In particular, the authorization 146 is generated by the media content platform 116 to permit the derivative artist 108 (or an entity corresponding to the derivative artist) to incorporate the media content item 134 in a derivative work according to the access control(s) 130 of the authorization 146. In at least one implementation, the derivative artist 108 accesses the media content item 134 via the content editing tool 150 of the media content platform 116. Additionally or alternatively, the derivative artist 108 receives access to a downloadable version of the media content item 134 for modification by other content editing tools.

The media content platform 116 provides the authorization 146 to the derivative artist 108. For example, the media content platform 116 communicates a document and/or some other digital mechanism (e.g., a smart contract) corresponding to the authorization 146 to the derivative artist 108. Alternatively or additionally, the media content platform 116 presents the authorization 146 (and/or terms of a license that is defined according to the access controls) to the derivative artist 108 via a user interface. Thus, the derivative artist 108 receives access to the media content item 134 of the content-source artist 104 (e.g., for use in a derivative work of media content items) from the media content platform 116, along with the authorization 146 which meets the access control(s) 130 specified by the content-source artist 104 for modifying the media content item 134.

A new media content item that incorporates at least a portion of the media content item is received from the second artist entity (block 3718). By way of example, the derivative artist 108 submits the new media content item (e.g., the derivative work 152) via the user interface of the media content platform. As explained above, the derivative work 152 is a remix of the media content item 134 (or a portion thereof) or includes a sample of the media content item 134 (or a portion thereof). In at least one implementation, the derivative work 152 is at least partially generated through user interaction with the content editing tool 150.

An NFT is minted in association with the new media content item on the blockchain (block 3720). By way of example, the media content platform 116 causes the NFT to be created on the blockchain, which programmatically encodes, or encodes an association of, the derivative work 152 with the NFT (e.g., the NFT 154). In accordance with the techniques described herein, the NFT 154 encodes a unique identity that enables usage and transfer of the derivative work 152 (e.g., between users of the media content platform 116) to be digitally tracked. In at least one implementation, the NFT 154 is or includes a smart contract (e.g., the smart contract 156) that includes the access control(s) 130 of the authorization agreement between derivative artist 108 and the content-source artist 104 directly written into lines of code that are stored across the blockchain system 136. The code automatically executes, controls, and/or document events and actions surrounding the derivative work 152 according to the access control(s) 130, including the distribution of royalties.

FIG. 38 depicts a procedure 3800 in an example implementation of a media content platform.

A request is received from a source artist entity, by a media content platform, to enable access, via the media content platform, to a media content item of the source artist entity by derivative artist entities (block 3802). By way of example, a content-source artist 104 provides a request 132 to the media content platform 116 to enable access to a media content item 134 of the content-source artist 104 by the derivative work artists 106.

A user interface configured to enable the source artist entity to define one or more access controls that control usage of the media content item by the derivative artist entities is displayed by the media content platform (block 3804). By way of example, a user interface configured to enable the source artist entity to define one or more access controls that control usage of (e.g., modification of) the media content item 134 is displayed by the media content platform 116. In one or more implementations, the media content platform may display a sequence of user interfaces to guide the content-source artist 104 through a workflow of selecting the media content item 134 and defining the access control(s) 130 based on selections of one or more user interface controls. An example of displaying a sequence of user interfaces for the content-source artist 104 is discussed above with regards to FIGS. 5-16. However, it is to be appreciated that in one or more implementations, one or more of the user interfaces discussed in relation to FIGS. 5-16 may not be presented to the content-source artist 104, e.g., as part of requesting that access to a media content item be enabled and/or selecting access controls for controlling usage of the media content item. Certainly, different user interfaces may be surfaced by the media content platform 116 to the content-source artist 104 to enable the content-source artist 104 to request that a media content item be made available for modification by the derivative work artists 106 and/or to select access controls for controlling the modification of the media content item.

User input defining the one or more access controls that control the usage of the media content item is received via the user interface displayed by the media content platform (block 3806). By way of example, user input defining the access control(s) 130 that control usage of the media content item 134 in derivative works is received via a user interface displayed by the media content platform 116, e.g., via one or more of the user interfaces depicted in FIGS. 5-16 discussed above.

The media content item is listed on the media content platform (block 3808). In accordance with the principles discussed herein, the listing enables the media content item to be accessed via the media content platform. By way of example, the media content platform 116 enables access to the media content item 134 by listing the media content item 134 on the media content platform 116, such that the media content item 134 is surfaced to client devices of users of the media content platform 116, e.g., users with sufficient permission(s). For example, the media content platform 116 generates a listing of the media content item 134, which is listed on the media content platform 116 with listings for a plurality of other media items, e.g., other media items of the content-source artist 104 and/or other artists.

At block 3810, a determination is made as to whether an access request to modify the media content item listed on the media content platform has been received from a derivative artist entity. By way of example, the media content platform 116 monitors requests received from derivative work artists 106 to access the media content item 134 for usage in a derivative work (e.g., by remixing or sampling the media content item 134). A derivative artist 108 can access the media content item 134, for example, by providing the selection 142 of the media content item 134 that includes the access control acceptance 144 accepting the access control(s) 130 associated with the media content item 134.

If an access request to access the media content item is received, then a notification that a derivative artist entity has selected the media content item for use in a derivative work is output to the source artist entity (block 3812). By way of example, if the derivative artist 108 selects the media content item 134, then the media content platform 116 provides the authorization notification 148 to the content-source artist 104. The authorization notification 148 indicates that the media content item 134 has been authorized for modification, e.g., by the derivative artist. In at least one variation, the media content platform 116 provides a dashboard (e.g., via a user interface) to the content-source artist 104, which provides a status of one or more of the content-source artist 104's media content items (e.g., in terms of granted authorizations). By way of example, the media content platform 116 provides a dashboard that lists the media content items which the artist has requested to list on the media content platform 116, e.g., as being available for one or more derivative work artists 106 to use in derivative works. In one or more implementations, the dashboard may also indicate media content items of the content-source artist 104 which are electronically visible (e.g., known) to the media content platform 116 but are not listed for use.

In contrast, if the access request to access the media content item is not received, then the listing of the media content item is maintained (block 3814). By way of example, the media content platform 116 continues to list the media content item 134 even if the media content item 134 has not yet been requested for use by the derivative work artists 106.

FIG. 39 depicts a procedure 3900 in an example implementation of a media content platform.

A request is received from a derivative artist entity, by a media content platform, to make a derivative work available on the media content platform (block 3902). In accordance with the principles discussed herein, the derivative work incorporates at least a portion of a media content item created by a source artist entity. By way of example, the derivative artist 108 provides a request to the media content platform 116 to upload the derivative work 152 to the media content platform 116, which may include storing the derivative work 152 in storage 122 of the media content platform 116.

The derivative work is processed to detect that the derivative work incorporates the media content item (block 3904). In accordance with the principles discussed herein, the processing includes identifying a usage amount of the media content item in the derivative work. By way of example, the media content platform 116 parses the derivative work 152 to detect the underlying and unique media content portions therein. The media content platform 116 may further identify the rights-holding artists of the unique media content portions, an example of which is the content-source artist 104 of the media content item 134.

Access controls defined by the source artist entity for inclusion of the media content item in derivative work is output to the derivative artist entity via a user interface of the media content platform (block 3906). By way of example, a user interface configured to enable the derivative artist 108 to select or otherwise indicate acceptance of one or more access controls that control usage of (e.g., modification of) the media content item 134 is displayed by the media content platform 116. In one or more implementations, the media content platform may display a sequence of user interfaces to guide the derivative artist 108 through a workflow of selecting the media content item 134 and selecting the access control(s) 130 based on selections of one or more user interface controls. An example of displaying a sequence of user interfaces for the derivative artist 108 is discussed above with regards to FIGS. 17-32. However, it is to be appreciated that in one or more implementations, one or more of the user interfaces discussed in relation to FIGS. 17-32 may not be presented to the derivative artist 108, e.g., as part of selecting terms for authorizing modification of the media content item 134 in the derivative work 152. Certainly, different user interfaces may be surfaced by the media content platform 116 to the derivative artist 108 to enable the derivative artist 108 to accept access controls in relation to incorporation of the media content item 134 in the derivative work 152.

User input selecting the one or more access controls is received from the derivative artist entity via the user interface of the media content platform (block 3908). By way of example, the access control(s) 130 are at least partially defined by the content-source artist 104 to control usage of the media content item 134 in the derivative work 152, and user input selecting the access control(s) 130 is received from the derivative artist 108 via a user interface displayed by the media content platform 116, e.g., via one or more of the user interfaces depicted in FIGS. 17-32 discussed above.

At block 3910, a determination is made as to whether an acceptance of the access controls has been received from the derivative artist entity. By way of example, the media content platform 116 receives the selection 142 from the derivative artist 108 that includes the access control acceptance 144 accepting the access control(s) 130 associated with the media content item 134. If the acceptance of the access control(s) 130 has not been received, then the media content platform prevents access to the derivative work (block 3912). By way of example, the media content platform 116 will not make the derivative work 152 available on the media content platform 116 by other users or entities, such as by not surfacing the derivative work 152.

In at least one implementation, the derivative artist 108 and the content-source artist 104 may undergo negotiations via centralized communications hosted via the media content service provider system 102 in response to the derivative artist 108 not accepting the access controls. By way of example, the communications may be delivered in substantially real-time or near real-time, where communications submitted by one party are delivered to the other party without intentional delay. The communications may include, but are not limited to, requests submitted by the derivative artist 108 for modification of the access control(s) 130 by the content-source artist 104. In at least one implementation, such requests are submitted by the derivative artist 108 selecting (e.g., tapping) an access control and requesting an alternative term for that access control. As a non-limiting example, the derivative artist 108 may request a longer or shorter authorization term for usage of the media content item 134.

The media content service provider system 102 may output a notification to the content-source artist 104 regarding the request submitted by the derivative artist 108, e.g., via a user interface of the application 109. The content-source artist 104 may approve or deny the request. If approved, the media content service provider system 102 may output a notification to the derivative artist 108 so that the updated access controls defined by the content-source artist 104 can be output to the derivative artist 108 (e.g., by returning to block 3906). In this way, the media content service provider system 102 provides a centralized platform for both enforcing and negotiating the access control(s) 130 for the media content item 134 that is less resource intensive than conventional ad-hoc communication techniques.

If, however, the acceptance of the access control(s) 130 is received from the derivative artist 108, access to the derivative work is provided on the media content platform (block 3914). By way of example, the media content platform 116 enables access to the derivative work 152 by listing the derivative work 152 on the media content platform 116, such that the derivative work 152 is surfaced to client devices of users of the media content platform 116, e.g., users with sufficient permission(s). For example, the media content platform 116 generates a listing of derivative work 152, which is listed on the media content platform 116 with listings for a plurality of other media items, e.g., other media items of the derivative artist 108, the content-source artist 104, and/or other artists.

An authorization for including the media content item in the derivative work that includes the one or more access controls is provided to the derivative artist entity (block 3916). By way of example, the media content platform 116 generates the authorization 146 for the media content item 134 that includes the access control(s) 130. In particular, the authorization 146 is generated by the media content platform 116 to permit the derivative artist 108 (or an entity corresponding to the derivative artist) to distribute or otherwise make the derivative work 152 that incorporates the media content item 134 publicly available according to the access control(s) 130 of the authorization 146. In contrast, without the authorization 146, the derivative artist 108 may not have permission to make the derivative work 152 that incorporates the media content item 134 publicly available.

As one example, to provide the authorization 146 to the derivative artist 108, the media content platform 116 communicates a document and/or some other digital mechanism (e.g., a smart contract) corresponding to the authorization 146 to the derivative artist 108. Alternatively or additionally, the media content platform 116 presents the authorization 146 (and/or terms of an associated license) to the derivative artist 108 via a user interface.

An NFT is minted in association with the derivative work on a blockchain (block 3918). In accordance with the principles discussed herein, the NFT includes a smart contract generated based on the one or more access controls. By way of example, the media content platform 116 causes the NFT to be created on the blockchain, which programmatically encodes, or encodes an association of, the derivative work 152 with the NFT (e.g., the NFT 154). In accordance with the techniques described herein, the NFT 154 encodes a unique identity that enables usage and transfer of the derivative work 152 (e.g., between users of the media content platform 116) to be digitally tracked.

The NFT 154 is or encodes the smart contract (e.g., the smart contract 156), which includes the access control(s) 130 accepted by derivative artist 108 and defined by the content-source artist 104 directly written into lines of code that are stored across the blockchain system 136. The code automatically executes, controls, and/or document events and actions surrounding the derivative work 152 according to the access control(s) 130, including the distribution of royalties. For example, the derivative work 152 may generate revenue via streams, sales, or additional modification authorization, just to name a few. In at least one implementation, the smart contract 156 defines an amount of the revenue that is owed to the derivative artist 108, the content-source artist 104, and any other rights-holding entities (e.g., additional artists, labels, producers, etc.). The amount may be a percentage of the revenue or a fixed value per stream, sale, etc. of the derivative work 152.

Revenue generated by the derivative work is allocated to the source artist entity and the derivative artist entity according to the smart contract (block 3920). By way of example, the smart contract 156 automatically distributes the revenue to the content-source artist 104, the derivative artist 108, and any other rights-holding entities at fixed intervals (e.g., daily, monthly, quarterly, yearly) or variable intervals (e.g., in response to reaching a threshold amount of revenue, in response each occurrence of revenue generation, or in response to another type of pre-programmed condition being met) according to instructions programmed therein. In at least one implementation, the smart contract 156 utilizes a multi-sync wallet that collects the revenue generated by the derivative work 152 and distributes allotted portions of the collected revenue to digital wallets of the content-source artist 104, the derivative artist 108, and any other rights-holding entities at the fixed or variable intervals. Because the smart contract 156 self-executes, it enforces the access control(s) 130, including terms defining the distribution of royalties, automatically and without manual user intervention or maintenance.

Figure 40:
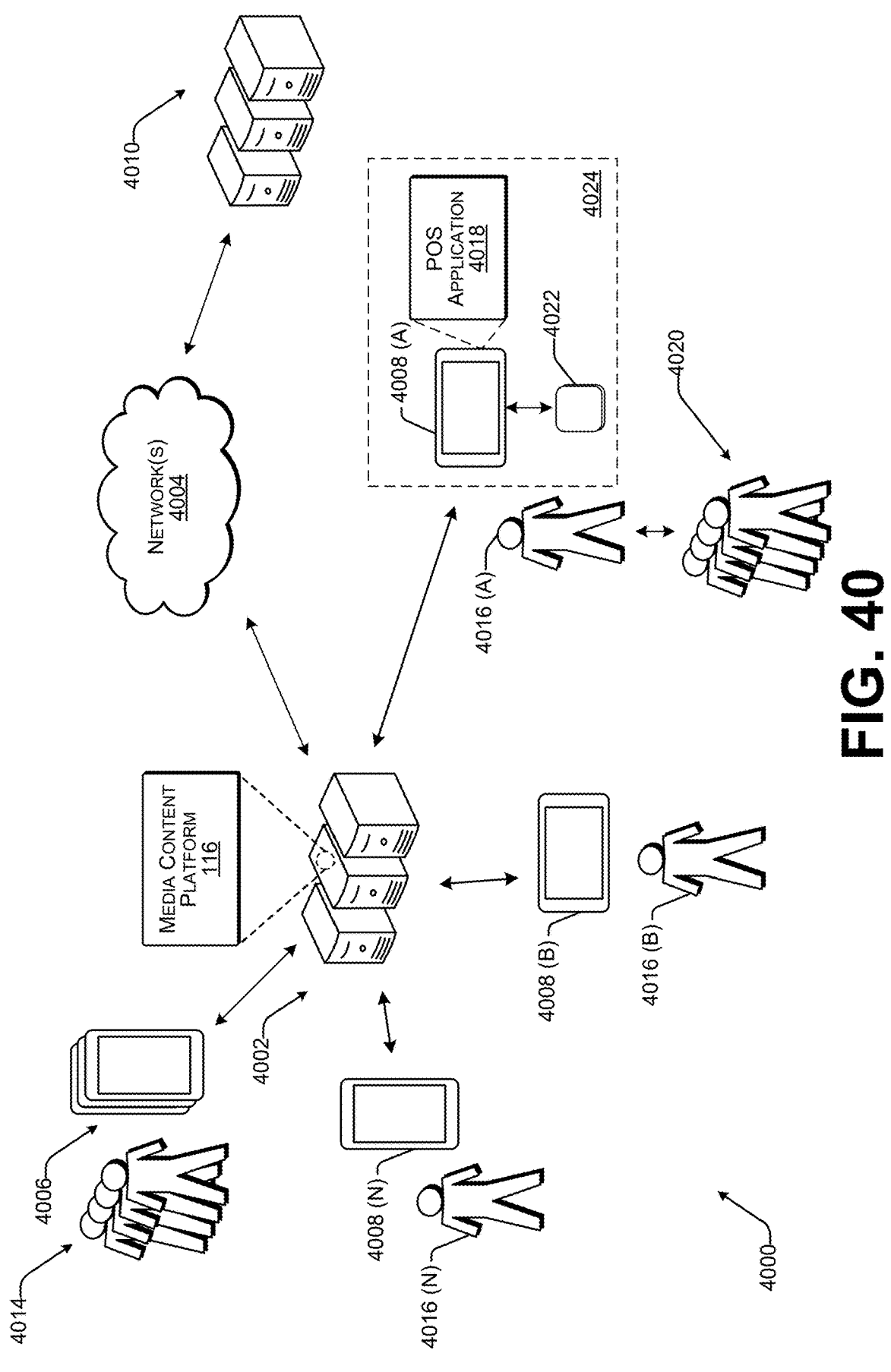
FIG. 40 depicts an example environment with which techniques for media content modification with access control configurations described herein can be implemented, according to an embodiment described herein.

FIG. 40 illustrates an example environment 4000. The environment 4000 includes server(s) 4002 that can communicate over a network 4004 with user devices 4006 (which, in some examples can be merchant devices 4008 (individually, 4008(A)-4008(N))) and/or server(s) 4010 associated with third-party service provider(s). The server(s) 4002 can be associated with a service provider that can provide one or more services for the benefit of users 4014, as described below. Actions attributed to the service provider can be performed by the server(s) 4002.

In the context of the previously described figures, for example, at least a portion of the server(s) 4002 may be used to implement the media content platform 116 and/or various portions of the media content service provider system 102.

The environment 4000 can include a plurality of user devices 4006, as described above. Each one of the plurality of user devices 4006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 4014. The users 4014 can be referred to as customers, buyers, merchants, sellers, borrowers, employees, employers, payors, payees, couriers and so on. The users 4014 can interact with the user devices 4006 via user interfaces presented via the user devices 4006, such as one or more of the user interfaces depicted in FIGS. 5-36. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 4006 can have an instance or versioned instance of an application, which can be downloaded from an application store, for example, which can present the user interface(s) described herein. In at least one example, a user 4014 can interact with the user interface via touch input, spoken input, or any other type of input.

As described above, in at least one example, the users 4014 can include merchants 4016 (individually, 4016(A)-4016(N)). In an example, the merchants 4016 can operate respective merchant devices 4008, which can be user devices 4006 configured for use by merchants 4016. By way of example, a merchant device 4008 may be configured with a user interface that enables a respective merchant to accept cryptocurrency payments from a user device 4006 of a customer. For the purpose of this discussion, a "merchant" can be any entity that offers items (e.g., goods or services) for purchase or other means of acquisition (e.g., rent, borrow, barter, etc.). The merchants 4016 can offer items for purchase or other means of acquisition via brick-and-mortar stores, mobile stores (e.g., pop-up shops, food trucks, etc.), online stores, combinations of the foregoing, and so forth. In some examples, at least some of the merchants 4016 can be associated with a same entity but can have different merchant locations and/or can have franchise/franchisee relationships. In additional or alternative examples, the merchants 4016 can be different merchants. That is, in at least one example, the merchant 4016(A) is a different merchant than the merchant 4016(B) and/or the merchant 4016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 4008 can have an instance of a POS application 4018 stored thereon. The POS application 4018 can configure the merchant device 4008 as a POS terminal, which enables the merchant 4016(A) to interact with one or more customers 4020. As described above, the users 4014 can include customers, such as the customers 4020 shown as interacting with the merchant 4016(A). For the purpose of this discussion, a "customer" can be any entity that acquires items from merchants. While two customers 4020 are illustrated in FIG. 40, any number of customers 4020 can interact with the merchants 4016. Further, while FIG. 40 illustrates the customers 4020 interacting with the merchant 4016(A), the customers 4020 can interact with any of the merchants 4016.

In at least one example, interactions between the customers 4020 and the merchants 4016 that involve the exchange of funds (from the customers 4020) for items (from the merchants 4016) can be referred to as "transactions." In at least one example, the POS application 4018 can determine transaction data associated with the POS transactions. Transaction data can include payment information, which can be obtained from a reader device 4022 associated with the merchant device 4008(A), user authentication data, purchase amount information, point-of-purchase information (e.g., item(s) purchased, date of purchase, time of purchase, etc.), etc. The POS application 4018 can send transaction data to the server(s) 4002 such that the server(s) 4002 can track transactions of the customers 4020, merchants 4016, and/or any of the users 4014 over time. Furthermore, the POS application 4018 can present a user interface to enable the merchant 4016(A) to interact with the POS application 4018 and/or the service provider via the POS application 4018.

In at least one example, the merchant device 4008(A) can be a special-purpose computing device configured as a POS terminal (via the execution of the POS application 4018). In at least one example, the POS terminal may be connected to a reader device 4022, which is capable of accepting a variety of payment instruments, such as credit cards, debit cards, gift cards, short-range communication-based payment instruments, and the like, as described below. In at least one example, the reader device 4022 can plug in to a port in the merchant device 4008(A), such as a microphone port, a headphone port, an audio-jack, a data port, or other suitable port. In additional or alternative examples, the reader device 4022 can be coupled to the merchant device 4008(A) via another wired or wireless connection, such as via a Bluetooth®, BLE, and so on. Additional details are described below with reference to FIG. 43. In some examples, the reader device 4022 can read information from alternative payment instruments including, but not limited to, wristbands and the like.

In some examples, the reader device 4022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 4022, and communicate with the server(s) 4002, which can provide, among other services, a payment processing service. The server(s) 4002 associated with the service provider can communicate with server(s) 4010, as described below. In this manner, the POS terminal and reader device 4022 may collectively process transaction(s) between the merchants 4016 and customers 4020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 4022 of the POS system 4024 are shown as separate devices, in additional or alternative examples, the POS terminal and the reader device 4022 can be part of a single device. In some examples, the reader device 4022 can have a display integrated therein for presenting information to the customers 4020. In additional or alternative examples, the POS terminal can have a display integrated therein for presenting information to the customers 4020. POS systems, such as the POS system 4024, may be mobile, such that POS terminals and reader devices may process transactions in disparate locations across the world. POS systems can be used for processing card-present transactions and card-not-present (CNP) transactions, as described below.

A card-present transaction is a transaction where both a customer 4020 and his or her payment instrument are physically present at the time of the transaction. Card-present transactions may be processed by swipes, dips, taps, or any other interaction between a physical payment instrument (e.g., a card), or otherwise present payment instrument, and a reader device 4022 whereby the reader device 4022 is able to obtain payment data from the payment instrument. A swipe is a card-present transaction where a customer 4020 slides a card, or other payment instrument, having a magnetic strip through a reader device 4022 that captures payment data contained in the magnetic strip. A dip is a card-present transaction where a customer 4020 inserts a payment instrument having an embedded microchip (i.e., chip) into a reader device 4022 first. The dipped payment instrument remains in the payment reader until the reader device 4022 prompts the customer 4020 to remove the card, or other payment instrument. While the payment instrument is in the reader device 4022, the microchip can create a one-time code which is sent from the POS system 4024 to the server(s) 4010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 4020 may tap or hover his or her payment instrument (e.g., card, electronic device such as a smart phone running a payment application, etc.) over a reader device 4022 to complete a transaction via short-range communication (e.g., NFC, RFID, Bluetooth®, BLE, etc.). Short-range communication enables the payment instrument to exchange information with the reader device 4022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 4024, the server(s) 4002, and/or the server(s) 4010 may exchange payment information and transaction data to determine whether transactions are authorized. For example, the POS system 4024 may provide encrypted payment data, user authentication data, purchase amount information, point-of-purchase information, etc. (collectively, transaction data) to server(s) 4002 over the network(s) 4004. The server(s) 4002 may send the transaction data to the server(s) 4010. As described above, in at least one example, the server(s) 4010 can be associated with third-party service providers that provide payment services, including but not limited to, an acquirer bank, an issuer, a cryptocurrency exchange network, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 4010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 4010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 4010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 4010 associated therewith), and a payment authorization message is communicated from the issuer to the POS device via a path opposite of that described above, or via an alternate path.

As described above, the server(s) 4010, which can be associated with payment service provider(s), may determine whether the transaction is authorized based on the transaction data, as well as information relating to parties to the transaction (e.g., the customer 4020 and/or the merchant 4016(A)). The server(s) 4010 may send an authorization notification over the network(s) 4004 to the server(s) 4002, which may send the authorization notification to the POS system 4024 over the network(s) 4004 to indicate whether the transaction is authorized. The server(s) 4002 may also transmit additional information such as transaction identifiers to the POS system 4024. In one example, the server(s) 4002 may include a merchant application and/or other functional components for communicating with the POS system 4024 and/or the server(s) 4010 to authorize or decline transactions.

Based on the authentication notification that is received by the POS system 4024 from server(s) 4002, the merchant 4016(A) may indicate to the customer 4020 whether the transaction has been approved. In some examples, approval may be indicated at the POS system 4024, for example, at a display of the POS system 4024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 4014 can access all of the services of the service provider. In other examples, the users 4014 can have gradated access to the services, which can be based on risk tolerance, IDV outputs, subscriptions, type of account with the service provider (e.g., merchant versus customer), and so on. In at least one example, access to such services can be availed to the merchants 4016 via the POS application 4018. In additional or alternative examples, each service can be associated with its own access point (e.g., application, web browser, etc.).

The service provider can offer payment processing services for processing payments on behalf of the merchants 4016, as described above. For example, the service provider can provision payment processing software, payment processing hardware and/or payment processing services to merchants 4016, as described above, to enable the merchants 4016 to receive payments from the customers 4020 when conducting POS transactions with the customers 4020. For instance, the service provider can enable the merchants 4016 to receive cash payments, payment card payments, and/or electronic payments from customers 4020 for POS transactions and the service provider can process transactions on behalf of the merchants 4016.

As the service provider processes transactions on behalf of the merchants 4016, the service provider can maintain accounts or balances for the merchants 4016 in one or more ledgers. For example, the service provider can analyze transaction data received for a transaction to determine an amount of funds owed to a merchant 4016(A) for the transaction. In at least one example, such an amount can be a total purchase price less fees charged by the service provider for providing the payment processing services. Based on determining the amount of funds owed to the merchant 4016(A), the service provider can deposit funds into an account of the merchant 4016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 4016(A) to a bank account of the merchant 4016(A) that is held at a bank or other financial institution (e.g., associated with the server(s) 4010). Scheduled deposits can occur at a prearranged time after a POS transaction is funded, which can be a business day after the POS transaction occurred, or sooner or later. In some examples, the merchant 4016(A) can access funds prior to a scheduled deposit. For instance, the merchant 4016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 4016(A) can have a payment instrument that is linked to the stored balance that enables the merchant to access the funds without first transferring the funds from the account managed by the service provider to the bank account of the merchant 4016(A).

In at least one example, the service provider may provide inventory management services. That is, the service provider may provide inventory tracking and reporting. Inventory management services may enable the merchant 4016(A) to access and manage a database storing data associated with a quantity of each item that the merchant 4016(A) has available (i.e., an inventory). Furthermore, in at least one example, the service provider can provide catalog management services to enable the merchant 4016(A) to maintain a catalog, which can be a database storing data associated with items that the merchant 4016(A) has available for acquisition (i.e., catalog management services). In at least one example, the catalog may include a plurality of data items and a data item of the plurality of data items may represent an item that the merchant 4016(A) has available for acquisition. The service provider can offer recommendations related to pricing of the items, placement of items on the catalog, and multi-party fulfillment of the inventory.

In at least one example, the service provider can provide business banking services, which allow the merchant 4016(A) to track deposits (from payment processing and/or other sources of funds) into an account of the merchant 4016(A), payroll payments from the account (e.g., payments to employees of the merchant 4016(A)), payments to other merchants (e.g., business-to-business) directly from the account or from a linked debit card, withdrawals made via scheduled deposit and/or instant deposit, etc. Furthermore, the business banking services can enable the merchant 4016(A) to obtain a customized payment instrument (e.g., credit card), check how much money they are earning (e.g., via presentation of available earned balance), understand where the merchant 4016(A)'s money is going (e.g., via deposit reports (which can include a breakdown of fees), spend reports, etc.), access/use earned money (e.g., via scheduled deposit, instant deposit, linked payment instrument, etc.), feel in control of the merchant 4016(A)'s money (e.g., via management of deposit schedule, deposit speed, linked instruments, etc.), etc. Moreover, the business banking services can enable the merchants 4016 to visualize cash flow to track financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 4016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the service provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 4014 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by one or more of the merchants 4016. In at least one example, the service provider can recommend and/or generate content items to supplement omni-channel presences of the merchants 4016. That is, if a merchant of the merchants 4016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments, or from a digital wallet of the employer to a digital wallet of the service provider to be used to make the payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider. Additionally or alternatively, the service provider can enable employee(s) to receive cryptocurrency payments (or other digital assets) to digital wallets.

Moreover, in at least one example, the service provider can provide employee management services for managing schedules of employees. Further, the service provider can provide appointment services for enabling users 4014 to set schedules for scheduling appointments and/or users 4014 to schedule appointments.

In some examples, the service provider can provide restaurant management services to enable users 4014 to make and/or manage reservations, to monitor front-of-house and/or back-of-house operations, and so on. In such examples, the merchant device(s) 4008 and/or server(s) 4002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 4014 who can travel between locations to perform services for a requesting user 4014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 4006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 4014, voice inputs into a virtual assistant or the like, to determine intents of user(s) 4014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 4014 may be new to the service provider such that the user 4014 that has not registered (e.g., subscribed to receive access to one or more services offered by the service provider) with the service provider. The service provider can offer onboarding services for registering a potential user 4014 with the service provider. In some examples, onboarding can involve presenting various questions, prompts, and the like to a potential user 4014 to obtain information that can be used to generate a profile for the potential user 4014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 4014 providing all necessary information, the potential user 4014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 4010). That is, the service provider can offer IDV services to verify the identity of users 4014 seeking to use or using the service provider's services. Identity verification requires a customer (or potential customer) to provide information that is used by compliance departments to prove that the information is associated with an identity of a real person or entity. In at least one example, the service provider can perform services for determining whether identifying information provided by a user 4014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 4010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 4002) and/or the server(s) 4010 via the network(s) 4004. In some examples, the merchant device(s) 4008 are not capable of connecting with the service provider (e.g., the server(s) 4002) and/or the server(s) 4010, due to a network connectivity issue, for example. In additional or alternative examples, the server(s) 4002 are not capable of communicating with the server(s) 4010 due to network connectivity issue, for example. In such examples, devices may operate in "offline" mode where at least some payment data is stored (e.g., on the merchant device(s) 4008) and/or the server(s) 4002 until connectivity is restored and the payment data can be transmitted to the server(s) 4002 and/or the server(s) 4010 for processing.

In at least one example, the service provider can be associated with a hub, such as an order hub, an inventory hub, a fulfillment hub and so on, which can enable integration with one or more additional service providers (e.g., associated with the additional server(s) 4010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 4006 that are in communication with server(s) 4002 of the service provider. That is, techniques described herein are directed to a specific implementation—or a practical application—of utilizing a distributed system of user devices 4006 that are in communication with server(s) 4002 of the service provider to perform a variety of services, as described above. The unconventional configuration of the distributed system described herein enables the server(s) 4002 that are remotely located from end-users (e.g., users 4014) to intelligently offer services based on aggregated data associated with the end-users, such as the users 4014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein continuously or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (a merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 4014 and user devices 4006. Furthermore, such features are changed dynamically based on the profiles of the users involved interacting with the GUIs. As such, techniques described herein are directed to improvements to computing systems.

Figure 41:
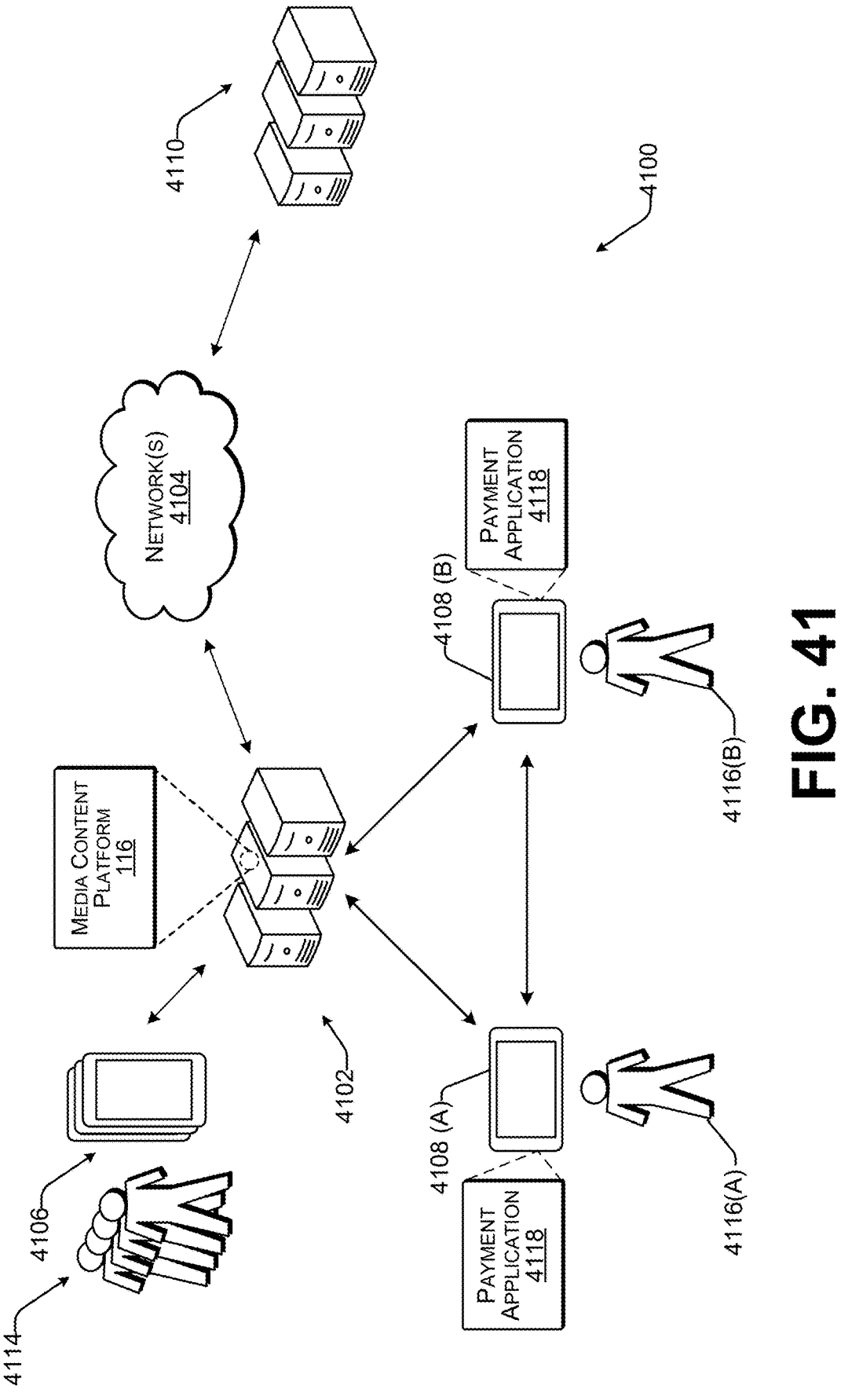
FIG. 41 depicts an example environment with which techniques for media content modification with access control configurations described herein can be implemented, according to an embodiment described herein.

FIG. 41 illustrates an example environment 4100. The environment 4100 includes server(s) 4102 that can communicate over a network 4104 with user devices 4106 (which, in some examples can be user devices 4108 (individually, 4108(A), 4108(B)) and/or server(s) 4110 associated with third-party service provider(s). The server(s) 4102 can be associated with a service provider that can provide one or more services for the benefit of users 4114, as described below. Actions attributed to the service provider can be performed by the server(s) 4102. In some examples, the service provider referenced in FIG. 41 can be the same or different than the service provider referenced in FIG. 40.

In the context of previously described figures, for example, at least a portion of the server(s) 4102 and/or the server(s) 4110 may be used to implement the media content platform 116 and/or various portions of the media content service provider system 102.

The environment 4100 can include a plurality of user devices 4106, as described above. Each one of the plurality of user devices 4106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 4114. The users 4114 can be referred to as customers, buyers, merchants, sellers, borrowers, employees, employers, payors, payees, couriers and so on. The users 4114 can interact with the user devices 4106 via user interfaces presented via the user devices 4106, such as one or more of the user interfaces depicted in FIGS. 5-36. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 4106 can have an instance or versioned instance of an application, which can be downloaded from an application store, for example, which can present the user interface(s) described herein. In at least one example, a user 4114 can interact with the user interface via touch input, spoken input, or any other type of input.

In at least one example, the service provider can provide a peer-to-peer payment service that enables peer-to-peer payments between two or more users 4114. Two users, user 4116(A) and user 4116(B) are illustrated in FIG. 41 as "peers" in a peer-to-peer payment. In at least one example, the service provider can communicate with instances of a payment application 4118 (or other access point) installed on devices 4106 configured for operation by users 4114. In another example, an instance of the payment application 4118 executing on a first device 4108(A) operated by a payor (e.g., user 4116(A)) can send a request to the service provider to transfer an asset (e.g., fiat currency, non-fiat currency, digital assets, cryptocurrency, securities, gift cards, and/or related assets) from the payor to a payee (e.g., user 4116(B)) via a peer-to-peer payment. In some examples, assets associated with an account of the payor are transferred to an account of the payee, and an instance of the payment application 4118 executing on a second device 4108(B) operated by the payee (e.g., user 4116(B)) can display a control to accept the transaction and/or a notification that the transaction was executed. In some examples, assets can be held at least temporarily in an account of the service provider prior to transferring the assets to the account of the payee.

In some examples, the service provider can utilize a ledger system to track transfers of assets between users 4114. FIG. 42, below, provides additional details associated with such a ledger system. The ledger system can enable users 4014 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 4018 executing on user device(s) of payee(s). As an example, the service provider can transfer assets from an account of user 4016(A) to an account of the user 4016(B) and can send a notification to the user device 4008(B) of the user 4016(B) for presentation via a user interface. The notification can indicate that a transfer is in process, a transfer is complete, or the like. In some examples, the service provider can send additional or alternative information to the instances of the payment application 4018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 4002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 4018 executing on the user devices 4006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 40 or a third-party service provider associated with the server(s) 4010. In examples where the content provider is a third-party service provider, the server(s) 4010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 40. For instance, the service provider can offer messaging services that provide a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 4006 (e.g., mobile device or conventional personal computer (PC)) based on instructions transmitted to and from the server(s) 4002 (which, in such an example can be called a "messaging server"). In some instances, the messaging application can include a payment application with messaging capability that enables users of the payment application to communicate with one another. In such instances, the payment application can be executed on a user device 4006 based on instructions transmitted to and from the server(s) 4002 (e.g., the payment service discussed in this description or another payment service that supports payment transactions). In some examples, the messaging application can be provided by a third-party service provider associated with the server(s) 4010. In examples where the messaging application is a third-party service provider, the server(s) 4010 can be accessible via one or more APIs or other integrations.

As described above, the service provider can facilitate peer-to-peer transactions, which can enable users 4014 to transfer fiat currency, non-fiat currency, cryptocurrency, securities, or other assets, or portions thereof, to other users 4014. In at least one example, individual users can be associated with user accounts. Additional details associated with user accounts and the transfer of assets between users 4014 are described below with reference to FIG. 42.

Furthermore, the service provider of FIG. 40 can enable users 4014 to perform banking transactions via instances of the payment application 4018. For example, users can configure direct deposits or other deposits for adding assets to various ledgers/balances. Further, users 4014 can configure bill pay, recurring payments, and/or the like using assets associated with associated accounts. In addition to sending and/or receiving assets via peer-to-peer transactions, users 4014 buy and/or sell assets via asset networks such as cryptocurrency networks, securities networks, and/or the like.

FIG. 42 illustrates example data store(s) 4200 that can be associated with the server(s) 4002.

In at least one example, the data store(s) 4200 can store assets in an asset storage 4202, as well as data in user account(s) 4204. In some examples, user account(s) 4204 can include merchant account(s) and/or customer account(s). In at least one example, the asset storage 4202 can be used to store assets managed by the service provider of FIG. 40. In at least one example, the asset storage 4202 can be used to record whether individual of the assets are registered to users. For example, the asset storage 4202 can include an asset wallet 4206 (e.g., a digital wallet) for storing records of assets owned by the service provider of FIG. 40, such as cryptocurrency, tokens (e.g., NFTs, such as the NFT 138 and/or the NFT 154), digital content (e.g., music, videos, images, etc.), securities, or the like, and communicating with one or more asset networks, such as cryptocurrency networks, token networks, content exchange networks, securities networks, or the like. In some examples, the asset network can be a first-party network or a third-party network, such as a cryptocurrency exchange, an NFT exchange, or the stock market. In examples where the asset network is a third-party network, the server(s) 4010 can be associated therewith. In some examples, the asset wallet 4206 can communicate with the asset network via one or more components associated with the server(s) 4002.

The asset wallet 4206 can be associated with one or more addresses and can vary addresses used to acquire assets (e.g., from the asset network(s)) so that its holdings are represented under a variety of addresses on the asset network. In examples where the service provider of FIG. 40 has its own holdings of cryptocurrency (e.g., in the asset wallet 4206), a user can acquire cryptocurrency directly from the service provider of FIG. 40. In some examples, the service provider of FIG. 40 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In these various scenarios, the buying and selling of cryptocurrency, and therefore the associated updating of the public ledger of the asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 4202 may contain ledgers that store records of assignments of assets to users 4014. Specifically, the asset storage 4202 may include asset wallet 4206, asset ledger 4208, fiat currency ledger 4210, and other ledger(s) 4212, which can be used to record transfers of assets between users 4014 of the service provider and/or one or more third-parties (e.g., merchant network(s), payment card network(s), ACH network(s), equities network(s), the asset network, securities networks, content licensing and distributing network(s), etc.). In doing so, the asset storage 4202 can maintain a running balance of assets managed by the service provider of FIG. 40. The ledger(s) of the asset storage 4202 can further indicate some of the running balance for each of the ledger(s) stored in the asset storage 4202 is assigned or registered to one or more user account(s) 4204.

In at least one example, the asset storage 4202 can include transaction logs 4214, which can include records of past transactions involving the service provider of FIG. 40. In at least one example, transaction data, as described herein, can be stored in association with the transaction logs 4214.

In some examples, the data store(s) 4200 can store a private blockchain 4216. In at least one example, the private blockchain 4216 is the blockchain 410 of FIG. 4. A private blockchain 4216 can function to record sender addresses, recipient addresses, public keys, values of cryptocurrency transferred, and/or can be used to verify ownership of cryptocurrency tokens to be transferred. In some examples, the service provider of FIG. 40 can record transactions taking place within the service provider of FIG. 40 involving cryptocurrency until the number of transactions has exceeded a determined limit (e.g., number of transactions, storage space allocation, etc.). Based at least in part on determining that the limit has been reached, the service provider of FIG. 40 can publish the transactions in the private blockchain 4216 to a public blockchain (e.g., associated with the asset network), where miners can verify the transactions and record the transactions to blocks on the public blockchain. In at least one example, the service provider of FIG. 41 can participate as miner(s) at least for its transactions to be posted to the public blockchain.

In at least one example, the data store(s) 4200 can store and/or manage accounts, such as user account(s) 4204, merchant account(s), and/or customer account(s). In at least one example, the user account(s) 4204 may store records of user accounts associated with the users 4014. In at least one example, the user account(s) 4204 can include a user account 4218, which can be associated with a user (of the users 4014). Other user accounts of the user account(s) 4204 can be similarly structured to the user account 4218, according to some examples. In other examples, other user accounts may include more or less data and/or account information than that provided by the user account 4218. In at least one example, the user account 4218 can include user account data 4220, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment assets used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 4220 can include account activity 4222 and user wallet key(s) 4224. The account activity 4222 may include a transaction log for recording transactions associated with the user account 4218. In some examples, the user wallet key(s) 4224 can include a public-private key-pair and a respective address associated with the asset network or other asset networks. In some examples, the user wallet key(s) 4224 may include one or more key pairs, which can be unique to the asset network or other asset networks.

In addition to the user account data 4220, the user account 4218 can include ledger(s) for account(s) managed by the service provider of FIG. 40, for the user. For example, the user account 4218 may include an asset ledger 4226, a fiat currency ledger 4228, and/or one or more other ledgers 4230. The ledger(s) can indicate that a corresponding user utilizes the service provider of FIG. 40 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 40.

In some examples, the asset ledger 4226 can store a balance for each of one or more cryptocurrencies (e.g., Bitcoin, Ethereum, Litecoin, etc.) registered to the user account 4218. In at least one example, the asset ledger 4226 can further record transactions of cryptocurrency assets associated with the user account 4218. For example, the user account 4218 can receive cryptocurrency from the asset network using the user wallet key(s) 4224. In some examples, the user wallet key(s) 4224 may be generated for the user upon request. User wallet key(s) 4224 can be requested by the user in order to send, exchange, or otherwise control the balance of cryptocurrency held by the service provider of FIG. 40 (e.g., in the asset wallet 4206) and registered to the user. The asset ledger 4226 can further record transactions of other digital assets associated with the user account 4218, and the user account 4218 can receive such assets from the asset network using the user wallet key(s) 4224. In some examples, the user wallet key(s) 4224 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 40 and the value is credited as a balance in asset ledger 4226), by purchasing currency in the form associated with the account using currency in a different form (e.g., buying a value of cryptocurrency from the service provider of FIG. 40 using a value of fiat currency reflected in fiat currency ledger 4228, and crediting the value of cryptocurrency in asset ledger 4226), or by conducting a transaction with another user (customer or merchant) of the service provider of FIG. 40 wherein the account receives incoming currency (which can be in the form associated with the account or a different form, in which the incoming currency may be converted to the form associated with the account). In some examples, the user account data 4220 can include preferences for maintaining balances of individual of the ledgers. For example, the service provider of FIG. 40 can automatically debit the fiat currency ledger 4228 to increase the asset ledger 4226, or another account associated with the user whenever the cryptocurrency balance (e.g., of the asset ledger 4226) falls below a stated level (e.g., a threshold). Conversely, in some embodiments, the service provider of FIG. 40 can automatically credit the fiat currency ledger 4228 to decrease the asset ledger 4226 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 40 (i.e., an external account). In at least one example, the user can transfer all or a portion of a balance of the cryptocurrency stored in the third-party cryptocurrency wallet to the service provider of FIG. 40. Such a transaction can require the user to transfer an amount of the cryptocurrency in a message signed by user's private key to an address provided by the service provider of FIG. 40. In at least one example, the transaction can be sent to miners to bundle the transaction into a block of transactions and to verify the authenticity of the transactions in the block. Once a miner has verified the block, the block is written to a public, distributed blockchain where the service provider of FIG. 40 can then verify that the transaction has been confirmed and can credit the user's asset ledger 4226 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund the user's cryptocurrency account. In some examples, the user can purchase cryptocurrency through services offered by the service provider of FIG. 40. As described above, in some examples, the service provider of FIG. 40 can acquire cryptocurrency from a third-party source. In such examples, the asset wallet 4206 can be associated with different addresses and can vary addresses used to acquire cryptocurrency so that its holdings are represented under a variety of addresses on a blockchain. When the service provider of FIG. 40 has its own holdings of cryptocurrency, users can acquire cryptocurrency directly from the service provider of FIG. 40. In some examples, the service provider of FIG. 40 can include logic for buying and selling cryptocurrency in order to maintain a desired level of cryptocurrency. The desired level can be based on a volume of transactions over a period, balances of collective user profiles' cryptocurrency ledgers, exchange rates, or trends in changing of exchange rates such that the cryptocurrency is trending towards gaining or losing value with respect to the fiat currency. In the various examples, the buying and selling of cryptocurrency, and therefore the associated updating of the public ledger can be separate from any customer-merchant transaction, and therefore not necessarily time-sensitive.

In examples where the service provider of FIG. 40 has its own cryptocurrency assets, cryptocurrency transferred in a transaction (e.g., data with address provided for receipt of transaction and a balance of cryptocurrency transferred in the transaction) can be stored in the asset wallet 4206. In at least one example, the service provider of FIG. 41 can credit the asset ledger 4226 of the user. Additionally, while the service provider of FIG. 40 recognizes that the user retains the value of the transferred cryptocurrency through crediting the asset ledger 4226, any person that inspects the block-chain will see the cryptocurrency as having been transferred to the service provider of FIG. 40. In some examples, the asset wallet 4206 can be associated with many different addresses. In such examples, any person that inspects the blockchain may not easily associate all cryptocurrency stored in asset wallet 4206 as belonging to the same entity. It is this presence of a private ledger that is used for real-time transactions and maintained by the service provider of FIG. 40, combined with updates to the public ledger at other times, that allows for extremely fast transactions using cryptocurrency to be achieved. In some examples, the "private ledger" can refer to the asset ledger 4208, which in some examples, can utilize the private blockchain 4216, as described herein. The "public ledger" can correspond to a public blockchain associated with the asset network.

In at least one example, a user's asset ledger 4226, fiat currency ledger 4228, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 4226. In some examples, a user can receive fiat currency or another currency in the form of payment for a transaction with another user. In at least one example, at least a portion of such funds can be converted into crypto-currency by the service provider of FIG. 40 and used to fund the asset ledger 4226 of the user.

As addressed above, in some examples, users can also have other accounts maintained by the service provider of FIG. 40. For example, a user can also have an account in U.S. dollars, which can be tracked, for example, via the fiat currency ledger 4228. Such an account can be funded by transferring money from a bank account at a third-party bank to an account maintained by the service provider of FIG. 40 as is conventionally known. In some examples, a user can receive fiat currency in the form of payment for a transaction with another user. In such examples, at least a portion of such funds can be used to fund the fiat currency ledger 4228.

In some examples, a user can have one or more internal payment cards registered with the service provider of FIG. 40. Internal payment cards can be linked to one or more of the accounts associated with the user account 4218. In some embodiments, options with respect to internal payment cards can be adjusted and managed using an application (e.g., the payment application 4018).

In at least one example, as described above, each ledger can correspond to an account of the user that is managed by the service provider of FIG. 40. In at least one example, individual of the accounts can be associated with a wallet or a stored balance for use in payment transactions, peer-to-peer transactions, payroll payments, etc.

In at least one example, the user account 4218 can be associated with an asset wallet 4232. The asset wallet 4232 of the user can be associated with account information that can be stored in the user account data 4220 and, in some examples, can be associated with the user wallet key(s) 4224. In at least one example, the asset wallet 4232 can store data indicating an address provided for receipt of a crypto-currency transaction, a blockchain token-based transaction, or a transaction for another digital asset implemented using a blockchain, to name just a few. In at least one example, the balance of the asset wallet 4232 can be based at least in part on a balance of the asset ledger 4226. In at least one example, funds availed via the asset wallet 4232 can be stored in the asset wallet 4232 or the asset wallet 4206. Funds availed via the asset wallet 4206 can be tracked via the asset ledger 4226. The asset wallet 4232, however, can be associated with additional cryptocurrency funds and other digital assets.

In at least one example, when the service provider of FIG. 40 includes a private blockchain 4216 for recording and validating cryptocurrency transactions, the asset wallet 4232 can be used instead of, or in addition to, the asset ledger 4226. For example, at least one example, a merchant can provide the address of the asset wallet 4232 for receiving payments. In an example where a customer is paying in cryptocurrency and the customer is associated with crypto-currency wallet account with the service provider of FIG. 40, the customer can send a message signed by its private key including its wallet address (i.e., of the customer) and identifying the cryptocurrency and value to be transferred to the merchant's asset wallet 4232. The service provider of FIG. 40 can complete the transaction by reducing the cryptocurrency balance in the customer's cryptocurrency wallet and increasing the cryptocurrency balance in the merchant's asset wallet 4232. In addition to recording the transaction in the respective cryptocurrency wallets, the transaction can be recorded in the private blockchain 4216, and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 4226 and/or asset wallet 4232 are each described above with reference to cryptocurrency, the asset ledger 4226 and/or asset wallet 4232 can alternatively be used in association with securities and other digital assets, such as tokens (e.g., NFTs), smart contracts, and so forth. In some examples, different ledgers and/or wallets can be used for different types of assets. That is, in some examples, a user can have multiple asset ledgers and/or asset wallets for tracking cryptocurrency, securities, tokens (e.g., NFTs), smart contracts, or the like.

It should be noted that user(s) having accounts managed by the service provider of FIG. 40 is an aspect of the technology disclosed that enables technical advantages of increased processing speed and improved security.

Figure 43:
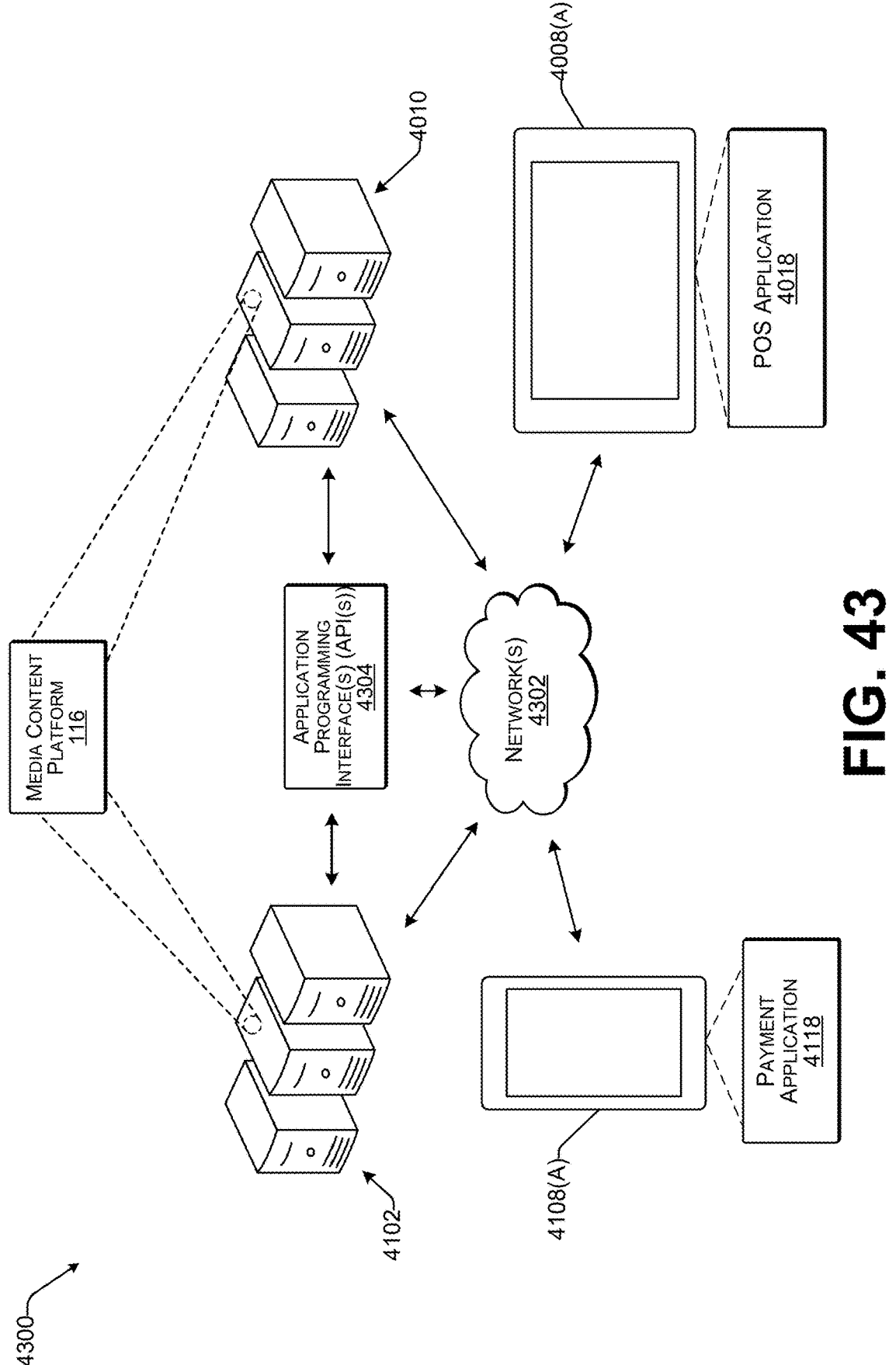
FIG. 43 depicts an example environment in which the environments of FIGS. 40 and 41 can be integrated to enable payments at the point-of-sale using assets associated with user accounts in the peer-to-peer environment of FIG. 41 with which techniques described herein can be implemented, according to an embodiment described herein.

FIG. 43 illustrates an example environment 4300 wherein the environment 4000 and the environment 4000 can be integrated to enable payments at the point-of-sale using assets associated with user accounts in the peer-to-peer environment of FIG. 40. As illustrated, each of the compo-nents can communicate with one another via one or more networks 4302. In some examples, one or more APIs 4304 or other functional components can be used to facilitate such communication.

In at least one example, the example environment 4300 can enable contactless payments, via integration of peer-to-peer payment, or other payment making, platform(s) and payment processing platform(s), are described herein. For the purpose of FIG. 43, the environment 4000 can refer to a payment processing platform and the environment 4000 can refer to a peer-to-peer payment, or payment making, platform. In an example, such an integration can enable a customer to participate in a transaction via an associated computing device instead of interacting with a merchant device of a merchant, such as the merchant device 4008(A). In such an example, the POS application 4018, associated with a payment processing platform and executable by the merchant device 4008(A) of the merchant, can present a Quick Response (QR) code, or other code that can be used to identify a transaction (e.g., a transaction code), in association with a transaction between the customer and the merchant. The QR code, or other transaction code, can be provided to the POS application 4018 via an API associated with the peer-to-peer payment platform. In an example, the customer can utilize an associated computing device, such as the user device 4008(A), to capture the QR code, or the other transaction code, and to provide an indication of the captured QR code, or other transaction code, to server(s) 4002 and/or server(s) 4002.

Based at least in part on the integration of the peer-to-peer payment platform and the payment processing platform (e.g., via the API), the server(s) 4002 and/or 4002 associated with each can exchange communications with each other— and with a payment application 4018 associated with the peer-to-peer payment platform and/or the POS application 4018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 4008(A), to enable a contactless (peer-to-peer) payment for the transaction. In at least one example, techniques described herein can offer improvements to conventional payment technologies at both brick-and-mortar points of sale and online points of sale. For example, at brick-and-mortar points of sale, techniques described herein can enable customers to "scan to pay," by using associated computing devices (e.g., mobile phones) to scan QR codes, or other transaction codes, encoded with data as described herein, to remit payments for transactions. In such a "scan to pay" example, a customer computing device, such as the user device 4008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 4018 and the payment application 4018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using associated computing devices to scan or otherwise capture QR codes, or other transaction codes, encoded with data, as described herein, to remit payments for online/ecommerce transactions. In such a "scan to pay" example, a customer computing device, such as the user device 4008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 4018, associated with a payment processing platform, on the merchant device 4008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 4008(A) can present a QR code, or other transaction code, that can be associated with a peer-to-peer payment platform. The customer can use a camera associated with the user device 4008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 4018, associated with a payment processing platform, on the merchant device 4008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 4018 can cause a text message with a resource locator (e.g., uniform resource locator (URL)) that can be associated with a peer-to-peer payment platform to be sent to the user device 4008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 4008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 4018 of a merchant device 4008(A) at a brick-and-mortar store of a merchant to a payment application 4018 of a user device 4008(A) of a customer to enable the customer to participate in a transaction via an associated computing device. For instance, in a "scan to pay" example as described above, based at least in part on capturing the QR code, or other transaction code, via the user device 4008(A), the payment processing platform can provide transaction data to the peer-to-peer payment platform for presentation via the payment application 4018 on the user device 4008(A). In some examples, the customer can watch items being added to the customer's cart (e.g., via a user interface presented via the payment application). As an item is added to a virtual cart by the merchant—via the POS application 4018 on the merchant device 4008(A) of the merchant—the customer can see the item in the customer's virtual cart on the customer's own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 4018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 4008(A) during or after payment of the transaction.

In some examples, based at least in part on capturing the QR code, or other transaction code, the payment processing platform can provide transaction data to the peer-to-peer payment platform for presentation via the payment application 4018 on the computing device of the customer, such as the user device 4008(A), to enable the customer to complete the transaction via the customer's own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 4018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via associated computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to associated carts to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 4018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 4018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 44:
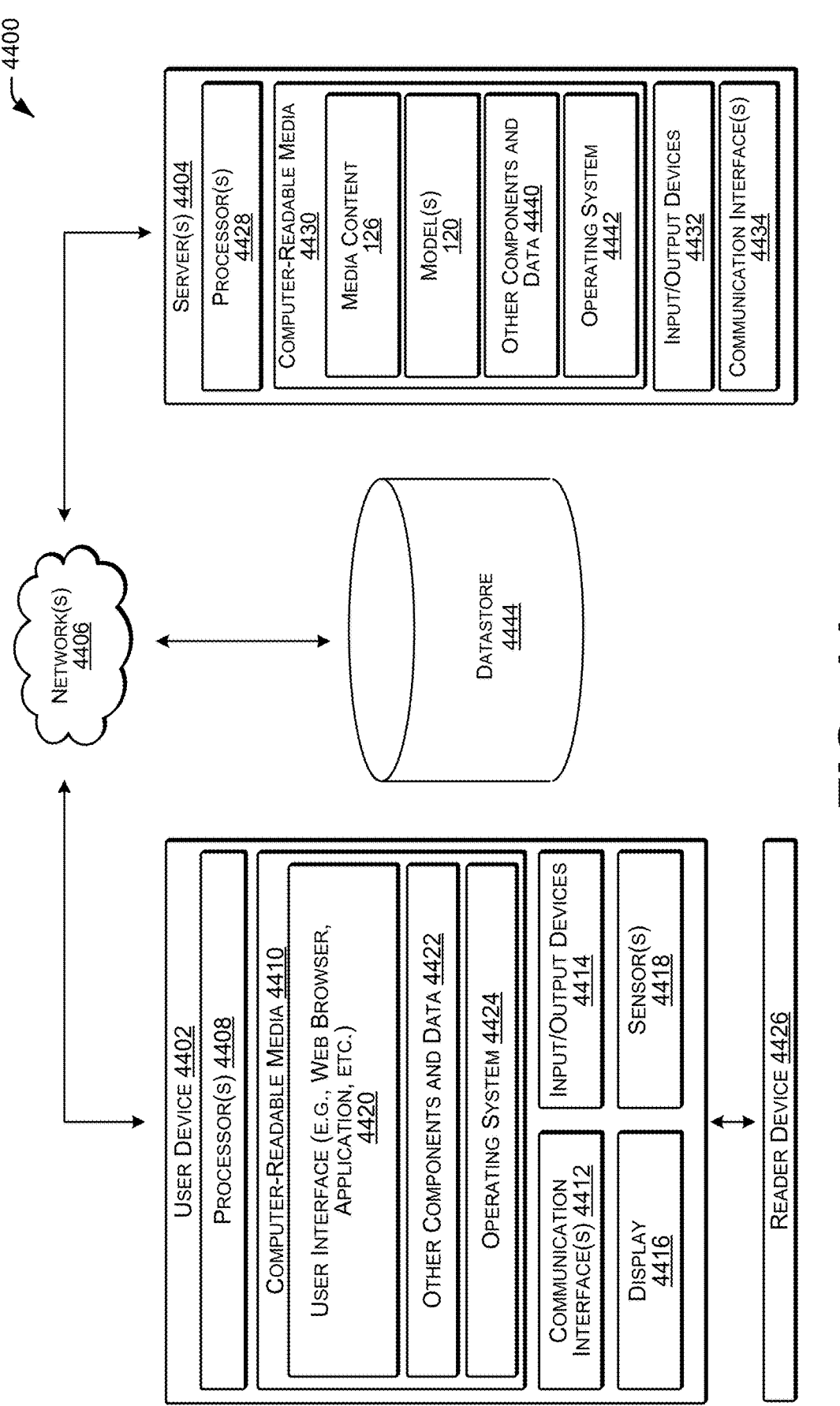
FIG. 44 depicts an illustrative block diagram of a system with which the media content modification with access control configuration techniques described herein can be implemented, according to an embodiment described herein.

FIG. 44 depicts an illustrative block diagram illustrating a system 4400 for performing techniques described herein. The system 4400 includes a user device 4402, that communicates with server computing device(s) (e.g., server(s) 4404) via network(s) 4406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 4402 is illustrated, in additional or alternate examples, the system 4400 can have multiple user devices, as described above with reference to FIG. 40 and FIG. 41.

In at least one example, the user device 4402 can be any suitable type of computing device, e.g., portable, semi-portable, semi-stationary, or stationary. Some examples of the user device 4402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 4402 can be any computing device capable of sending communications and performing the functions according to the techniques described herein. The user device 4402 can include devices, e.g., payment card readers, or components capable of accepting payments, as described below.

In the illustrated example, the user device 4402 includes one or more processors 4408, one or more computer-readable media 4410, one or more communication interface(s) 4412, one or more input/output (I/O) devices 4414, a display 4416, and sensor(s) 4418.

In at least one example, each processor 4408 can itself comprise one or more processors or processing cores. For example, the processor(s) 4408 can be implemented as one or more microprocessors, microcomputers, microcontrollers, digital signal processors, central processing units, state machines, logic circuitries, and/or any devices that manipulate signals based on operational instructions. In some examples, the processor(s) 4408 can be one or more hardware processors and/or logic circuits of any suitable type specifically programmed or configured to execute the algorithms and processes described herein. The processor(s) 4408 can be configured to fetch and execute computer-readable processor-executable instructions stored in the computer-readable media 4410.

Depending on the configuration of the user device 4402, the computer-readable media 4410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 4410 can include, but is not limited to, RAM, ROM, EEPROM, flash memory, solid-state storage, magnetic disk storage, optical storage, and/or other computer-readable media technology. Further, in some examples, the user device 4402 can access external storage, such as RAID storage systems, storage arrays, network attached storage, storage area networks, cloud storage, or any other medium that can be used to store information and that can be accessed by the processor(s) 4408 directly or through another computing device or network. Accordingly, the computer-readable media 4410 can be computer storage media able to store instructions, components or components that can be executed by the processor(s) 4408. Further, when mentioned, non-transitory computer-readable media exclude media such as energy, carrier signals, electromagnetic waves, and signals per se.

The computer-readable media 4410 can be used to store and maintain any number of functional components that are executable by the processor(s) 4408. In some implementations, these functional components comprise instructions or programs that are executable by the processor(s) 4408 and that, when executed, implement operational logic for performing the actions and services attributed above to the user device 4402. Functional components stored in the computer-readable media 4410 can include a user interface 4420 to enable users to interact with the user device 4402, and thus the server(s) 4404 and/or other networked devices. In at least one example, the user interface 4420 can be presented via a web browser, or the like. In other examples, the user interface 4420 can be presented via an application, such as a mobile application or desktop application, which can be provided by a service provider associated with the server(s) 4404, or which can be an otherwise dedicated application. In some examples, the user interface 4420 can be displayed to enable a user to initiate a cryptocurrency payment (or other digital asset transfer) to another user (e.g., to a merchant), to notify a recipient user that a payment (or other digital asset) has been received from a sending user, or to allow the recipient user to accept the transfer, to name just a few. In the context of previously described examples, the user interfaces depicted in FIGS. 5-36 are examples of a user interface 4420 that may be displayed via a display 4416 of a respective user device 4402. In at least one example, a user can interact with the user interface via touch input, spoken input, gesture, or any other type of input. The word "input" is also used to describe "contextual" input that may not be directly provided by the user via the user interface 4420. For example, user's interactions with the user interface 4420 are analyzed using, e.g., natural language processing techniques, to determine context or intent of the user, which may be treated in a manner similar to "direct" user input.

Depending on the type of the user device 4402, the computer-readable media 4410 can also optionally include other functional components and data, such as other components and data 4422, which can include programs, drivers, etc., and the data used or generated by the functional components. In addition, the computer-readable media 4410 can also store data, data structures and the like, that are used by the functional components. In accordance with the described techniques, for instance, the computer-readable media 4410 may also be used in variations to store one or more of the media content 126 and the model(s) 120 discussed above. Further, the user device 4402 can include many other logical, programmatic and physical components, of which those described are merely examples that are related to the discussion herein.

In at least one example, the computer-readable media 4410 can include additional functional components, such as an operating system 4424 for controlling and managing various functions of the user device 4402 and for enabling basic user interactions.

The communication interface(s) 4412 can include one or more interfaces and hardware components for enabling communication with various other devices, such as over the network(s) 4406 or directly. For example, communication interface(s) 4412 can enable communication through one or more network(s) 4406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 4406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 4402 can further include one or more input/output (I/O) devices 4414. The I/O devices 4414 can include speakers, a microphone, a camera, and various user controls (e.g., buttons, a joystick, a keyboard, a keypad, etc.), a haptic output device, and so forth. The I/O devices 4414 can also include attachments that leverage the accessories (audio-jack, USB-C, Bluetooth, etc.) to connect with the user device 4402.

In at least one example, user device 4402 can include a display 4416. Depending on the type of computing device(s) used as the user device 4402, the display 4416 can employ any suitable display technology. For example, the display 4416 can be a liquid crystal display, a plasma display, a light emitting diode display, an OLED (organic light-emitting diode) display, an electronic paper display, or any other suitable type of display able to present digital content thereon. In at least one example, the display 4416 can be an augmented reality display, a virtually reality display, or any other display able to present and/or project digital content. In some examples, the display 4416 can have a touch sensor associated with the display 4416 to provide a touchscreen display configured to receive touch inputs for enabling interaction with a graphic interface presented on the display 4416. Accordingly, implementations herein are not limited to any particular display technology. Alternatively, in some examples, the user device 4402 may not include the display 4416, and information can be presented by other means, such as aurally, haptically, etc.

In addition, the user device 4402 can include sensor(s) 4418. The sensor(s) 4418 can include a GPS device able to indicate location information. Further, the sensor(s) 4418 can include, but are not limited to, an accelerometer, gyroscope, compass, proximity sensor, camera, microphone, and/or a switch.

In some examples, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 4014 enter a brick-and-mortar store of a merchant. Location can be used in additional or alternative ways as well.

Additionally, the user device 4402 can include various other components that are not shown, examples of which include removable storage, a power source, such as a battery and power control unit, a barcode scanner, a printer, a cash drawer, and so forth.

In addition, in some examples, the user device 4402 can include, be connectable to, or otherwise be coupled to a reader device 4426, for reading payment instruments and/or identifiers associated with payment objects. In some examples, as described above, the reader device 4426 can plug in to a port in the user device 4402, such as a microphone port, a headphone port, an audio-jack, a data port, or other suitable port. In additional or alternative examples, the reader device 4426 can be coupled to the user device 4402 via another wired or wireless connection, such as via a Bluetooth®, BLE, and so on. The reader device 4426 can include a read head for reading a magnetic strip of a payment card, and further can include encryption technology for encrypting the information read from the magnetic strip. Additionally or alternatively, the reader device 4426 can be an EMV payment reader, which in some examples, can be embedded in the user device 4402. Moreover, numerous other types of readers can be employed with the user device 4402 herein, depending on the type and configuration of the user device 4402.

The reader device 4426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 4426 may include hardware implementation, such as slots, magnetic tracks, and rails with one or more sensors or electrical contacts to facilitate detection and acceptance of a payment instrument. That is, the reader device 4426 may include hardware implementations to enable the reader device 4426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 4426 may also include a biometric sensor to receive and process biometric characteristics and process them as payment instruments, given that such biometric characteristics are registered with the payment service and connected to a financial account with a bank server.

The reader device 4426 may include processing unit(s), computer-readable media, a reader chip, a transaction chip, a timer, a clock, a network interface, a power supply, and so on. The processing unit(s) of the reader device 4426 may execute one or more components and/or processes to cause the reader device 4426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 4426, the computer-readable media may include volatile memory (such as RAM), non-volatile memory (such as ROM, flash memory, miniature hard drive, memory card, or the like), or some combination thereof. In at least one example, the computer-readable media of the reader device 4426 may include at least one component for performing various functions as described herein.

The reader chip may perform functionalities to control the operations and processing of the reader device 4426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 4406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 4426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 4402, which can be a POS terminal, and the reader device 4426 are shown as separate devices, in additional or alternative examples, the user device 4402 and the reader device 4426 can be part of a single device, which may be a battery-operated device. In such an example, components of both the user device 4402 and the reader device 4426 may be associated with the single device. In some examples, the reader device 4426 can have a display integrated therewith, which can be in addition to (or as an alternative of) the display 4416 associated with the user device 4402.

The server(s) 4404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 4404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 4404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 4404 can include one or more processors 4428, one or more computer-readable media 4430, one or more I/O devices 4432, and one or more communication interfaces 4434. Each processor 4428 can be a single processing unit or a number of processing units, and can include single or multiple computing units or multiple processing cores. The processor(s) 4428 can be implemented as one or more microprocessors, microcomputers, microcontrollers, digital signal processors, central processing units, state machines, logic circuitries, and/or any devices that manipulate signals based on operational instructions. For example, the processor(s) 4428 can be one or more hardware processors and/or logic circuits of any suitable type specifically programmed or configured to execute the algorithms and processes described herein. The processor(s) 4428 can be configured to fetch and execute computer-readable instructions stored in the computer-readable media 4430, which can program the processor(s) 4428 to perform the functions described herein.

The computer-readable media 4430 can include volatile and nonvolatile memory and/or removable and non-removable media implemented in any type of technology for storage of information, such as computer-readable instructions, data structures, program components, or other data. Such computer-readable media 4430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 4404, the computer-readable media

4430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 4430 can be used to store any number of functional components that are executable by the processor(s) 4428. In many implementations, these functional components comprise instructions or programs that are executable by the processors 4428 and that, when executed, specifically configure the one or more processors 4428 to perform the actions attributed above to the service provider and/or payment processing service. Functional components stored in the computer-readable media 4430 can optionally include the model(s) 120 and one or more other components and data 4440. Examples of such other components include but are not limited to, the media content platform 116 and the recommendation system 118, and examples of such other data include but are not limited to one or more of the media content 126, the characteristic(s) 128, the access control(s) 130, and the model(s) 120.

In one or more implementations, the model(s) 120 can be trained using one or more machine-learning mechanisms. For example, a machine-learning mechanism can analyze training data (e.g., the media content 126, the characteristic(s) 128, and/or the access control(s) 130) to train a data model that generates an output, which can be a recommended media content item(s) 140, a relevancy score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 4402 and/or the server(s) 4404 for use at a time after the data models have been trained (e.g., at runtime). Further, the one or more other components and data 4440 can include programs, drivers, etc., and the data used or generated by the functional components. Further, the server(s) 4404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with the third-party developers' own third-party applications. Additionally or alternatively, in some examples, the service provider can utilize an SDK to integrate third-party service provider functionality into its applications. That is, API(s) and/or SDK(s) can enable third-party developers to customize how respective third-party applications interact with the service provider or vice versa.

The computer-readable media 4430 can additionally include an operating system 4442 for controlling and managing various functions of the server(s) 4404.

The communication interface(s) 4434 can include one or more interfaces and hardware components for enabling communication with various other devices, such as over the network(s) 4406 or directly. For example, communication interface(s) 4434 can enable communication through one or more network(s) 4406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 4406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 4404 can further be equipped with various I/O devices 4432. Such I/O devices 4432 can include a display, various user interface controls (e.g., buttons, joystick, keyboard, mouse, touch screen, biometric or sensory input devices, etc.), audio speakers, connection ports and so forth.

In at least one example, the system 4400 can include a datastore 4444 that can be configured to store data that is accessible, manageable, and updatable. In some examples, the datastore 4444 can be integrated with the user device 4402 and/or the server(s) 4404. In other examples, as shown in FIG. 40, the datastore 4444 can be located remotely from the server(s) 4404 and can be accessible to the server(s) 4404. The datastore 4444 can comprise multiple databases and/or servers connected locally and/or remotely via the network(s) 4406.

In at least one example, the datastore 4444 can store user profiles, which can include merchant profiles, customer profiles, and so on. Alternatively or additionally, the datastore 4444 can store the media content 126 and/or model(s) 120 for access over the network(s) 4406 by various user devices 4402 and/or server(s) 4404.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 4444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 4444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

In some aspects, the techniques described herein relate to a computer-implemented method including: receiving, by a media content platform, a first request from an artist entity to make a media content item of the artist entity available for modification by other entities on the media content platform, the first request including one or more access controls that control use of the media content item; storing the media content item on the media content platform, the storing making the media content item available for modification and associating the media content item with the one or more access controls; receiving, by the media content platform, a second request from a requesting entity to modify the media content item, the second request indicating an acceptance of the one or more access controls; granting, to the requesting entity, access to the media content item for modification; and receiving, via the media content platform, a new media content item generated by the requesting entity that incorporates at least a portion of the media content item.

In some aspects, the techniques described herein relate to a computer-implemented method, further including minting, by the media content platform, a non-fungible token on a blockchain that controls use of the new media content item based on the one or more access controls, the minting creating the non-fungible token on the blockchain and programmatically encoding an association between the new media content item and the non-fungible token.

In some aspects, the techniques described herein relate to a computer-implemented method, further including: providing, by the media content platform, a media content editing tool; receiving, via the media content editing tool, user input to generate the new media content item by modifying the media content item; and generating, by the media content editing tool, the new media content item.

In some aspects, the techniques described herein relate to a computer-implemented method, further including processing, by the media content platform, the new media content item to detect that the new media content item incorporates the media content item.

In some aspects, the techniques described herein relate to a computer-implemented method, wherein the new media content item includes one or both of a sample of the media content item and a remix of the media content item.

In some aspects, the techniques described herein relate to a computer-implemented method, wherein the media content item includes at least one of: a song; a stem; a drumbeat; a vocal track; a video; and an image.

In some aspects, the techniques described herein relate to a computer-implemented method, further including: analyzing the media content item by one or more models using machine learning to generate one or more recommended access controls that control use of the media content item; and surfacing the one or more recommended access controls that control use of the media content item to the artist entity via a user interface.

In some aspects, the techniques described herein relate to a computer-implemented method including: receiving, by a media content platform from a derivative artist entity, a derivative work created by the derivative artist entity, the derivative work incorporating at least a portion of a media content item created by a source artist entity; receiving, by the media content platform from the derivative artist entity, acceptance of one or more access controls, the one or more access controls controlling use of the media content item in the derivative work; and minting a non-fungible token on a blockchain that controls use of the derivative work based on the one or more access controls, the minting creating the non-fungible token on the blockchain and programmatically encoding an association between the derivative work and the non-fungible token.

In some aspects, the techniques described herein relate to a computer-implemented method, wherein the one or more access controls include at least one of: one or more ways the media content item is permitted to be modified in the derivative work; one or more platforms where the derivative work is permitted to be accessed; one or more types of media content the derivative work is permitted to be incorporated; and monetary compensation owed to the source artist entity for used of the media content item in the derivative work.

In some aspects, the techniques described herein relate to a computer-implemented method, further including: analyzing the derivative work by one or more models to determine a contribution of the media content item in the derivative work; and defining, in the one or more access controls, an allocation of revenue generated by the derivative work for the source artist entity and the derivative artist entity based at least in part on the contribution of the media content item in the derivative work.

In some aspects, the techniques described herein relate to a computer-implemented method, wherein the revenue is automatically distributed to the source artist entity and the derivative artist entity based on the allocation via a smart contract encoded by the non-fungible token.

In some aspects, the techniques described herein relate to a computer-implemented method, wherein the derivative work is a remix of the media content item.

In some aspects, the techniques described herein relate to a computer-implemented method, wherein the derivative work incorporates a sample of the media content item.

In some aspects, the techniques described herein relate to a computer-implemented method, wherein the one or more access controls controlling use of the media content item in the derivative work are generated based on user input received from the source artist entity.

In some aspects, the techniques described herein relate to a computer-implemented method, further including: analyzing the media content item by one or more models using machine learning to generate one or more recommended access controls for the one or more access controls controlling used of the media content item in the derivative work; and surfacing the one or more recommended access controls to the source artist entity via a user interface.

In some aspects, the techniques described herein relate to a computer-implemented method including: receiving, by a media content platform, a first request from a source artist entity to enable access, via the media content platform, to a media content item of the source artist entity by derivative artist entities; receiving, by the media content platform, a second request from a derivative artist entity for recommended media content items matching one or more characteristics included in the second request, the recommended media content items including the media content item of the source artist entity; receiving, by the media content platform, a selection of the media content item by the derivative artist entity for use in a derivative work; and tracking, by the media content platform, usage of the media content item in the derivative work via a non-fungible token minted by the media content platform on a blockchain.

In some aspects, the techniques described herein relate to a computer-implemented method, wherein the non-fungible token programmatically encodes an association between the derivative work and the non-fungible token.

In some aspects, the techniques described herein relate to a computer-implemented method, wherein the non-fungible token programmatically encodes an association between the media content item and the non-fungible token.

In some aspects, the techniques described herein relate to a computer-implemented method, wherein receiving, by the media content platform, the selection of the media content item by the derivative artist entity for use in the derivative work includes receiving acceptance of one or more access controls controlling use of the media content item in the derivative work, and wherein the non-fungible token automatically controls use of derivative work based on the one or more access controls accepted by the derivative artist entity.

In some aspects, the techniques described herein relate to a computer-implemented method, further including: receiving, by the media content platform, user input from the source artist entity for the one or more access controls controlling use of the media content item in the derivative work; and generating, by the media content platform, the one or more access controls controlling use of the media content item in the derivative work based on the user input received from the source artist entity.

What is claimed is:

1. A computer-implemented method comprising:

receiving, by a media content platform, a first request from an artist entity to make a media content item of the artist entity available for modification by other entities on the media content platform, the first request including one or more access controls that control use of the media content item, the first request including selection of subject matter of media content into which the media content item is permitted to be incorporated;

storing the media content item on the media content platform, the storing making the media content item available for modification and associating the media content item with the one or more access controls;

providing, by the media content platform to a requesting entity, a user interface that enables the requesting entity to search for one or more media content items, wherein the one or more media content items include the media content item of the artist entity, and wherein the user interface includes an interface element that enables the requesting entity to preview respective access controls associated with the one or more media content items;

receiving, by the media content platform, a second request from the requesting entity to modify the media content item of the artist entity, the second request indicating an acceptance of the one or more access controls associated with the media content item of the artist entity;

responsive to receiving, from the requesting entity, a selection of the subject matter, updating the user interface to include an increased cost for generating a new media content item with authorization for the new media content item to be associated with the subject matter;

granting, to the requesting entity, access to the media content item of the artist entity for modification; and receiving, via the media content platform, the new media content item generated by the requesting entity that incorporates at least a portion of the media content item of the artist entity.

2. The computer-implemented method of claim 1, further comprising minting, by the media content platform, a non-fungible token on a blockchain that controls use of the new media content item based on the one or more access controls associated with the media content item of the artist entity, the minting creating the non-fungible token on the blockchain and programmatically encoding an association between the new media content item and the non-fungible token.

3. The computer-implemented method of claim 1, further comprising:

providing, by the media content platform, a media content editing tool;

receiving, via the media content editing tool, user input to generate the new media content item by modifying the media content item of the artist entity; and generating, by the media content editing tool, the new media content item.

4. The computer-implemented method of claim 1, further comprising processing, by the media content platform, the new media content item to detect that the new media content item incorporates the media content item of the artist entity.

5. The computer-implemented method of claim 1, wherein the new media content item includes at least one of a sample of the media content item of the artist entity or a remix of the media content item of the artist entity that is generated by rearranging or replacing elements of the media content item of the artist entity.

6. The computer-implemented method of claim 1, wherein the media content item of the artist entity comprises at least one of:

a song;

a stem;

a drumbeat;

a vocal track;

a video; and an image.

7. The computer-implemented method of claim 1, wherein the user interface is a first user interface and the method further comprises:

analyzing the media content item of the artist entity by one or more models using machine learning to generate one or more recommended access controls that control use of the media content item of the artist entity; and surfacing the one or more recommended access controls that control use of the media content item of the artist entity to the artist entity via a second user interface.

8. The method of claim 1, wherein the subject matter includes sensitive content.

9. A computer-implemented method comprising:

providing, by a media content platform to a derivative artist entity, a user interface that enables the derivative artist entity to search for media content items and that includes an interface element that enables the derivative artist entity to preview one or more access controls associated with a selected media content item from the media content items;

receiving, by the media content platform from the derivative artist entity, a derivative work created by the derivative artist entity, the derivative work incorporating at least a portion of the selected media content item created by a source artist entity;

receiving, by the media content platform from the derivative artist entity, acceptance of the one or more access controls, the one or more access controls controlling use of the selected media content item in the derivative work, wherein the one or more access controls include selection of subject matter that the derivative work that incorporates the selected media content item is authorized to be associated with;

responsive to receiving a selection of the subject matter from the derivative artist entity, updating the user interface to include an increased cost for minting a non-fungible token with authorization for the derivative work to be associated with the subject matter; and minting the non-fungible token on a blockchain that controls use of the derivative work based on the one or more access controls including the authorization for the derivative work to be associated with the subject matter, the minting creating the non-fungible token on the blockchain and programmatically encoding an association between the derivative work and the non-fungible token.

10. The computer-implemented method of claim 9, wherein the one or more access controls include at least one of:

one or more platforms where the derivative work is permitted to be accessed;

one or more types of media content that the selected media content item is permitted to be incorporated into as part of the derivative work; and monetary compensation owed to the source artist entity for use of the selected media content item in the derivative work.

11. The computer-implemented method of claim 9, further comprising:

analyzing the derivative work by one or more models to determine a contribution of the selected media content item in the derivative work; and defining, in the one or more access controls, an allocation of revenue generated by the derivative work for the source artist entity and the derivative artist entity based at least in part on the contribution of the selected media content item in the derivative work.

12. The computer-implemented method of claim 11, wherein the revenue is automatically distributed to the source artist entity and the derivative artist entity based on the allocation via a smart contract encoded by the non-fungible token.

13. The computer-implemented method of claim 9, wherein the derivative work is a remix of the selected media content item that is generated by rearranging or replacing elements of the selected media content item.

14. The computer-implemented method of claim 9, wherein the derivative work incorporates a sample of the selected media content item.

15. The computer-implemented method of claim 9, wherein the one or more access controls controlling use of the selected media content item in the derivative work are generated based on user input received from the source artist entity.

16. The computer-implemented method of claim 15, further comprising:

analyzing the selected media content item by one or more models using machine learning to generate one or more recommended access controls for the one or more access controls controlling use of the selected media content item in the derivative work; and surfacing the one or more recommended access controls to the source artist entity via the user interface.

17. A computer program product comprising one or more non-transitory computer-readable media with instructions stored thereon that, responsive to execution by one or more processing devices, cause the one or more processing devices to perform operations comprising:

providing, by a media content platform to a derivative artist entity, a user interface that enables the derivative artist entity to search for media content items and that includes an interface element that enables the derivative artist entity to preview one or more access controls associated with a selected media content item from the media content items;

receiving, by the media content platform from the derivative artist entity, a derivative work created by the derivative artist entity, the derivative work incorporating at least a portion of the selected media content item created by a source artist entity;

receiving, by the media content platform from the derivative artist entity, acceptance of one or more access controls, the one or more access controls controlling use of the selected media content item in the derivative work, wherein the one or more access controls include selection of subject matter that the derivative work that incorporates the selected media content item is authorized to be associated with;

responsive to receiving a selection of the subject matter from the derivative artist entity, updating the user interface to include an increased cost for minting a non-fungible token with authorization for the derivative work to be associated with the subject matter; and minting the non-fungible token on a blockchain that controls use of the derivative work based on the one or more access controls including the authorization for the derivative work to be associated with the subject matter, the minting creating the non-fungible token on the blockchain and programmatically encoding an association between the derivative work and the non-fungible token.

18. The computer program product of claim 17, wherein the one or more access controls include at least one of:

one or more platforms where the derivative work is permitted to be accessed;

one or more types of media content that the selected media content item is permitted to be incorporated into as part of the derivative work; and monetary compensation owed to the source artist entity for use of the selected media content item in the derivative work.

19. The computer program product of claim 17, wherein the operations further comprise:

analyzing the derivative work by one or more models to determine a contribution of the selected media content item in the derivative work; and defining, in the one or more access controls, an allocation of revenue generated by the derivative work for the source artist entity and the derivative artist entity based at least in part on the contribution of the selected media content item in the derivative work.

20. The computer program product of claim 19, wherein the revenue is automatically distributed to the source artist entity and the derivative artist entity based on the allocation via a smart contract encoded by the non-fungible token.

* * * * *